US012553091B2

(12) United States Patent
Zhou et al.

(10) Patent No.: US 12,553,091 B2
(45) Date of Patent: Feb. 17, 2026

(54) GENE PANELS FOR MOLECULAR SUBTYPE AND SURVIVAL RISK ASSESSMENT OF LUNG ADENOCARCINOMA AND DIAGNOSTIC PRODUCTS AND APPLICATIONS THEREOF

(71) Applicant: SHANGHAI PRECISION MEDICINE CO., LTD., Shanghai (CN)

(72) Inventors: Tong Zhou, Shanghai (CN); Weiqing Zhou, Shanghai (CN); Zhiyuan Hu, Shanghai (CN); Linlin Ma, Shanghai (CN); Junhuan Lu, Shanghai (CN)

(73) Assignee: SHANGHAI PRECISION MEDICINE CO., LTD., Shanghai (CN)

( * ) Notice: Subject to any disclaimer, the term of this patent is extended or adjusted under 35 U.S.C. 154(b) by 982 days.

(21) Appl. No.: 17/753,254

(22) PCT Filed: Aug. 27, 2020

(86) PCT No.: PCT/CN2020/111702
§ 371 (c)(1),
(2) Date: Feb. 25, 2022

(87) PCT Pub. No.: WO2021/037134
PCT Pub. Date: Mar. 4, 2021

(65) Prior Publication Data
US 2022/0364183 A1 Nov. 17, 2022

(30) Foreign Application Priority Data
Aug. 27, 2019 (CN) .......................... 201910797167.8

(51) Int. Cl.
*C12Q 1/6886* (2018.01)
*C12N 15/11* (2006.01)
*C12Q 1/6869* (2018.01)

(52) U.S. Cl.
CPC .......... *C12Q 1/6886* (2013.01); *C12N 15/111* (2013.01); *C12Q 1/6869* (2013.01)

(58) Field of Classification Search
CPC ............... C12Q 1/6886; C12Q 1/6869; C12Q 2600/112; C12Q 2600/158; C12Q 2600/16; C12N 15/111; C40B 40/06; G01N 33/574
See application file for complete search history.

(56) References Cited

FOREIGN PATENT DOCUMENTS

| CN | 101111768 A | 1/2008 |
| CN | 106282347 A | 1/2017 |

(Continued)

OTHER PUBLICATIONS

Chen et al., Multiplatform-based molecular subtypes of non-small-cell lung cancer, Oncogene, Oct. 2016, 36, 1384-1393 (Year: 2016).*

(Continued)

*Primary Examiner* — Anne M. Gussow
*Assistant Examiner* — Allison E Schloop
(74) *Attorney, Agent, or Firm* — ICE MILLER LLP

(57) ABSTRACT

Disclosed is a gene panel which can evaluate lung adenocarcinoma molecular subtype and survival risk, and an application of a reagent, which detects the gene expression level of the gene panel, in preparing a product. The product is used for determining lung adenocarcinoma molecular subtype and evaluating lung adenocarcinoma patient survival risk. The product comprises a Next-Generation Sequencing (NGS) detection reagent kit, a fluorescence quantitative PCR detection reagent kit, a gene chip and a (Continued)

protein microarray. Also disclosed is a method which uses the detection reagent kits to evaluate lung adenocarcinoma molecular subtype and survival risk.

19 Claims, 4 Drawing Sheets

Specification includes a Sequence Listing.

(56) References Cited

FOREIGN PATENT DOCUMENTS

| | | | |
|---|---|---|---|
| CN | 107849569 A | 3/2018 | |
| CN | 108034719 A | 5/2018 | |
| CN | 108363907 A | 8/2018 | |
| CN | 109790583 A | 5/2019 | |
| EP | 3372686 A1 | 9/2018 | |
| WO | WO-2017201165 A1 * | 11/2017 | ............. A61P 35/00 |
| WO | 2019018764 A1 | 1/2019 | |

OTHER PUBLICATIONS

Shukla et al., Development of a RNA-Seq Based Prognostic Signature in Lung Adenocarcinoma, Journal of the National Cancer Institute, Oct. 2016, 109, 1-9 (Year: 2016).*

International Search Report (Form PCT/ISA/210) for International Patent Application No. PCT/CN2020/111702, issued from the International Searching Authority, date of mailing Dec. 17, 2020, with English-language translation, 10 pages.

Written Opinion of the International Searching Authority (Form PCT/ISA/237) for International Patent Application No. PCT/CN2020/111702, issued from the International Searching Authority, date of mailing Dec. 17, 2020, with English-language translation, 14 pages.

Li, Lifeng et al., "Integrated analysis of dysregulated long non-coding RNAs/microRNAs/mRNAs in metastasis of lung adenocarcinoma," Journal of Translational Medicine, vol. 16, issue 372, pp. 1-14 (2018).

Zhan, Ping et al., "Down-regulation of lysyl oxidase-like 2 (LOXL2) is associated with disease progression in lung adenocarcinomas," Medical Oncology, vol. 29, pp. 648-655 (2012).

Hartwig, Torsten et al., "The TRAIL-Induced Cancer Secretome Promotes a Tumor-Supportive Immune Microenvironment via CCR2," Molecular Cell, vol. 65, pp. 730-742 (Feb. 16, 2017).

Singh, Mohini et., al., "RNAi screen identifies essential regulators of human brain metastasis-initiating cells," Acta Neuropathologica, vol. 134, pp. 923-940 (2017).

Xu, Yan, et., al., "The abnormal expression and the clinicopathologic significance of Polo-like kinase 1 (PLK1) in adenocarcinoma of the lung," China Academic Journal Electronic Publishing House, vol. 36, issue 5 (Oct. 2017), with English-language Abstract translation.

* cited by examiner

SEQUENCE LISTING

<160> NUMBER OF SEQ ID NOS: 299

<210> SEQ ID NO 1
<211> LENGTH: 20
<212> TYPE: DNA
<213> ORGANISM: Artificial Sequence
<220> FEATURE:
<223> OTHER INFORMATION: PLK1 upstream primer

<400> SEQUENCE: 1
cagcaagtgg gtggactatt                                                   20

<210> SEQ ID NO 2
<211> LENGTH: 20
<212> TYPE: DNA
<213> ORGANISM: Artificial Sequence
<220> FEATURE:
<223> OTHER INFORMATION: PLK1 downstream primer

<400> SEQUENCE: 2
atcagtgggc acaagatgag                                                   20

<210> SEQ ID NO 3
<211> LENGTH: 21
<212> TYPE: DNA
<213> ORGANISM: Artificial Sequence
<220> FEATURE:
<223> OTHER INFORMATION: PRC1 upstream primer

<400> SEQUENCE: 3
tgtgtgtccg aagttgagat g                                                 21

<210> SEQ ID NO 4
<211> LENGTH: 20
<212> TYPE: DNA
<213> ORGANISM: Artificial Sequence
<220> FEATURE:
<223> OTHER INFORMATION: PRC1 downstream primer

<400> SEQUENCE: 4
ggcagacagc ggaagaataa                                                   20

<210> SEQ ID NO 5
<211> LENGTH: 21
<212> TYPE: DNA
<213> ORGANISM: Artificial Sequence
<220> FEATURE:
<223> OTHER INFORMATION: CCNB1 upstream primer

<400> SEQUENCE: 5
ccagaacctg agcctgttaa a                                                 21

<210> SEQ ID NO 6
<211> LENGTH: 22
<212> TYPE: DNA
<213> ORGANISM: Artificial Sequence

```
<220> FEATURE:
<223> OTHER INFORMATION: CCNB1 downstream primer

<400> SEQUENCE: 6
ctcgacatca acctctccaa tc                                              22

<210> SEQ ID NO 7
<211> LENGTH: 22
<212> TYPE: DNA
<213> ORGANISM: Artificial Sequence
<220> FEATURE:
<223> OTHER INFORMATION: DLGAP5 upstream primer

<400> SEQUENCE: 7
ccagaccgag tgttctttac tt                                              22

<210> SEQ ID NO 8
<211> LENGTH: 23
<212> TYPE: DNA
<213> ORGANISM: Artificial Sequence
<220> FEATURE:
<223> OTHER INFORMATION: DLGAP5 downstream primer

<400> SEQUENCE: 8
ctttggcctt tgaccttgta atc                                             23

<210> SEQ ID NO 9
<211> LENGTH: 22
<212> TYPE: DNA
<213> ORGANISM: Artificial Sequence
<220> FEATURE:
<223> OTHER INFORMATION: KPNA2 upstream primer

<400> SEQUENCE: 9
gctgggctat ttcctacctt ac                                              22

<210> SEQ ID NO 10
<211> LENGTH: 23
<212> TYPE: DNA
<213> ORGANISM: Artificial Sequence
<220> FEATURE:
<223> OTHER INFORMATION: KPNA2 downstream primer

<400> SEQUENCE: 10
gtgtagcctt cagaggtagt ttc                                             23

<210> SEQ ID NO 11
<211> LENGTH: 22
<212> TYPE: DNA
<213> ORGANISM: Artificial Sequence
<220> FEATURE:
<223> OTHER INFORMATION: CCNA2 upstream primer

<400> SEQUENCE: 11
ccaagaggac caggagaata tc                                              22

<210> SEQ ID NO 12
<211> LENGTH: 22
<212> TYPE: DNA
<213> ORGANISM: Artificial Sequence
<220> FEATURE:
<223> OTHER INFORMATION: CCNA2 downstream primer

<400> SEQUENCE: 12
gaggtatggg tcagcatcta tc                                              22
```

<210> SEQ ID NO 13
<211> LENGTH: 21
<212> TYPE: DNA
<213> ORGANISM: Artificial Sequence
<220> FEATURE:
<223> OTHER INFORMATION: RRM2 upstream primer

<400> SEQUENCE: 13
ccatcggagg agagagtaag a                                             21

<210> SEQ ID NO 14
<211> LENGTH: 22
<212> TYPE: DNA
<213> ORGANISM: Artificial Sequence
<220> FEATURE:
<223> OTHER INFORMATION: RRM2 downstream primer

<400> SEQUENCE: 14
actacacaag ccacaggata aa                                            22

<210> SEQ ID NO 15
<211> LENGTH: 22
<212> TYPE: DNA
<213> ORGANISM: Artificial Sequence
<220> FEATURE:
<223> OTHER INFORMATION: FOXM1 upstream primer

<400> SEQUENCE: 15
caggagtcta atcaagcaga gg                                            22

<210> SEQ ID NO 16
<211> LENGTH: 22
<212> TYPE: DNA
<213> ORGANISM: Artificial Sequence
<220> FEATURE:
<223> OTHER INFORMATION: FOXM1 downstream primer

<400> SEQUENCE: 16
gtggtcctca atccacgtat ag                                            22

<210> SEQ ID NO 17
<211> LENGTH: 22
<212> TYPE: DNA
<213> ORGANISM: Artificial Sequence
<220> FEATURE:
<223> OTHER INFORMATION: MKI67 upstream primer

<400> SEQUENCE: 17
agtaccagga ggtgaggata aa                                            22

<210> SEQ ID NO 18
<211> LENGTH: 21
<212> TYPE: DNA
<213> ORGANISM: Artificial Sequence
<220> FEATURE:
<223> OTHER INFORMATION: MKI67 downstream primer

<400> SEQUENCE: 18
ctgcactgga gttcccataa a                                             21

<210> SEQ ID NO 19
<211> LENGTH: 22
<212> TYPE: DNA
<213> ORGANISM: Artificial Sequence
<220> FEATURE:
<223> OTHER INFORMATION: KIF14 upstream primer

<400> SEQUENCE: 19
ggaagcagaa ctgagagaag ag                                                22

<210> SEQ ID NO 20
<211> LENGTH: 22
<212> TYPE: DNA
<213> ORGANISM: Artificial Sequence
<220> FEATURE:
<223> OTHER INFORMATION: KIF14 downstream primer

<400> SEQUENCE: 20
gagccttgga aatggcaaat ag                                                22

<210> SEQ ID NO 21
<211> LENGTH: 22
<212> TYPE: DNA
<213> ORGANISM: Artificial Sequence
<220> FEATURE:
<223> OTHER INFORMATION: HJURP upstream primer

<400> SEQUENCE: 21
accttcacgt tcagggaaat ag                                                22

<210> SEQ ID NO 22
<211> LENGTH: 23
<212> TYPE: DNA
<213> ORGANISM: Artificial Sequence
<220> FEATURE:
<223> OTHER INFORMATION: HJURP downstream primer

<400> SEQUENCE: 22
cagagagcaa gtgggaagat aaa                                               23

<210> SEQ ID NO 23
<211> LENGTH: 22
<212> TYPE: DNA
<213> ORGANISM: Artificial Sequence
<220> FEATURE:
<223> OTHER INFORMATION: TPX2 upstream primer

<400> SEQUENCE: 23
cctgccagag aagaaggtaa ag                                                22

<210> SEQ ID NO 24
<211> LENGTH: 22
<212> TYPE: DNA
<213> ORGANISM: Artificial Sequence
<220> FEATURE:
<223> OTHER INFORMATION: TPX2 downstream primer

<400> SEQUENCE: 24
cggtcctagg tttgaggtta ag                                                22

<210> SEQ ID NO 25
<211> LENGTH: 22
<212> TYPE: DNA
<213> ORGANISM: Artificial Sequence
<220> FEATURE:
<223> OTHER INFORMATION: NEK2 upstream primer

<400> SEQUENCE: 25
gagagaagag ggcgacaatt ag                                                22

<210> SEQ ID NO 26

```
<211> LENGTH: 22
<212> TYPE: DNA
<213> ORGANISM: Artificial Sequence
<220> FEATURE:
<223> OTHER INFORMATION: NEK2 downstream primer

<400> SEQUENCE: 26
acaggaactt ccgttccttt ag                                              22

<210> SEQ ID NO 27
<211> LENGTH: 22
<212> TYPE: DNA
<213> ORGANISM: Artificial Sequence
<220> FEATURE:
<223> OTHER INFORMATION: CDK1 upstream primer

<400> SEQUENCE: 27
ctttagcgcg gatctaccat ac                                              22

<210> SEQ ID NO 28
<211> LENGTH: 22
<212> TYPE: DNA
<213> ORGANISM: Artificial Sequence
<220> FEATURE:
<223> OTHER INFORMATION: CDK1 downstream primer

<400> SEQUENCE: 28
ctctgcccta ggctttcatt ac                                              22

<210> SEQ ID NO 29
<211> LENGTH: 22
<212> TYPE: DNA
<213> ORGANISM: Artificial Sequence
<220> FEATURE:
<223> OTHER INFORMATION: CDKN3 upstream primer

<400> SEQUENCE: 29
cccaaacctt ctggatctct ac                                              22

<210> SEQ ID NO 30
<211> LENGTH: 22
<212> TYPE: DNA
<213> ORGANISM: Artificial Sequence
<220> FEATURE:
<223> OTHER INFORMATION: CDKN3 downstream primer

<400> SEQUENCE: 30
tatggcttgc tctggtgata tt                                              22

<210> SEQ ID NO 31
<211> LENGTH: 21
<212> TYPE: DNA
<213> ORGANISM: Artificial Sequence
<220> FEATURE:
<223> OTHER INFORMATION: ASPM upstream primer

<400> SEQUENCE: 31
actcaggatt ccggcaataa g                                               21

<210> SEQ ID NO 32
<211> LENGTH: 23
<212> TYPE: DNA
<213> ORGANISM: Artificial Sequence
<220> FEATURE:
<223> OTHER INFORMATION: ASPM downstream primer

<400> SEQUENCE: 32
```
ggtattccac caaggtctct aac                                              23

<210> SEQ ID NO 33
<211> LENGTH: 20
<212> TYPE: DNA
<213> ORGANISM: Artificial Sequence
<220> FEATURE:
<223> OTHER INFORMATION: CEP55 upstream primer

<400> SEQUENCE: 33
tgccatcaca gagccattag                                                  20

<210> SEQ ID NO 34
<211> LENGTH: 23
<212> TYPE: DNA
<213> ORGANISM: Artificial Sequence
<220> FEATURE:
<223> OTHER INFORMATION: CEP55 downstream primer

<400> SEQUENCE: 34
gctggagtgt caaaggtaga tag                                              23

<210> SEQ ID NO 35
<211> LENGTH: 20
<212> TYPE: DNA
<213> ORGANISM: Artificial Sequence
<220> FEATURE:
<223> OTHER INFORMATION: BIRC5 upstream primer

<400> SEQUENCE: 35
gcaccacttc cagggtttat                                                  20

<210> SEQ ID NO 36
<211> LENGTH: 24
<212> TYPE: DNA
<213> ORGANISM: Artificial Sequence
<220> FEATURE:
<223> OTHER INFORMATION: BIRC5 downstream primer

<400> SEQUENCE: 36
cagacgcttc ctatcactct attc                                             24

<210> SEQ ID NO 37
<211> LENGTH: 20
<212> TYPE: DNA
<213> ORGANISM: Artificial Sequence
<220> FEATURE:
<223> OTHER INFORMATION: MELK upstream primer

<400> SEQUENCE: 37
acctcacggc tacctatctt                                                  20

<210> SEQ ID NO 38
<211> LENGTH: 22
<212> TYPE: DNA
<213> ORGANISM: Artificial Sequence
<220> FEATURE:
<223> OTHER INFORMATION: MELK downstream primer

<400> SEQUENCE: 38
ctgtatcaca cccacactca tc                                               22

<210> SEQ ID NO 39
<211> LENGTH: 21
<212> TYPE: DNA

```
<213> ORGANISM: Artificial Sequence
<220> FEATURE:
<223> OTHER INFORMATION: CDC20 upstream primer

<400> SEQUENCE: 39
tggattggag ttctgggaat g                                              21

<210> SEQ ID NO 40
<211> LENGTH: 23
<212> TYPE: DNA
<213> ORGANISM: Artificial Sequence
<220> FEATURE:
<223> OTHER INFORMATION: CDC20 downstream primer

<400> SEQUENCE: 40
gtgaaccact ggacaggata tag                                            23

<210> SEQ ID NO 41
<211> LENGTH: 21
<212> TYPE: DNA
<213> ORGANISM: Artificial Sequence
<220> FEATURE:
<223> OTHER INFORMATION: TYMS upstream primer

<400> SEQUENCE: 41
ggaggagttg ctgtggttta t                                              21

<210> SEQ ID NO 42
<211> LENGTH: 20
<212> TYPE: DNA
<213> ORGANISM: Artificial Sequence
<220> FEATURE:
<223> OTHER INFORMATION: TYMS downstream primer

<400> SEQUENCE: 42
tttgggaaag gtctgggttc                                                20

<210> SEQ ID NO 43
<211> LENGTH: 22
<212> TYPE: DNA
<213> ORGANISM: Artificial Sequence
<220> FEATURE:
<223> OTHER INFORMATION: AURKA upstream primer

<400> SEQUENCE: 43
gtgtgcctta acctccctat tc                                             22

<210> SEQ ID NO 44
<211> LENGTH: 22
<212> TYPE: DNA
<213> ORGANISM: Artificial Sequence
<220> FEATURE:
<223> OTHER INFORMATION: AURKA downstream primer

<400> SEQUENCE: 44
gacacatggc ctcttctgta tc                                             22

<210> SEQ ID NO 45
<211> LENGTH: 22
<212> TYPE: DNA
<213> ORGANISM: Artificial Sequence
<220> FEATURE:
<223> OTHER INFORMATION: TOP2A upstream primer

<400> SEQUENCE: 45
gtgtggttgg gagagacaaa ta                                             22
```

<210> SEQ ID NO 46
<211> LENGTH: 20
<212> TYPE: DNA
<213> ORGANISM: Artificial Sequence
<220> FEATURE:
<223> OTHER INFORMATION: TOP2A downstream primer

<400> SEQUENCE: 46
atgggctgca agaggtttag                                               20

<210> SEQ ID NO 47
<211> LENGTH: 22
<212> TYPE: DNA
<213> ORGANISM: Artificial Sequence
<220> FEATURE:
<223> OTHER INFORMATION: P2RY13 upstream primer

<400> SEQUENCE: 47
ccctagaact tgcctacctt tc                                            22

<210> SEQ ID NO 48
<211> LENGTH: 22
<212> TYPE: DNA
<213> ORGANISM: Artificial Sequence
<220> FEATURE:
<223> OTHER INFORMATION: P2RY13 downstream primer

<400> SEQUENCE: 48
ttgaggtgat ggtgggatat tg                                            22

<210> SEQ ID NO 49
<211> LENGTH: 22
<212> TYPE: DNA
<213> ORGANISM: Artificial Sequence
<220> FEATURE:
<223> OTHER INFORMATION: CCR2 upstream primer

<400> SEQUENCE: 49
ctgtatctcc gccttcactt tc                                            22

<210> SEQ ID NO 50
<211> LENGTH: 20
<212> TYPE: DNA
<213> ORGANISM: Artificial Sequence
<220> FEATURE:
<223> OTHER INFORMATION: CCR2 downstream primer

<400> SEQUENCE: 50
caccgctctc gttggtattt                                               20

<210> SEQ ID NO 51
<211> LENGTH: 22
<212> TYPE: DNA
<213> ORGANISM: Artificial Sequence
<220> FEATURE:
<223> OTHER INFORMATION: PTPRC upstream primer

<400> SEQUENCE: 51
gctcacttct cctaccttct tg                                            22

<210> SEQ ID NO 52
<211> LENGTH: 22
<212> TYPE: DNA
<213> ORGANISM: Artificial Sequence
<220> FEATURE:

<223> OTHER INFORMATION: PTPRC downstream primer

<400> SEQUENCE: 52 gttccctta tcgtccactc tc                                    22

<210> SEQ ID NO 53
<211> LENGTH: 22
<212> TYPE: DNA
<213> ORGANISM: Artificial Sequence
<220> FEATURE:
<223> OTHER INFORMATION: IRF8 upstream primer

<400> SEQUENCE: 53
gctttgttgc caggaagatt ag                                   22

<210> SEQ ID NO 54
<211> LENGTH: 22
<212> TYPE: DNA
<213> ORGANISM: Artificial Sequence
<220> FEATURE:
<223> OTHER INFORMATION: IRF8 downstream primer

<400> SEQUENCE: 54
gagacttggg agattggatg ag                                   22

<210> SEQ ID NO 55
<211> LENGTH: 20
<212> TYPE: DNA
<213> ORGANISM: Artificial Sequence
<220> FEATURE:
<223> OTHER INFORMATION: CLEC10A upstream primer

<400> SEQUENCE: 55
ctggtgcaag acctgaagaa                                      20

<210> SEQ ID NO 56
<211> LENGTH: 22
<212> TYPE: DNA
<213> ORGANISM: Artificial Sequence
<220> FEATURE:
<223> OTHER INFORMATION: CLEC10A downstream primer

<400> SEQUENCE: 56
ctagaagagg caaggccaat aa                                   22

<210> SEQ ID NO 57
<211> LENGTH: 22
<212> TYPE: DNA
<213> ORGANISM: Artificial Sequence
<220> FEATURE:
<223> OTHER INFORMATION: TLR7 upstream primer

<400> SEQUENCE: 57
ctggaagacc caagagagaa ac                                   22

<210> SEQ ID NO 58
<211> LENGTH: 20
<212> TYPE: DNA
<213> ORGANISM: Artificial Sequence
<220> FEATURE:
<223> OTHER INFORMATION: TLR7 downstream primer

<400> SEQUENCE: 58
tcccaaagtg ctgggattac                                      20

<210> SEQ ID NO 59
<211> LENGTH: 21
<212> TYPE: DNA
<213> ORGANISM: Artificial Sequence
<220> FEATURE:
<223> OTHER INFORMATION: CCR4 upstream primer

<400> SEQUENCE: 59
cttgggttct ggacacctta c                                              21

<210> SEQ ID NO 60
<211> LENGTH: 22
<212> TYPE: DNA
<213> ORGANISM: Artificial Sequence
<220> FEATURE:
<223> OTHER INFORMATION: CCR4 downstream primer

<400> SEQUENCE: 60
cactggctca ggaatctctt ac                                             22

<210> SEQ ID NO 61
<211> LENGTH: 20
<212> TYPE: DNA
<213> ORGANISM: Artificial Sequence
<220> FEATURE:
<223> OTHER INFORMATION: IL7R upstream primer

<400> SEQUENCE: 61
agtgggcagg tgttctttac                                                20

<210> SEQ ID NO 62
<211> LENGTH: 23
<212> TYPE: DNA
<213> ORGANISM: Artificial Sequence
<220> FEATURE:
<223> OTHER INFORMATION: IL7R downstream primer

<400> SEQUENCE: 62
gtctccgatc aggaggttta ttt                                            23

<210> SEQ ID NO 63
<211> LENGTH: 22
<212> TYPE: DNA
<213> ORGANISM: Artificial Sequence
<220> FEATURE:
<223> OTHER INFORMATION: SPN upstream primer

<400> SEQUENCE: 63
cctcccaaag tgctgagatt ac                                             22

<210> SEQ ID NO 64
<211> LENGTH: 22
<212> TYPE: DNA
<213> ORGANISM: Artificial Sequence
<220> FEATURE:
<223> OTHER INFORMATION: SPN downstream primer

<400> SEQUENCE: 64
ggtggatgag gagggtttat tc                                             22

<210> SEQ ID NO 65
<211> LENGTH: 23
<212> TYPE: DNA
<213> ORGANISM: Artificial Sequence
<220> FEATURE:
<223> OTHER INFORMATION: SASH3 upstream primer

```
<400> SEQUENCE: 65
cctcctactc acccactttta ttc                                          23

<210> SEQ ID NO 66
<211> LENGTH: 20
<212> TYPE: DNA
<213> ORGANISM: Artificial Sequence
<220> FEATURE:
<223> OTHER INFORMATION: SASH3 downstream primer

<400> SEQUENCE: 66
tccctccacc ctctcatatt                                               20

<210> SEQ ID NO 67
<211> LENGTH: 20
<212> TYPE: DNA
<213> ORGANISM: Artificial Sequence
<220> FEATURE:
<223> OTHER INFORMATION: CSF2RB upstream primer

<400> SEQUENCE: 67
gggaaactgc caaacaaagg                                               20

<210> SEQ ID NO 68
<211> LENGTH: 22
<212> TYPE: DNA
<213> ORGANISM: Artificial Sequence
<220> FEATURE:
<223> OTHER INFORMATION: CSF2RB downstream primer

<400> SEQUENCE: 68
ggaagcctag ggaccaataa ag                                            22

<210> SEQ ID NO 69
<211> LENGTH: 22
<212> TYPE: DNA
<213> ORGANISM: Artificial Sequence
<220> FEATURE:
<223> OTHER INFORMATION: CD37 upstream primer

<400> SEQUENCE: 69
ctctccgtct ctctttctct ct                                            22

<210> SEQ ID NO 70
<211> LENGTH: 20
<212> TYPE: DNA
<213> ORGANISM: Artificial Sequence
<220> FEATURE:
<223> OTHER INFORMATION: CD37 downstream primer

<400> SEQUENCE: 70
agctggaact gcacatagtc                                               20

<210> SEQ ID NO 71
<211> LENGTH: 22
<212> TYPE: DNA
<213> ORGANISM: Artificial Sequence
<220> FEATURE:
<223> OTHER INFORMATION: IKZF1 upstream primer

<400> SEQUENCE: 71
gctctgcacc tgtaggatat tg                                            22

<210> SEQ ID NO 72
<211> LENGTH: 21
```

<212> TYPE: DNA
<213> ORGANISM: Artificial Sequence
<220> FEATURE:
<223> OTHER INFORMATION: IKZF1 downstream primer

<400> SEQUENCE: 72
cccttgcttg ttgggattag a                                         21

<210> SEQ ID NO 73
<211> LENGTH: 22
<212> TYPE: DNA
<213> ORGANISM: Artificial Sequence
<220> FEATURE:
<223> OTHER INFORMATION: CD48 upstream primer

<400> SEQUENCE: 73
gatacctggc gagtctgtaa ac                                        22

<210> SEQ ID NO 74
<211> LENGTH: 20
<212> TYPE: DNA
<213> ORGANISM: Artificial Sequence
<220> FEATURE:
<223> OTHER INFORMATION: CD48 downstream primer

<400> SEQUENCE: 74
tgtgcaagga ggctgaatag                                           20

<210> SEQ ID NO 75
<211> LENGTH: 20
<212> TYPE: DNA
<213> ORGANISM: Artificial Sequence
<220> FEATURE:
<223> OTHER INFORMATION: IL10RA upstream primer

<400> SEQUENCE: 75
agtagtggca gcagcaatag                                           20

<210> SEQ ID NO 76
<211> LENGTH: 22
<212> TYPE: DNA
<213> ORGANISM: Artificial Sequence
<220> FEATURE:
<223> OTHER INFORMATION: IL10RA downstream primer

<400> SEQUENCE: 76
ggtgaccagg tctgagttaa ag                                        22

<210> SEQ ID NO 77
<211> LENGTH: 21
<212> TYPE: DNA
<213> ORGANISM: Artificial Sequence
<220> FEATURE:
<223> OTHER INFORMATION: EVI2B upstream primer

<400> SEQUENCE: 77
gcagtcacag cctaccttat t                                         21

<210> SEQ ID NO 78
<211> LENGTH: 22
<212> TYPE: DNA
<213> ORGANISM: Artificial Sequence
<220> FEATURE:
<223> OTHER INFORMATION: EVI2B downstream primer

<400> SEQUENCE: 78
tgttgaacca tcagcactat ct                                                22

<210> SEQ ID NO 79
<211> LENGTH: 20
<212> TYPE: DNA
<213> ORGANISM: Artificial Sequence
<220> FEATURE:
<223> OTHER INFORMATION: IGSF6 upstream primer

<400> SEQUENCE: 79
gaagagtgct cggcgtattt                                                   20

<210> SEQ ID NO 80
<211> LENGTH: 21
<212> TYPE: DNA
<213> ORGANISM: Artificial Sequence
<220> FEATURE:
<223> OTHER INFORMATION: IGSF6 downstream primer

<400> SEQUENCE: 80
cgttgtccct cccaacttat t                                                 21

<210> SEQ ID NO 81
<211> LENGTH: 20
<212> TYPE: DNA
<213> ORGANISM: Artificial Sequence
<220> FEATURE:
<223> OTHER INFORMATION: CD52 upstream primer

<400> SEQUENCE: 81
cctcagcatc cagcaacata                                                   20

<210> SEQ ID NO 82
<211> LENGTH: 20
<212> TYPE: DNA
<213> ORGANISM: Artificial Sequence
<220> FEATURE:
<223> OTHER INFORMATION: CD52 downstream primer

<400> SEQUENCE: 82
gcactgcctg tcaacttcta                                                   20

<210> SEQ ID NO 83
<211> LENGTH: 24
<212> TYPE: DNA
<213> ORGANISM: Artificial Sequence
<220> FEATURE:
<223> OTHER INFORMATION: DOCK2 upstream primer

<400> SEQUENCE: 83
catacctgac ccttccttct tatc                                              24

<210> SEQ ID NO 84
<211> LENGTH: 22
<212> TYPE: DNA
<213> ORGANISM: Artificial Sequence
<220> FEATURE:
<223> OTHER INFORMATION: DOCK2 downstream primer

<400> SEQUENCE: 84
cacttcctct ccatccacaa tc                                                22

<210> SEQ ID NO 85
<211> LENGTH: 22
<212> TYPE: DNA
<213> ORGANISM: Artificial Sequence

```
<220> FEATURE:
<223> OTHER INFORMATION: CD84 upstream primer

<400> SEQUENCE: 85
gaaggaatgg ctgggctata tt                                              22

<210> SEQ ID NO 86
<211> LENGTH: 22
<212> TYPE: DNA
<213> ORGANISM: Artificial Sequence
<220> FEATURE:
<223> OTHER INFORMATION: CD84 downstream primer

<400> SEQUENCE: 86
ctgaggtaca gcgaggttaa ag                                              22

<210> SEQ ID NO 87
<211> LENGTH: 20
<212> TYPE: DNA
<213> ORGANISM: Artificial Sequence
<220> FEATURE:
<223> OTHER INFORMATION: FOLR2 upstream primer

<400> SEQUENCE: 87
caatgcagtc cctggaagaa                                                 20

<210> SEQ ID NO 88
<211> LENGTH: 23
<212> TYPE: DNA
<213> ORGANISM: Artificial Sequence
<220> FEATURE:
<223> OTHER INFORMATION: FOLR2 downstream primer

<400> SEQUENCE: 88
ctgtagttgc tgaccttgta tga                                             23

<210> SEQ ID NO 89
<211> LENGTH: 21
<212> TYPE: DNA
<213> ORGANISM: Artificial Sequence
<220> FEATURE:
<223> OTHER INFORMATION: NCKAP1L upstream primer

<400> SEQUENCE: 89
ttgcctcttt cccacctatt c                                               21

<210> SEQ ID NO 90
<211> LENGTH: 22
<212> TYPE: DNA
<213> ORGANISM: Artificial Sequence
<220> FEATURE:
<223> OTHER INFORMATION: NCKAP1L downstream primer

<400> SEQUENCE: 90
accctctgtc catctacctt ta                                              22

<210> SEQ ID NO 91
<211> LENGTH: 19
<212> TYPE: DNA
<213> ORGANISM: Artificial Sequence
<220> FEATURE:
<223> OTHER INFORMATION: TRAC upstream primer

<400> SEQUENCE: 91
ctcagcatcc ggccaaata                                                  19
```

```
<210> SEQ ID NO 92
<211> LENGTH: 21
<212> TYPE: DNA
<213> ORGANISM: Artificial Sequence
<220> FEATURE:
<223> OTHER INFORMATION: TRAC downstream primer

<400> SEQUENCE: 92
gcagtgacaa gcagcaataa g                                              21

<210> SEQ ID NO 93
<211> LENGTH: 23
<212> TYPE: DNA
<213> ORGANISM: Artificial Sequence
<220> FEATURE:
<223> OTHER INFORMATION: MNDA upstream primer

<400> SEQUENCE: 93
gctttcattt ctcagccctt tac                                            23

<210> SEQ ID NO 94
<211> LENGTH: 21
<212> TYPE: DNA
<213> ORGANISM: Artificial Sequence
<220> FEATURE:
<223> OTHER INFORMATION: MNDA downstream primer

<400> SEQUENCE: 94
ctgctcttgg gacaccttat t                                              21

<210> SEQ ID NO 95
<211> LENGTH: 22
<212> TYPE: DNA
<213> ORGANISM: Artificial Sequence
<220> FEATURE:
<223> OTHER INFORMATION: MRC1 upstream primer

<400> SEQUENCE: 95
cagctctggg aacttggatt ag                                             22

<210> SEQ ID NO 96
<211> LENGTH: 22
<212> TYPE: DNA
<213> ORGANISM: Artificial Sequence
<220> FEATURE:
<223> OTHER INFORMATION: MRC1 downstream primer

<400> SEQUENCE: 96
gatcttccac ctgctccata aa                                             22

<210> SEQ ID NO 97
<211> LENGTH: 22
<212> TYPE: DNA
<213> ORGANISM: Artificial Sequence
<220> FEATURE:
<223> OTHER INFORMATION: PLEK upstream primer

<400> SEQUENCE: 97
caaccctgat gccttctact ac                                             22

<210> SEQ ID NO 98
<211> LENGTH: 20
<212> TYPE: DNA
<213> ORGANISM: Artificial Sequence
<220> FEATURE:
<223> OTHER INFORMATION: PLEK downstream primer
```

-continued

<400> SEQUENCE: 98
cctcactctt cctgccattt                                        20

<210> SEQ ID NO 99
<211> LENGTH: 22
<212> TYPE: DNA
<213> ORGANISM: Artificial Sequence
<220> FEATURE:
<223> OTHER INFORMATION: SPIB upstream primer

<400> SEQUENCE: 99
gaggctgtag tgagctgtaa tc                                     22

<210> SEQ ID NO 100
<211> LENGTH: 22
<212> TYPE: DNA
<213> ORGANISM: Artificial Sequence
<220> FEATURE:
<223> OTHER INFORMATION: SPIB downstream primer

<400> SEQUENCE: 100
gagatcttcc tcctccttct ct                                     22

<210> SEQ ID NO 101
<211> LENGTH: 22
<212> TYPE: DNA
<213> ORGANISM: Artificial Sequence
<220> FEATURE:
<223> OTHER INFORMATION: CD53 upstream primer

<400> SEQUENCE: 101
cttcggagtg ctcttccata ac                                     22

<210> SEQ ID NO 102
<211> LENGTH: 21
<212> TYPE: DNA
<213> ORGANISM: Artificial Sequence
<220> FEATURE:
<223> OTHER INFORMATION: CD53 downstream primer

<400> SEQUENCE: 102
tcagacccct tagccacata c t                                    21

<210> SEQ ID NO 103
<211> LENGTH: 20
<212> TYPE: DNA
<213> ORGANISM: Artificial Sequence
<220> FEATURE:
<223> OTHER INFORMATION: CD4 upstream primer

<400> SEQUENCE: 103
tggagaacaa ggaggcaaag                                        20

<210> SEQ ID NO 104
<211> LENGTH: 22
<212> TYPE: DNA
<213> ORGANISM: Artificial Sequence
<220> FEATURE:
<223> OTHER INFORMATION: CD4 downstream primer

<400> SEQUENCE: 104
gggagagggt cagagagaaa ta                                     22

<210> SEQ ID NO 105

<211> LENGTH: 20
<212> TYPE: DNA
<213> ORGANISM: Artificial Sequence
<220> FEATURE:
<223> OTHER INFORMATION: LYZ upstream primer

<400> SEQUENCE: 105
gggaatcagc ctagcaaact                                               20

<210> SEQ ID NO 106
<211> LENGTH: 19
<212> TYPE: DNA
<213> ORGANISM: Artificial Sequence
<220> FEATURE:
<223> OTHER INFORMATION: LYZ downstream primer

<400> SEQUENCE: 106
tgccacccat gctctaatg                                                19

<210> SEQ ID NO 107
<211> LENGTH: 20
<212> TYPE: DNA
<213> ORGANISM: Artificial Sequence
<220> FEATURE:
<223> OTHER INFORMATION: SPOCK1 upstream primer

<400> SEQUENCE: 107
ctactgtccg ccactgattt                                               20

<210> SEQ ID NO 108
<211> LENGTH: 22
<212> TYPE: DNA
<213> ORGANISM: Artificial Sequence
<220> FEATURE:
<223> OTHER INFORMATION: SPOCK1 downstream primer

<400> SEQUENCE: 108
gcctatggtc tgtcttccta tg                                            22

<210> SEQ ID NO 109
<211> LENGTH: 20
<212> TYPE: DNA
<213> ORGANISM: Artificial Sequence
<220> FEATURE:
<223> OTHER INFORMATION: COL1A1 upstream primer

<400> SEQUENCE: 109
cagactggca acctcaagaa                                               20

<210> SEQ ID NO 110
<211> LENGTH: 21
<212> TYPE: DNA
<213> ORGANISM: Artificial Sequence
<220> FEATURE:
<223> OTHER INFORMATION: COL1A1 downstream primer

<400> SEQUENCE: 110
tgtggagaaa ggagcagaaa g                                             21

<210> SEQ ID NO 111
<211> LENGTH: 21
<212> TYPE: DNA
<213> ORGANISM: Artificial Sequence
<220> FEATURE:
<223> OTHER INFORMATION: POSTN upstream primer

<400> SEQUENCE: 111
gagacgctgg aaggaaatac a                                              21

<210> SEQ ID NO 112
<211> LENGTH: 22
<212> TYPE: DNA
<213> ORGANISM: Artificial Sequence
<220> FEATURE:
<223> OTHER INFORMATION: POSTN downstream primer

<400> SEQUENCE: 112
ctcctggtgt caggtgataa ag                                             22

<210> SEQ ID NO 113
<211> LENGTH: 22
<212> TYPE: DNA
<213> ORGANISM: Artificial Sequence
<220> FEATURE:
<223> OTHER INFORMATION: ADAM12 upstream primer

<400> SEQUENCE: 113
ctcagacctg ctccacaata tc                                             22

<210> SEQ ID NO 114
<211> LENGTH: 22
<212> TYPE: DNA
<213> ORGANISM: Artificial Sequence
<220> FEATURE:
<223> OTHER INFORMATION: ADAM12 downstream primer

<400> SEQUENCE: 114
gcaagtagac agagcaccat ag                                             22

<210> SEQ ID NO 115
<211> LENGTH: 22
<212> TYPE: DNA
<213> ORGANISM: Artificial Sequence
<220> FEATURE:
<223> OTHER INFORMATION: COL6A2 upstream primer

<400> SEQUENCE: 115
ccaacttcac actggagaag aa                                             22

<210> SEQ ID NO 116
<211> LENGTH: 22
<212> TYPE: DNA
<213> ORGANISM: Artificial Sequence
<220> FEATURE:
<223> OTHER INFORMATION: COL6A2 downstream primer

<400> SEQUENCE: 116
gcgagaagga gttcaggtat tg                                             22

<210> SEQ ID NO 117
<211> LENGTH: 22
<212> TYPE: DNA
<213> ORGANISM: Artificial Sequence
<220> FEATURE:
<223> OTHER INFORMATION: COL5A1 upstream primer

<400> SEQUENCE: 117
ttccaaggta agcctcgtaa ag                                             22

<210> SEQ ID NO 118
<211> LENGTH: 22
<212> TYPE: DNA

<213> ORGANISM: Artificial Sequence
<220> FEATURE:
<223> OTHER INFORMATION: COL5A1 downstream primer

<400> SEQUENCE: 118
caagagagcc acaagagaga ag                                          22

<210> SEQ ID NO 119
<211> LENGTH: 21
<212> TYPE: DNA
<213> ORGANISM: Artificial Sequence
<220> FEATURE:
<223> OTHER INFORMATION: COL11A1 upstream primer

<400> SEQUENCE: 119
aagctcaggc tcaagctatt c                                           21

<210> SEQ ID NO 120
<211> LENGTH: 21
<212> TYPE: DNA
<213> ORGANISM: Artificial Sequence
<220> FEATURE:
<223> OTHER INFORMATION: COL11A1 downstream primer

<400> SEQUENCE: 120
gacaccatct gctcccttta c                                           21

<210> SEQ ID NO 121
<211> LENGTH: 21
<212> TYPE: DNA
<213> ORGANISM: Artificial Sequence
<220> FEATURE:
<223> OTHER INFORMATION: COL5A2 upstream primer

<400> SEQUENCE: 121
ttccaggctc tgatggttta c                                           21

<210> SEQ ID NO 122
<211> LENGTH: 22
<212> TYPE: DNA
<213> ORGANISM: Artificial Sequence
<220> FEATURE:
<223> OTHER INFORMATION: COL5A2 downstream primer

<400> SEQUENCE: 122
gaggtccttg ttctcctctt tc                                          22

<210> SEQ ID NO 123
<211> LENGTH: 20
<212> TYPE: DNA
<213> ORGANISM: Artificial Sequence
<220> FEATURE:
<223> OTHER INFORMATION: COL1A2 upstream primer

<400> SEQUENCE: 123
tgtaagcggt ggtggttatg                                             20

<210> SEQ ID NO 124
<211> LENGTH: 22
<212> TYPE: DNA
<213> ORGANISM: Artificial Sequence
<220> FEATURE:
<223> OTHER INFORMATION: COL1A2 downstream primer

<400> SEQUENCE: 124
gatacaggtt tcgccagtag ag                                          22

<210> SEQ ID NO 125
<211> LENGTH: 22
<212> TYPE: DNA
<213> ORGANISM: Artificial Sequence
<220> FEATURE:
<223> OTHER INFORMATION: MXRA5 upstream primer

<400> SEQUENCE: 125
cagaacagga gcaggagtat tg                                             22

<210> SEQ ID NO 126
<211> LENGTH: 22
<212> TYPE: DNA
<213> ORGANISM: Artificial Sequence
<220> FEATURE:
<223> OTHER INFORMATION: MXRA5 downstream primer

<400> SEQUENCE: 126
ggaagcaccc agaagataga tg                                             22

<210> SEQ ID NO 127
<211> LENGTH: 22
<212> TYPE: DNA
<213> ORGANISM: Artificial Sequence
<220> FEATURE:
<223> OTHER INFORMATION: THBS2 upstream primer

<400> SEQUENCE: 127
gtgacaacaa cgaggacata ga                                             22

<210> SEQ ID NO 128
<211> LENGTH: 21
<212> TYPE: DNA
<213> ORGANISM: Artificial Sequence
<220> FEATURE:
<223> OTHER INFORMATION: THBS2 downstream primer

<400> SEQUENCE: 128
gcttccacat caccacatag a                                              21

<210> SEQ ID NO 129
<211> LENGTH: 21
<212> TYPE: DNA
<213> ORGANISM: Artificial Sequence
<220> FEATURE:
<223> OTHER INFORMATION: INHBA upstream primer

<400> SEQUENCE: 129
cctgggcaag aagaagaaga a                                              21

<210> SEQ ID NO 130
<211> LENGTH: 22
<212> TYPE: DNA
<213> ORGANISM: Artificial Sequence
<220> FEATURE:
<223> OTHER INFORMATION: INHBA downstream primer

<400> SEQUENCE: 130
cctgggtaat tgggtaggaa ag                                             22

<210> SEQ ID NO 131
<211> LENGTH: 21
<212> TYPE: DNA
<213> ORGANISM: Artificial Sequence
<220> FEATURE:

<223> OTHER INFORMATION: VCAN upstream primer

<400> SEQUENCE: 131
ctactttgcc acccagttac a					21

<210> SEQ ID NO 132
<211> LENGTH: 22
<212> TYPE: DNA
<213> ORGANISM: Artificial Sequence
<220> FEATURE:
<223> OTHER INFORMATION: VCAN downstream primer

<400> SEQUENCE: 132
ctcctgcctt tcccatctta tc				22

<210> SEQ ID NO 133
<211> LENGTH: 22
<212> TYPE: DNA
<213> ORGANISM: Artificial Sequence
<220> FEATURE:
<223> OTHER INFORMATION: ADAMTS12 upstream primer

<400> SEQUENCE: 133
ccagtggaac gggaactata ag				22

<210> SEQ ID NO 134
<211> LENGTH: 20
<212> TYPE: DNA
<213> ORGANISM: Artificial Sequence
<220> FEATURE:
<223> OTHER INFORMATION: ADAMTS12 downstream primer

<400> SEQUENCE: 134
tcagaactct ccggctagaa					20

<210> SEQ ID NO 135
<211> LENGTH: 22
<212> TYPE: DNA
<213> ORGANISM: Artificial Sequence
<220> FEATURE:
<223> OTHER INFORMATION: GREM1 upstream primer

<400> SEQUENCE: 135
cctcctcaca atccatctct tc				22

<210> SEQ ID NO 136
<211> LENGTH: 22
<212> TYPE: DNA
<213> ORGANISM: Artificial Sequence
<220> FEATURE:
<223> OTHER INFORMATION: GREM1 downstream primer

<400> SEQUENCE: 136
cgtcttctct ttagcccaat ct				22

<210> SEQ ID NO 137
<211> LENGTH: 22
<212> TYPE: DNA
<213> ORGANISM: Artificial Sequence
<220> FEATURE:
<223> OTHER INFORMATION: COL3A1 upstream primer

<400> SEQUENCE: 137
cgaggtaaca gaggtgaaag ag				22

```
<210> SEQ ID NO 138
<211> LENGTH: 22
<212> TYPE: DNA
<213> ORGANISM: Artificial Sequence
<220> FEATURE:
<223> OTHER INFORMATION: COL3A1 downstream primer

<400> SEQUENCE: 138
ctggagagaa gtcgaaggaa tg                                           22

<210> SEQ ID NO 139
<211> LENGTH: 20
<212> TYPE: DNA
<213> ORGANISM: Artificial Sequence
<220> FEATURE:
<223> OTHER INFORMATION: SULF1 upstream primer

<400> SEQUENCE: 139
gagccatctt cacccattca                                              20

<210> SEQ ID NO 140
<211> LENGTH: 21
<212> TYPE: DNA
<213> ORGANISM: Artificial Sequence
<220> FEATURE:
<223> OTHER INFORMATION: SULF1 downstream primer

<400> SEQUENCE: 140
ccttcccatc catcccataa c                                            21

<210> SEQ ID NO 141
<211> LENGTH: 25
<212> TYPE: DNA
<213> ORGANISM: Artificial Sequence
<220> FEATURE:
<223> OTHER INFORMATION: GAPDH upstream primer

<400> SEQUENCE: 141
tgaggtccac caccctgttg ctgta                                        25

<210> SEQ ID NO 142
<211> LENGTH: 25
<212> TYPE: DNA
<213> ORGANISM: Artificial Sequence
<220> FEATURE:
<223> OTHER INFORMATION: GAPDH downstream primer

<400> SEQUENCE: 142
atgagcttga caaagtggtc gttga                                        25

<210> SEQ ID NO 143
<211> LENGTH: 25
<212> TYPE: DNA
<213> ORGANISM: Artificial Sequence
<220> FEATURE:
<223> OTHER INFORMATION: GUSB upstream primer

<400> SEQUENCE: 143
attgaagctg gagggaactg gcatg                                        25

<210> SEQ ID NO 144
<211> LENGTH: 25
<212> TYPE: DNA
<213> ORGANISM: Artificial Sequence
<220> FEATURE:
<223> OTHER INFORMATION: GUSB downstream primer
```

```
<400> SEQUENCE: 144
gcggccgccg gtaccactgc tcctc                                        25

<210> SEQ ID NO 145
<211> LENGTH: 25
<212> TYPE: DNA
<213> ORGANISM: Artificial Sequence
<220> FEATURE:
<223> OTHER INFORMATION: MRPL19 upstream primer

<400> SEQUENCE: 145
ctgttcttcc ccttcgagga atgaa                                        25

<210> SEQ ID NO 146
<211> LENGTH: 25
<212> TYPE: DNA
<213> ORGANISM: Artificial Sequence
<220> FEATURE:
<223> OTHER INFORMATION: MRPL19 downstream primer

<400> SEQUENCE: 146
tccacggggc ggtgcttgtc cacga                                        25

<210> SEQ ID NO 147
<211> LENGTH: 25
<212> TYPE: DNA
<213> ORGANISM: Artificial Sequence
<220> FEATURE:
<223> OTHER INFORMATION: PSMC4 upstream primer

<400> SEQUENCE: 147
tctggggccg ggacacggac agtgc                                        25

<210> SEQ ID NO 148
<211> LENGTH: 25
<212> TYPE: DNA
<213> ORGANISM: Artificial Sequence
<220> FEATURE:
<223> OTHER INFORMATION: PSMC4 downstream primer

<400> SEQUENCE: 148
cttctccacc aagatgccta tctcc                                        25

<210> SEQ ID NO 149
<211> LENGTH: 25
<212> TYPE: DNA
<213> ORGANISM: Artificial Sequence
<220> FEATURE:
<223> OTHER INFORMATION: SF3A1 upstream primer

<400> SEQUENCE: 149
gaatcctcct ttgaagatgc ttctt                                        25

<210> SEQ ID NO 150
<211> LENGTH: 25
<212> TYPE: DNA
<213> ORGANISM: Artificial Sequence
<220> FEATURE:
<223> OTHER INFORMATION: SF3A1 downstream primer

<400> SEQUENCE: 150
ggctgtttgg gctccgtggg cacgg                                        25

<210> SEQ ID NO 151
<211> LENGTH: 25
```

```
<212> TYPE: DNA
<213> ORGANISM: Artificial Sequence
<220> FEATURE:
<223> OTHER INFORMATION: TFRC upstream primer

<400> SEQUENCE: 151
cttttggaga tacgtaggga gagag                                              25

<210> SEQ ID NO 152
<211> LENGTH: 25
<212> TYPE: DNA
<213> ORGANISM: Artificial Sequence
<220> FEATURE:
<223> OTHER INFORMATION: TFRC downstream primer

<400> SEQUENCE: 152
cacgatcatt gagtttcttc atgac                                              25

<210> SEQ ID NO 153
<211> LENGTH: 20
<212> TYPE: DNA
<213> ORGANISM: Artificial Sequence
<220> FEATURE:
<223> OTHER INFORMATION: PLK1 forward primer

<400> SEQUENCE: 153
cagcaagtgg gtggactatt                                                    20

<210> SEQ ID NO 154
<211> LENGTH: 20
<212> TYPE: DNA
<213> ORGANISM: Artificial Sequence
<220> FEATURE:
<223> OTHER INFORMATION: PLK1 reverse primer

<400> SEQUENCE: 154
gtagaggatg aggcgtgttg                                                    20

<210> SEQ ID NO 155
<211> LENGTH: 21
<212> TYPE: DNA
<213> ORGANISM: Artificial Sequence
<220> FEATURE:
<223> OTHER INFORMATION: PRC1 forward primer

<400> SEQUENCE: 155
gaagtggatc ggttggaaga a                                                  21

<210> SEQ ID NO 156
<211> LENGTH: 21
<212> TYPE: DNA
<213> ORGANISM: Artificial Sequence
<220> FEATURE:
<223> OTHER INFORMATION: PRC1 reverse primer

<400> SEQUENCE: 156
tgtctctgct cctggctata a                                                  21

<210> SEQ ID NO 157
<211> LENGTH: 21
<212> TYPE: DNA
<213> ORGANISM: Artificial Sequence
<220> FEATURE:
<223> OTHER INFORMATION: CCNB1 forward primer

<400> SEQUENCE: 157
```
gatgcagaag atggagctga t                                     21

<210> SEQ ID NO 158
<211> LENGTH: 20
<212> TYPE: DNA
<213> ORGANISM: Artificial Sequence
<220> FEATURE:
<223> OTHER INFORMATION: CCNB1 reverse primer

<400> SEQUENCE: 158
tcccgaccca gtaggtattt                                       20

<210> SEQ ID NO 159
<211> LENGTH: 22
<212> TYPE: DNA
<213> ORGANISM: Artificial Sequence
<220> FEATURE:
<223> OTHER INFORMATION: MKI67 forward primer

<400> SEQUENCE: 159
gacctcaaac tggctcctaa tc                                    22

<210> SEQ ID NO 160
<211> LENGTH: 22
<212> TYPE: DNA
<213> ORGANISM: Artificial Sequence
<220> FEATURE:
<223> OTHER INFORMATION: MKI67 reverse primer

<400> SEQUENCE: 160
gctgccagat agagtcagaa ag                                    22

<210> SEQ ID NO 161
<211> LENGTH: 22
<212> TYPE: DNA
<213> ORGANISM: Artificial Sequence
<220> FEATURE:
<223> OTHER INFORMATION: TPX2 forward primer

<400> SEQUENCE: 161
gcaagagctg gagaagagta tg                                    22

<210> SEQ ID NO 162
<211> LENGTH: 21
<212> TYPE: DNA
<213> ORGANISM: Artificial Sequence
<220> FEATURE:
<223> OTHER INFORMATION: TPX2 reverse primer

<400> SEQUENCE: 162
tcttcacagg ttgccctatt c                                     21

<210> SEQ ID NO 163
<211> LENGTH: 20
<212> TYPE: DNA
<213> ORGANISM: Artificial Sequence
<220> FEATURE:
<223> OTHER INFORMATION: MELK forward primer

<400> SEQUENCE: 163
gtgctagaga cagccaacaa                                       20

<210> SEQ ID NO 164
<211> LENGTH: 20
<212> TYPE: DNA
<213> ORGANISM: Artificial Sequence

```
<220> FEATURE:
<223> OTHER INFORMATION: MELK reverse primer

<400> SEQUENCE: 164
caggcgatcc tgggaaatta                                                  20

<210> SEQ ID NO 165
<211> LENGTH: 20
<212> TYPE: DNA
<213> ORGANISM: Artificial Sequence
<220> FEATURE:
<223> OTHER INFORMATION: CDC20 forward primer

<400> SEQUENCE: 165
caaggagaac cagcctgaaa                                                  20

<210> SEQ ID NO 166
<211> LENGTH: 22
<212> TYPE: DNA
<213> ORGANISM: Artificial Sequence
<220> FEATURE:
<223> OTHER INFORMATION: CDC20 reverse primer

<400> SEQUENCE: 166
ggatcttggc ttcctctaca tc                                               22

<210> SEQ ID NO 167
<211> LENGTH: 20
<212> TYPE: DNA
<213> ORGANISM: Artificial Sequence
<220> FEATURE:
<223> OTHER INFORMATION: TYMS forward primer

<400> SEQUENCE: 167
caaccctgac gacagaagaa                                                  20

<210> SEQ ID NO 168
<211> LENGTH: 21
<212> TYPE: DNA
<213> ORGANISM: Artificial Sequence
<220> FEATURE:
<223> OTHER INFORMATION: TYMS reverse primer

<400> SEQUENCE: 168
gctcactgtt caccacatag a                                                21

<210> SEQ ID NO 169
<211> LENGTH: 22
<212> TYPE: DNA
<213> ORGANISM: Artificial Sequence
<220> FEATURE:
<223> OTHER INFORMATION: TOP2A forward primer

<400> SEQUENCE: 169
gacgcttcgt tatgggaaga ta                                               22

<210> SEQ ID NO 170
<211> LENGTH: 20
<212> TYPE: DNA
<213> ORGANISM: Artificial Sequence
<220> FEATURE:
<223> OTHER INFORMATION: TOP2A reverse primer

<400> SEQUENCE: 170
gggccagttg tgatggataa                                                  20
```

```
<210> SEQ ID NO 171
<211> LENGTH: 22
<212> TYPE: DNA
<213> ORGANISM: Artificial Sequence
<220> FEATURE:
<223> OTHER INFORMATION: P2RY13 forward primer

<400> SEQUENCE: 171
tctccttctg tccagcaaat ac                                              22

<210> SEQ ID NO 172
<211> LENGTH: 20
<212> TYPE: DNA
<213> ORGANISM: Artificial Sequence
<220> FEATURE:
<223> OTHER INFORMATION: P2RY13 reverse primer

<400> SEQUENCE: 172
ccctatcaca cacccaaaca                                                 20

<210> SEQ ID NO 173
<211> LENGTH: 22
<212> TYPE: DNA
<213> ORGANISM: Artificial Sequence
<220> FEATURE:
<223> OTHER INFORMATION: CCR2 forward primer

<400> SEQUENCE: 173
ggattgaaca aggacgcatt tc                                              22

<210> SEQ ID NO 174
<211> LENGTH: 20
<212> TYPE: DNA
<213> ORGANISM: Artificial Sequence
<220> FEATURE:
<223> OTHER INFORMATION: CCR2 reverse primer

<400> SEQUENCE: 174
caccgctctc gttggtattt                                                 20

<210> SEQ ID NO 175
<211> LENGTH: 22
<212> TYPE: DNA
<213> ORGANISM: Artificial Sequence
<220> FEATURE:
<223> OTHER INFORMATION: PTPRC forward primer

<400> SEQUENCE: 175
ctgaggaact tggagtctga tg                                              22

<210> SEQ ID NO 176
<211> LENGTH: 21
<212> TYPE: DNA
<213> ORGANISM: Artificial Sequence
<220> FEATURE:
<223> OTHER INFORMATION: PTPRC reverse primer

<400> SEQUENCE: 176
ggcacaagaa ggtaggagaa g                                               21

<210> SEQ ID NO 177
<211> LENGTH: 22
<212> TYPE: DNA
<213> ORGANISM: Artificial Sequence
<220> FEATURE:
<223> OTHER INFORMATION: IRF8 forward primer
```

<400> SEQUENCE: 177
agcatgtatc caggactgat tt                                              22

<210> SEQ ID NO 178
<211> LENGTH: 22
<212> TYPE: DNA
<213> ORGANISM: Artificial Sequence
<220> FEATURE:
<223> OTHER INFORMATION: IRF8 reverse primer

<400> SEQUENCE: 178
gaggcatcca cttcctgatt at                                              22

<210> SEQ ID NO 179
<211> LENGTH: 22
<212> TYPE: DNA
<213> ORGANISM: Artificial Sequence
<220> FEATURE:
<223> OTHER INFORMATION: CLEC10A forward primer

<400> SEQUENCE: 179
ccactccgat cgcaatagat aa                                              22

<210> SEQ ID NO 180
<211> LENGTH: 22
<212> TYPE: DNA
<213> ORGANISM: Artificial Sequence
<220> FEATURE:
<223> OTHER INFORMATION: CLEC10A reverse primer

<400> SEQUENCE: 180
ctagaagagg caaggccaat aa                                              22

<210> SEQ ID NO 181
<211> LENGTH: 22
<212> TYPE: DNA
<213> ORGANISM: Artificial Sequence
<220> FEATURE:
<223> OTHER INFORMATION: TLR7 forward primer

<400> SEQUENCE: 181
ctggaagacc caagagagaa ac                                              22

<210> SEQ ID NO 182
<211> LENGTH: 22
<212> TYPE: DNA
<213> ORGANISM: Artificial Sequence
<220> FEATURE:
<223> OTHER INFORMATION: TLR7 reverse primer

<400> SEQUENCE: 182
taagctgtat gctctgggaa ag                                              22

<210> SEQ ID NO 183
<211> LENGTH: 20
<212> TYPE: DNA
<213> ORGANISM: Artificial Sequence
<220> FEATURE:
<223> OTHER INFORMATION: CCR4 forward primer

<400> SEQUENCE: 183
gaagaacaag gcggtgaaga                                                 20

<210> SEQ ID NO 184

```
<211> LENGTH: 22
<212> TYPE: DNA
<213> ORGANISM: Artificial Sequence
<220> FEATURE:
<223> OTHER INFORMATION: CCR4 reverse primer

<400> SEQUENCE: 184
gggtctctag gaagagcact at                                            22

<210> SEQ ID NO 185
<211> LENGTH: 24
<212> TYPE: DNA
<213> ORGANISM: Artificial Sequence
<220> FEATURE:
<223> OTHER INFORMATION: IL7R forward primer

<400> SEQUENCE: 185
ggatgtagtc atcactccag aaag                                          24

<210> SEQ ID NO 186
<211> LENGTH: 22
<212> TYPE: DNA
<213> ORGANISM: Artificial Sequence
<220> FEATURE:
<223> OTHER INFORMATION: IL7R reverse primer

<400> SEQUENCE: 186
ggacctggaa gaggagagaa ta                                            22

<210> SEQ ID NO 187
<211> LENGTH: 22
<212> TYPE: DNA
<213> ORGANISM: Artificial Sequence
<220> FEATURE:
<223> OTHER INFORMATION: CD4 forward primer

<400> SEQUENCE: 187
ctagtggtgg gtactcaatg tg                                            22

<210> SEQ ID NO 188
<211> LENGTH: 21
<212> TYPE: DNA
<213> ORGANISM: Artificial Sequence
<220> FEATURE:
<223> OTHER INFORMATION: CD4 reverse primer

<400> SEQUENCE: 188
ccttcatccc tgctcgtaaa t                                             21

<210> SEQ ID NO 189
<211> LENGTH: 22
<212> TYPE: DNA
<213> ORGANISM: Artificial Sequence
<220> FEATURE:
<223> OTHER INFORMATION: SPOCK1 forward primer

<400> SEQUENCE: 189
tgctctctat acccgaccta ag                                            22

<210> SEQ ID NO 190
<211> LENGTH: 21
<212> TYPE: DNA
<213> ORGANISM: Artificial Sequence
<220> FEATURE:
<223> OTHER INFORMATION: SPOCK1 reverse primer

<400> SEQUENCE: 190
``` caacacccctt tctcccatac a							21

<210> SEQ ID NO 191
<211> LENGTH: 22
<212> TYPE: DNA
<213> ORGANISM: Artificial Sequence
<220> FEATURE:
<223> OTHER INFORMATION: COL1A1 forward primer

<400> SEQUENCE: 191
cctgtctgct tcctgtaaac tc							22

<210> SEQ ID NO 192
<211> LENGTH: 21
<212> TYPE: DNA
<213> ORGANISM: Artificial Sequence
<220> FEATURE:
<223> OTHER INFORMATION: COL1A1 reverse primer

<400> SEQUENCE: 192
gttcagtttg ggttgcttgt c							21

<210> SEQ ID NO 193
<211> LENGTH: 22
<212> TYPE: DNA
<213> ORGANISM: Artificial Sequence
<220> FEATURE:
<223> OTHER INFORMATION: POSTN forward primer

<400> SEQUENCE: 193
gagctttaca acgggcaaat ac							22

<210> SEQ ID NO 194
<211> LENGTH: 21
<212> TYPE: DNA
<213> ORGANISM: Artificial Sequence
<220> FEATURE:
<223> OTHER INFORMATION: POSTN reverse primer

<400> SEQUENCE: 194
ctcccttgct tactcccttt c							21

<210> SEQ ID NO 195
<211> LENGTH: 21
<212> TYPE: DNA
<213> ORGANISM: Artificial Sequence
<220> FEATURE:
<223> OTHER INFORMATION: ADAM12 forward primer

<400> SEQUENCE: 195
cactgccacc agtaggttat t							21

<210> SEQ ID NO 196
<211> LENGTH: 21
<212> TYPE: DNA
<213> ORGANISM: Artificial Sequence
<220> FEATURE:
<223> OTHER INFORMATION: ADAM12 reverse primer

<400> SEQUENCE: 196
gctcagctcc aagcagtata g							21

<210> SEQ ID NO 197
<211> LENGTH: 20
<212> TYPE: DNA

```
<213> ORGANISM: Artificial Sequence
<220> FEATURE:
<223> OTHER INFORMATION: COL6A2 forward primer

<400> SEQUENCE: 197
caacaactgc ccagagaaga                                               20

<210> SEQ ID NO 198
<211> LENGTH: 20
<212> TYPE: DNA
<213> ORGANISM: Artificial Sequence
<220> FEATURE:
<223> OTHER INFORMATION: COL6A2 reverse primer

<400> SEQUENCE: 198
catgtggaag agcaggatgt                                               20

<210> SEQ ID NO 199
<211> LENGTH: 23
<212> TYPE: DNA
<213> ORGANISM: Artificial Sequence
<220> FEATURE:
<223> OTHER INFORMATION: COL5A1 forward primer

<400> SEQUENCE: 199
gctctcttgt ggtgctatct atc                                           23

<210> SEQ ID NO 200
<211> LENGTH: 21
<212> TYPE: DNA
<213> ORGANISM: Artificial Sequence
<220> FEATURE:
<223> OTHER INFORMATION: COL5A1 reverse primer

<400> SEQUENCE: 200
acagactgtg gaggcaataa c                                             21

<210> SEQ ID NO 201
<211> LENGTH: 20
<212> TYPE: DNA
<213> ORGANISM: Artificial Sequence
<220> FEATURE:
<223> OTHER INFORMATION: ACTB forward primer

<400> SEQUENCE: 201
cactcttcca gccttccttc                                               20

<210> SEQ ID NO 202
<211> LENGTH: 20
<212> TYPE: DNA
<213> ORGANISM: Artificial Sequence
<220> FEATURE:
<223> OTHER INFORMATION: ACTB reverse primer

<400> SEQUENCE: 202
gtacaggtct ttgcggatgt                                               20

<210> SEQ ID NO 203
<211> LENGTH: 24
<212> TYPE: DNA
<213> ORGANISM: Artificial Sequence
<220> FEATURE:
<223> OTHER INFORMATION: PLK1 probe

<400> SEQUENCE: 203
atcacagagc tgatacccaa ggcc                                          24
```

<210> SEQ ID NO 204
<211> LENGTH: 24
<212> TYPE: DNA
<213> ORGANISM: Artificial Sequence
<220> FEATURE:
<223> OTHER INFORMATION: PRC1 probe

<400> SEQUENCE: 204
ttgaggcaat tcgagtggag ctgg                                         24

<210> SEQ ID NO 205
<211> LENGTH: 25
<212> TYPE: DNA
<213> ORGANISM: Artificial Sequence
<220> FEATURE:
<223> OTHER INFORMATION: CCNB1 probe

<400> SEQUENCE: 205
ttgaggaaga gcaagcagtc agacc                                        25

<210> SEQ ID NO 206
<211> LENGTH: 24
<212> TYPE: DNA
<213> ORGANISM: Artificial Sequence
<220> FEATURE:
<223> OTHER INFORMATION: MKI67 probe

<400> SEQUENCE: 206
cgggagcaga gccagtaaac ttcc                                         24

<210> SEQ ID NO 207
<211> LENGTH: 24
<212> TYPE: DNA
<213> ORGANISM: Artificial Sequence
<220> FEATURE:
<223> OTHER INFORMATION: TPX2 probe

<400> SEQUENCE: 207
caagaggtgg tggagatgcg gaaa                                         24

<210> SEQ ID NO 208
<211> LENGTH: 25
<212> TYPE: DNA
<213> ORGANISM: Artificial Sequence
<220> FEATURE:
<223> OTHER INFORMATION: MELK probe

<400> SEQUENCE: 208
ttcttgagta ctgccctgga ggaga                                        25

<210> SEQ ID NO 209
<211> LENGTH: 24
<212> TYPE: DNA
<213> ORGANISM: Artificial Sequence
<220> FEATURE:
<223> OTHER INFORMATION: CDC20 probe

<400> SEQUENCE: 209
agacgcccac caagaaggaa catc                                         24

<210> SEQ ID NO 210
<211> LENGTH: 23
<212> TYPE: DNA
<213> ORGANISM: Artificial Sequence
<220> FEATURE:

<223> OTHER INFORMATION: TYMS probe

<400> SEQUENCE: 210
agatcttcct ctgatggcgc tgc                                              23

<210> SEQ ID NO 211
<211> LENGTH: 24
<212> TYPE: DNA
<213> ORGANISM: Artificial Sequence
<220> FEATURE:
<223> OTHER INFORMATION: TOP2A probe

<400> SEQUENCE: 211
atggttccca catcaaaggc ttgc                                             24

<210> SEQ ID NO 212
<211> LENGTH: 24
<212> TYPE: DNA
<213> ORGANISM: Artificial Sequence
<220> FEATURE:
<223> OTHER INFORMATION: P2RY13 probe

<400> SEQUENCE: 212
atggcaccta ctcagcaatg cctt                                             24

<210> SEQ ID NO 213
<211> LENGTH: 24
<212> TYPE: DNA
<213> ORGANISM: Artificial Sequence
<220> FEATURE:
<223> OTHER INFORMATION: CCR2 probe

<400> SEQUENCE: 213
aaccgagaac gagatgtgga cagc                                             24

<210> SEQ ID NO 214
<211> LENGTH: 24
<212> TYPE: DNA
<213> ORGANISM: Artificial Sequence
<220> FEATURE:
<223> OTHER INFORMATION: PTPRC probe

<400> SEQUENCE: 214
aagcagccag cacgagagaa agat                                             24

<210> SEQ ID NO 215
<211> LENGTH: 24
<212> TYPE: DNA
<213> ORGANISM: Artificial Sequence
<220> FEATURE:
<223> OTHER INFORMATION: IRF8 probe

<400> SEQUENCE: 215
aatcttgctt gccagcgtgt ttcc                                             24

<210> SEQ ID NO 216
<211> LENGTH: 24
<212> TYPE: DNA
<213> ORGANISM: Artificial Sequence
<220> FEATURE:
<223> OTHER INFORMATION: CLEC10A probe

<400> SEQUENCE: 216
agtccaacca cttccctgtt tcca                                             24

```
<210> SEQ ID NO 217
<211> LENGTH: 25
<212> TYPE: DNA
<213> ORGANISM: Artificial Sequence
<220> FEATURE:
<223> OTHER INFORMATION: TLR7 probe

<400> SEQUENCE: 217
tctcgaggaa agggactggt tacca                                           25

<210> SEQ ID NO 218
<211> LENGTH: 24
<212> TYPE: DNA
<213> ORGANISM: Artificial Sequence
<220> FEATURE:
<223> OTHER INFORMATION: CCR4 probe

<400> SEQUENCE: 218
atctttgccg tggtggtcct cttc                                            24

<210> SEQ ID NO 219
<211> LENGTH: 23
<212> TYPE: DNA
<213> ORGANISM: Artificial Sequence
<220> FEATURE:
<223> OTHER INFORMATION: IL7R probe

<400> SEQUENCE: 219
attcatccct cacatgcctg gct                                             23

<210> SEQ ID NO 220
<211> LENGTH: 24
<212> TYPE: DNA
<213> ORGANISM: Artificial Sequence
<220> FEATURE:
<223> OTHER INFORMATION: CD4 probe

<400> SEQUENCE: 220
tttgggttca cagaagcaca gcac                                            24

<210> SEQ ID NO 221
<211> LENGTH: 24
<212> TYPE: DNA
<213> ORGANISM: Artificial Sequence
<220> FEATURE:
<223> OTHER INFORMATION: SPOCK1 probe

<400> SEQUENCE: 221
agacaactgc ttgttcccag agga                                            24

<210> SEQ ID NO 222
<211> LENGTH: 23
<212> TYPE: DNA
<213> ORGANISM: Artificial Sequence
<220> FEATURE:
<223> OTHER INFORMATION: COL1A1 probe

<400> SEQUENCE: 222
tccctcccac ccaaccaact ttc                                             23

<210> SEQ ID NO 223
<211> LENGTH: 24
<212> TYPE: DNA
<213> ORGANISM: Artificial Sequence
<220> FEATURE:
<223> OTHER INFORMATION: POSTN probe
```

<400> SEQUENCE: 223
catcggaggc aaacagctca gagt                                          24

<210> SEQ ID NO 224
<211> LENGTH: 25
<212> TYPE: DNA
<213> ORGANISM: Artificial Sequence
<220> FEATURE:
<223> OTHER INFORMATION: ADAM12 probe

<400> SEQUENCE: 224
agcttgggaa aggtggtgtt tctgt                                         25

<210> SEQ ID NO 225
<211> LENGTH: 24
<212> TYPE: DNA
<213> ORGANISM: Artificial Sequence
<220> FEATURE:
<223> OTHER INFORMATION: COL6A2 probe

<400> SEQUENCE: 225
cgaggtgtcc agcacgaagt acac                                          24

<210> SEQ ID NO 226
<211> LENGTH: 24
<212> TYPE: DNA
<213> ORGANISM: Artificial Sequence
<220> FEATURE:
<223> OTHER INFORMATION: COL5A1 probe

<400> SEQUENCE: 226
atgcctcgtt ctccctgctt tctt                                          24

<210> SEQ ID NO 227
<211> LENGTH: 24
<212> TYPE: DNA
<213> ORGANISM: Artificial Sequence
<220> FEATURE:
<223> OTHER INFORMATION: ACTB probe

<400> SEQUENCE: 227
agtttcgtgg atgccacagg actc                                          24

<210> SEQ ID NO 228
<211> LENGTH: 20
<212> TYPE: DNA
<213> ORGANISM: Artificial Sequence
<220> FEATURE:
<223> OTHER INFORMATION: PLK1 forward primer

<400> SEQUENCE: 228
cagcaagtgg gtggactatt                                               20

<210> SEQ ID NO 229
<211> LENGTH: 20
<212> TYPE: DNA
<213> ORGANISM: Artificial Sequence
<220> FEATURE:
<223> OTHER INFORMATION: PLK1 reverse primer

<400> SEQUENCE: 229
gtagaggatg aggcgtgttg                                               20

<210> SEQ ID NO 230
<211> LENGTH: 21

```
<212> TYPE: DNA
<213> ORGANISM: Artificial Sequence
<220> FEATURE:
<223> OTHER INFORMATION: PRC1 forward primer

<400> SEQUENCE: 230
gaagtggatc ggttggaaga a                                              21

<210> SEQ ID NO 231
<211> LENGTH: 21
<212> TYPE: DNA
<213> ORGANISM: Artificial Sequence
<220> FEATURE:
<223> OTHER INFORMATION: PRC1 reverse primer

<400> SEQUENCE: 231
tgtctctgct cctggctata a                                              21

<210> SEQ ID NO 232
<211> LENGTH: 21
<212> TYPE: DNA
<213> ORGANISM: Artificial Sequence
<220> FEATURE:
<223> OTHER INFORMATION: CCNB1 forward primer

<400> SEQUENCE: 232
gatgcagaag atggagctga t                                              21

<210> SEQ ID NO 233
<211> LENGTH: 20
<212> TYPE: DNA
<213> ORGANISM: Artificial Sequence
<220> FEATURE:
<223> OTHER INFORMATION: CCNB1 reverse primer

<400> SEQUENCE: 233
tcccgaccca gtaggtattt                                                20

<210> SEQ ID NO 234
<211> LENGTH: 22
<212> TYPE: DNA
<213> ORGANISM: Artificial Sequence
<220> FEATURE:
<223> OTHER INFORMATION: MKI67 forward primer

<400> SEQUENCE: 234
gacctcaaac tggctcctaa tc                                             22

<210> SEQ ID NO 235
<211> LENGTH: 22
<212> TYPE: DNA
<213> ORGANISM: Artificial Sequence
<220> FEATURE:
<223> OTHER INFORMATION: MKI67 reverse primer

<400> SEQUENCE: 235
gctgccagat agagtcagaa ag                                             22

<210> SEQ ID NO 236
<211> LENGTH: 22
<212> TYPE: DNA
<213> ORGANISM: Artificial Sequence
<220> FEATURE:
<223> OTHER INFORMATION: TPX2 forward primer

<400> SEQUENCE: 236
```
ggcctttctg gttctctagt tc                                                   22

<210> SEQ ID NO 237
<211> LENGTH: 23
<212> TYPE: DNA
<213> ORGANISM: Artificial Sequence
<220> FEATURE:
<223> OTHER INFORMATION: TPX2 reverse primer

<400> SEQUENCE: 237
cttctacctc agccattctc ttc                                                  23

<210> SEQ ID NO 238
<211> LENGTH: 20
<212> TYPE: DNA
<213> ORGANISM: Artificial Sequence
<220> FEATURE:
<223> OTHER INFORMATION: MELK forward primer

<400> SEQUENCE: 238
gtgctagaga cagccaacaa                                                      20

<210> SEQ ID NO 239
<211> LENGTH: 20
<212> TYPE: DNA
<213> ORGANISM: Artificial Sequence
<220> FEATURE:
<223> OTHER INFORMATION: MELK reverse primer

<400> SEQUENCE: 239
caggcgatcc tgggaaatta                                                      20

<210> SEQ ID NO 240
<211> LENGTH: 20
<212> TYPE: DNA
<213> ORGANISM: Artificial Sequence
<220> FEATURE:
<223> OTHER INFORMATION: CDC20 forward primer

<400> SEQUENCE: 240
caaggagaac cagcctgaaa                                                      20

<210> SEQ ID NO 241
<211> LENGTH: 22
<212> TYPE: DNA
<213> ORGANISM: Artificial Sequence
<220> FEATURE:
<223> OTHER INFORMATION: CDC20 reverse primer

<400> SEQUENCE: 241
ggatcttggc ttcctctaca tc                                                   22

<210> SEQ ID NO 242
<211> LENGTH: 22
<212> TYPE: DNA
<213> ORGANISM: Artificial Sequence
<220> FEATURE:
<223> OTHER INFORMATION: TOP2A forward primer

<400> SEQUENCE: 242
gacgcttcgt tatgggaaga ta                                                   22

<210> SEQ ID NO 243
<211> LENGTH: 20
<212> TYPE: DNA
<213> ORGANISM: Artificial Sequence

```
<220> FEATURE:
<223> OTHER INFORMATION: TOP2A reverse primer

<400> SEQUENCE: 243
gggccagttg tgatggataa                                               20

<210> SEQ ID NO 244
<211> LENGTH: 21
<212> TYPE: DNA
<213> ORGANISM: Artificial Sequence
<220> FEATURE:
<223> OTHER INFORMATION: P2RY13 forward primer

<400> SEQUENCE: 244
cccagagaca ctcggatagt a                                             21

<210> SEQ ID NO 245
<211> LENGTH: 20
<212> TYPE: DNA
<213> ORGANISM: Artificial Sequence
<220> FEATURE:
<223> OTHER INFORMATION: P2RY13 reverse primer

<400> SEQUENCE: 245
cacccacaga gccaaagtat                                               20

<210> SEQ ID NO 246
<211> LENGTH: 22
<212> TYPE: DNA
<213> ORGANISM: Artificial Sequence
<220> FEATURE:
<223> OTHER INFORMATION: CCR2 forward primer

<400> SEQUENCE: 246
ggattgaaca aggacgcatt tc                                            22

<210> SEQ ID NO 247
<211> LENGTH: 20
<212> TYPE: DNA
<213> ORGANISM: Artificial Sequence
<220> FEATURE:
<223> OTHER INFORMATION: CCR2 reverse primer

<400> SEQUENCE: 247
caccgctctc gttggtattt                                               20

<210> SEQ ID NO 248
<211> LENGTH: 21
<212> TYPE: DNA
<213> ORGANISM: Artificial Sequence
<220> FEATURE:
<223> OTHER INFORMATION: PTPRC forward primer

<400> SEQUENCE: 248
cggctgactt ccagatatga c                                             21

<210> SEQ ID NO 249
<211> LENGTH: 21
<212> TYPE: DNA
<213> ORGANISM: Artificial Sequence
<220> FEATURE:
<223> OTHER INFORMATION: PTPRC reverse primer

<400> SEQUENCE: 249
gctttgccct gtcacaaata c                                             21
```

```
<210> SEQ ID NO 250
<211> LENGTH: 20
<212> TYPE: DNA
<213> ORGANISM: Artificial Sequence
<220> FEATURE:
<223> OTHER INFORMATION: IRF8 forward primer

<400> SEQUENCE: 250
tggacatttc cgagccatac                                                   20

<210> SEQ ID NO 251
<211> LENGTH: 22
<212> TYPE: DNA
<213> ORGANISM: Artificial Sequence
<220> FEATURE:
<223> OTHER INFORMATION: IRF8 reverse primer

<400> SEQUENCE: 251
cgcactccat ctctgtaact tc                                                22

<210> SEQ ID NO 252
<211> LENGTH: 22
<212> TYPE: DNA
<213> ORGANISM: Artificial Sequence
<220> FEATURE:
<223> OTHER INFORMATION: CLEC10A forward primer

<400> SEQUENCE: 252
ccactccgat cgcaatagat aa                                                22

<210> SEQ ID NO 253
<211> LENGTH: 22
<212> TYPE: DNA
<213> ORGANISM: Artificial Sequence
<220> FEATURE:
<223> OTHER INFORMATION: CLEC10A reverse primer

<400> SEQUENCE: 253
ctagaagagg caaggccaat aa                                                22

<210> SEQ ID NO 254
<211> LENGTH: 22
<212> TYPE: DNA
<213> ORGANISM: Artificial Sequence
<220> FEATURE:
<223> OTHER INFORMATION: TLR7 forward primer

<400> SEQUENCE: 254
ctggaagacc caagagagaa ac                                                22

<210> SEQ ID NO 255
<211> LENGTH: 22
<212> TYPE: DNA
<213> ORGANISM: Artificial Sequence
<220> FEATURE:
<223> OTHER INFORMATION: TLR7 reverse primer

<400> SEQUENCE: 255
taagctgtat gctctgggaa ag                                                22

<210> SEQ ID NO 256
<211> LENGTH: 21
<212> TYPE: DNA
<213> ORGANISM: Artificial Sequence
<220> FEATURE:
<223> OTHER INFORMATION: IL7R forward primer
```

```
<400> SEQUENCE: 256
cctctgcacc agcagtaata a                                              21

<210> SEQ ID NO 257
<211> LENGTH: 21
<212> TYPE: DNA
<213> ORGANISM: Artificial Sequence
<220> FEATURE:
<223> OTHER INFORMATION: IL7R reverse primer

<400> SEQUENCE: 257
atcaaggagg tggaaggaat g                                              21

<210> SEQ ID NO 258
<211> LENGTH: 22
<212> TYPE: DNA
<213> ORGANISM: Artificial Sequence
<220> FEATURE:
<223> OTHER INFORMATION: SPOCK1 forward primer

<400> SEQUENCE: 258
tgctctctat acccgaccta ag                                             22

<210> SEQ ID NO 259
<211> LENGTH: 21
<212> TYPE: DNA
<213> ORGANISM: Artificial Sequence
<220> FEATURE:
<223> OTHER INFORMATION: SPOCK1 reverse primer

<400> SEQUENCE: 259
caacacccct tctcccatac a                                              21

<210> SEQ ID NO 260
<211> LENGTH: 20
<212> TYPE: DNA
<213> ORGANISM: Artificial Sequence
<220> FEATURE:
<223> OTHER INFORMATION: COL1A1 forward primer

<400> SEQUENCE: 260
ctaaaggcga acctggtgat                                                20

<210> SEQ ID NO 261
<211> LENGTH: 20
<212> TYPE: DNA
<213> ORGANISM: Artificial Sequence
<220> FEATURE:
<223> OTHER INFORMATION: COL1A1 reverse primer

<400> SEQUENCE: 261
tccaggagca ccaacattac                                                20

<210> SEQ ID NO 262
<211> LENGTH: 20
<212> TYPE: DNA
<213> ORGANISM: Artificial Sequence
<220> FEATURE:
<223> OTHER INFORMATION: POSTN forward primer

<400> SEQUENCE: 262
cggatcttgt ggcccaatta                                                20

<210> SEQ ID NO 263
```

```
<211> LENGTH: 22
<212> TYPE: DNA
<213> ORGANISM: Artificial Sequence
<220> FEATURE:
<223> OTHER INFORMATION: POSTN reverse primer

<400> SEQUENCE: 263
gctgatccat gctgagagta tc                                              22

<210> SEQ ID NO 264
<211> LENGTH: 21
<212> TYPE: DNA
<213> ORGANISM: Artificial Sequence
<220> FEATURE:
<223> OTHER INFORMATION: ADAM12 forward primer

<400> SEQUENCE: 264
tctggactgg aggaagatga a                                               21

<210> SEQ ID NO 265
<211> LENGTH: 22
<212> TYPE: DNA
<213> ORGANISM: Artificial Sequence
<220> FEATURE:
<223> OTHER INFORMATION: ADAM12 reverse primer

<400> SEQUENCE: 265
gatggtggtc ccttggaaat aa                                              22

<210> SEQ ID NO 266
<211> LENGTH: 20
<212> TYPE: DNA
<213> ORGANISM: Artificial Sequence
<220> FEATURE:
<223> OTHER INFORMATION: COL6A2 forward primer

<400> SEQUENCE: 266
caacaactgc ccagagaaga                                                 20

<210> SEQ ID NO 267
<211> LENGTH: 20
<212> TYPE: DNA
<213> ORGANISM: Artificial Sequence
<220> FEATURE:
<223> OTHER INFORMATION: COL6A2 reverse primer

<400> SEQUENCE: 267
catgtggaag agcaggatgt                                                 20

<210> SEQ ID NO 268
<211> LENGTH: 19
<212> TYPE: DNA
<213> ORGANISM: Artificial Sequence
<220> FEATURE:
<223> OTHER INFORMATION: COL5A1 forward primer

<400> SEQUENCE: 268
taccctgcgt ctgcatttc                                                  19

<210> SEQ ID NO 269
<211> LENGTH: 22
<212> TYPE: DNA
<213> ORGANISM: Artificial Sequence
<220> FEATURE:
<223> OTHER INFORMATION: COL5A1 reverse primer

<400> SEQUENCE: 269
``` gatacccctgc tcgttgtaga tg                                              22

<210> SEQ ID NO 270
<211> LENGTH: 23
<212> TYPE: DNA
<213> ORGANISM: Artificial Sequence
<220> FEATURE:
<223> OTHER INFORMATION: GAPDH forward primer

<400> SEQUENCE: 270
ggtgtgaacc atgagaagta tga                                              23

<210> SEQ ID NO 271
<211> LENGTH: 22
<212> TYPE: DNA
<213> ORGANISM: Artificial Sequence
<220> FEATURE:
<223> OTHER INFORMATION: GAPDH reverse primer

<400> SEQUENCE: 271
gagtccttcc acgataccaa ag                                               22

<210> SEQ ID NO 272
<211> LENGTH: 22
<212> TYPE: DNA
<213> ORGANISM: Artificial Sequence
<220> FEATURE:
<223> OTHER INFORMATION: GUSB forward primer

<400> SEQUENCE: 272
tgctggctac tacttgaaga tg                                               22

<210> SEQ ID NO 273
<211> LENGTH: 22
<212> TYPE: DNA
<213> ORGANISM: Artificial Sequence
<220> FEATURE:
<223> OTHER INFORMATION: GUSB reverse primer

<400> SEQUENCE: 273
ccttgtctgc tgcatagtta ga                                               22

<210> SEQ ID NO 274
<211> LENGTH: 20
<212> TYPE: DNA
<213> ORGANISM: Artificial Sequence
<220> FEATURE:
<223> OTHER INFORMATION: TFRC forward primer

<400> SEQUENCE: 274
tttccaccat ctcggtcatc                                                  20

<210> SEQ ID NO 275
<211> LENGTH: 22
<212> TYPE: DNA
<213> ORGANISM: Artificial Sequence
<220> FEATURE:
<223> OTHER INFORMATION: TFRC reverse primer

<400> SEQUENCE: 275
gggacagtct ccttccatat tc                                               22

<210> SEQ ID NO 276
<211> LENGTH: 24
<212> TYPE: DNA

```
<213> ORGANISM: Artificial Sequence
<220> FEATURE:
<223> OTHER INFORMATION: PLK1 probe

<400> SEQUENCE: 276
atcacagagc tgatacccaa ggcc                                          24

<210> SEQ ID NO 277
<211> LENGTH: 24
<212> TYPE: DNA
<213> ORGANISM: Artificial Sequence
<220> FEATURE:
<223> OTHER INFORMATION: PRC1 probe

<400> SEQUENCE: 277
ttgaggcaat tcgagtggag ctgg                                          24

<210> SEQ ID NO 278
<211> LENGTH: 25
<212> TYPE: DNA
<213> ORGANISM: Artificial Sequence
<220> FEATURE:
<223> OTHER INFORMATION: CCNB1 probe

<400> SEQUENCE: 278
ttgaggaaga gcaagcagtc agacc                                         25

<210> SEQ ID NO 279
<211> LENGTH: 24
<212> TYPE: DNA
<213> ORGANISM: Artificial Sequence
<220> FEATURE:
<223> OTHER INFORMATION: MKI67 probe

<400> SEQUENCE: 279
cgggagcaga gccagtaaac ttcc                                          24

<210> SEQ ID NO 280
<211> LENGTH: 24
<212> TYPE: DNA
<213> ORGANISM: Artificial Sequence
<220> FEATURE:
<223> OTHER INFORMATION: TPX2 probe

<400> SEQUENCE: 280
ctgccgctct ttggctctct tctc                                          24

<210> SEQ ID NO 281
<211> LENGTH: 25
<212> TYPE: DNA
<213> ORGANISM: Artificial Sequence
<220> FEATURE:
<223> OTHER INFORMATION: MELK probe

<400> SEQUENCE: 281
ttcttgagta ctgccctgga ggaga                                         25

<210> SEQ ID NO 282
<211> LENGTH: 24
<212> TYPE: DNA
<213> ORGANISM: Artificial Sequence
<220> FEATURE:
<223> OTHER INFORMATION: CDC20 probe

<400> SEQUENCE: 282
agacgcccac caagaaggaa catc                                          24
```

<210> SEQ ID NO 283
<211> LENGTH: 24
<212> TYPE: DNA
<213> ORGANISM: Artificial Sequence
<220> FEATURE:
<223> OTHER INFORMATION: TOP2A probe

<400> SEQUENCE: 283
atggttccca catcaaaggc ttgc                                             24

<210> SEQ ID NO 284
<211> LENGTH: 23
<212> TYPE: DNA
<213> ORGANISM: Artificial Sequence
<220> FEATURE:
<223> OTHER INFORMATION: P2RY13 probe

<400> SEQUENCE: 284
tttcttgacc ggcatcctgc tga                                              23

<210> SEQ ID NO 285
<211> LENGTH: 24
<212> TYPE: DNA
<213> ORGANISM: Artificial Sequence
<220> FEATURE:
<223> OTHER INFORMATION: CCR2 probe

<400> SEQUENCE: 285
aaccgagaac gagatgtgga cagc                                             24

<210> SEQ ID NO 286
<211> LENGTH: 24
<212> TYPE: DNA
<213> ORGANISM: Artificial Sequence
<220> FEATURE:
<223> OTHER INFORMATION: PTPRC probe

<400> SEQUENCE: 286
tccagaaagg caaagccaaa tgcc                                             24

<210> SEQ ID NO 287
<211> LENGTH: 24
<212> TYPE: DNA
<213> ORGANISM: Artificial Sequence
<220> FEATURE:
<223> OTHER INFORMATION: IRF8 probe

<400> SEQUENCE: 287
aatgcaaact aggcgtggca actg                                             24

<210> SEQ ID NO 288
<211> LENGTH: 24
<212> TYPE: DNA
<213> ORGANISM: Artificial Sequence
<220> FEATURE:
<223> OTHER INFORMATION: CLEC10A probe

<400> SEQUENCE: 288
agtccaacca cttccctgtt tcca                                             24

<210> SEQ ID NO 289
<211> LENGTH: 25
<212> TYPE: DNA
<213> ORGANISM: Artificial Sequence
<220> FEATURE:

```
<223> OTHER INFORMATION: TLR7 probe

<400> SEQUENCE: 289
tctcgaggaa agggactggt tacca                                              25

<210> SEQ ID NO 290
<211> LENGTH: 28
<212> TYPE: DNA
<213> ORGANISM: Artificial Sequence
<220> FEATURE:
<223> OTHER INFORMATION: IL7R probe

<400> SEQUENCE: 290
tgccataatc ccttaggttt gcctagtg                                           28

<210> SEQ ID NO 291
<211> LENGTH: 24
<212> TYPE: DNA
<213> ORGANISM: Artificial Sequence
<220> FEATURE:
<223> OTHER INFORMATION: SPOCK1 probe

<400> SEQUENCE: 291
agacaactgc ttgttcccag agga                                               24

<210> SEQ ID NO 292
<211> LENGTH: 24
<212> TYPE: DNA
<213> ORGANISM: Artificial Sequence
<220> FEATURE:
<223> OTHER INFORMATION: COL1A1 probe

<400> SEQUENCE: 292
ctggtgctaa aggcgatgct ggtc                                               24

<210> SEQ ID NO 293
<211> LENGTH: 25
<212> TYPE: DNA
<213> ORGANISM: Artificial Sequence
<220> FEATURE:
<223> OTHER INFORMATION: POSTN probe

<400> SEQUENCE: 293
tggagaatac actttgctgg cacct                                              25

<210> SEQ ID NO 294
<211> LENGTH: 24
<212> TYPE: DNA
<213> ORGANISM: Artificial Sequence
<220> FEATURE:
<223> OTHER INFORMATION: ADAM12 probe

<400> SEQUENCE: 294
cctcgcaaat cccatgacaa tgcg                                               24

<210> SEQ ID NO 295
<211> LENGTH: 24
<212> TYPE: DNA
<213> ORGANISM: Artificial Sequence
<220> FEATURE:
<223> OTHER INFORMATION: COL6A2 probe

<400> SEQUENCE: 295
cgaggtgtcc agcacgaagt acac                                               24
```

```
<210> SEQ ID NO 296
<211> LENGTH: 24
<212> TYPE: DNA
<213> ORGANISM: Artificial Sequence
<220> FEATURE:
<223> OTHER INFORMATION: COL5A1 probe

<400> SEQUENCE: 296
actgtgaaag ccaagaaagg cagc                                          24

<210> SEQ ID NO 297
<211> LENGTH: 24
<212> TYPE: DNA
<213> ORGANISM: Artificial Sequence
<220> FEATURE:
<223> OTHER INFORMATION: GAPDH probe

<400> SEQUENCE: 297
agatcatcag caatgcctcc tgca                                          24

<210> SEQ ID NO 298
<211> LENGTH: 24
<212> TYPE: DNA
<213> ORGANISM: Artificial Sequence
<220> FEATURE:
<223> OTHER INFORMATION: GUSB probe

<400> SEQUENCE: 298
tcgctcacac caaatccttg gacc                                          24

<210> SEQ ID NO 299
<211> LENGTH: 24
<212> TYPE: DNA
<213> ORGANISM: Artificial Sequence
<220> FEATURE:
<223> OTHER INFORMATION: TFRC probe

<400> SEQUENCE: 299
cagacaatct ccagagctgc tgca                                          24
```

GENE PANELS FOR MOLECULAR SUBTYPE AND SURVIVAL RISK ASSESSMENT OF LUNG ADENOCARCINOMA AND DIAGNOSTIC PRODUCTS AND APPLICATIONS THEREOF

CROSS-REFERENCE TO RELATED APPLICATION

This application is a Section 371 of International Application No. PCT/CN2020/111702 filed Aug. 27, 2020, which was published in the Chinese language Mar. 4, 2021, under International Publication No. WO 2021/0037134 A1, which claims the priority of the Chinese Patent Application No. 201910797167.8, entitled "Gene panels for molecular subtype and survival risk of primary lung adenocarcinoma, and diagnostic products and applications thereof" filed on Aug. 27, 2019, the disclosures of which is incorporated by reference herein in their entirety.

REFERENCE TO SEQUENCE LISTING SUBMITTED ELECTRONICALLY

This application contains a sequence listing, which is submitted electronically via EFS-Web as an ASCII formatted sequence listing with a file name "SequenceListing36US1" and a creation date of Feb. 22, 2022 and having a size of 56.9 kb. The sequence listing submitted via EFS-Web is part of the specification and is herein incorporated by reference in its entirety.

The present application claims the priority of the Chinese Patent Application No. 201910797167.8, entitled "Gene panels for molecular subtype and survival risk of primary lung adenocarcinoma, and diagnostic products and applications thereof" filed on Aug. 27, 2019, of which the content is incorporated herein in its entirety by reference.

TECHNICAL FIELD

The present disclosure relates to the field of biotechnology, and specifically relates to gene panels for determining the molecular subtype of lung adenocarcinoma and assessing the survival risk of a subject, in vitro diagnostic products and applications thereof.

BACKGROUND

At present, the most commonly used indications for the treatment of lung cancer are pathological typing and clinical staging. However, even for patients with the same histopathologic type and the same clinical stage and treated with the same method, the prognosis can be different. There are also great differences in individual response to drugs, drug adverse effects, and cancer outcome, suggesting that different individuals with lung cancer have different sensitivity to treatment and the occurrence of toxic and adverse effects. The occurrence, development, invasion and metastasis of lung cancer is a process of evolution from comprehensive effects of multiple factors and multiple stages. Therefore, it becomes a hot topic in recent years for choosing stable biomarkers to predict the prognosis of patients and the occurrence of toxic and adverse effects, to evaluate the therapeutic effect and the risk of death, and to perform research on individualized treatment.

At present, one popular new method is to detect the expression of relevant genes in lung cancer that may affect the prognosis by using tissue microarray and immunohistochemistry technology, with combination of the clinical pathological characteristics and prognosis data of the patient, and use of statistical methods to screen and construct the individualized prognosis prediction model for lung cancer with verification. After surgery for lung cancer patients, it can be used to predict the survival of lung cancer patients in 5 years or more. Patients with a low risk of recurrence may consider not receiving radiotherapy and chemotherapy to reduce the occurrence of adverse events and the economic burden of treatment; patients with a high risk of recurrence are advised to receive chemotherapy, radiotherapy or biological therapy in time, in order to receive the greatest clinical benefit. For patients with inoperable advanced stages, molecular diagnosis based on expression profiles can help identify groups that can benefit from a treatment plan, improve treatment efficiency, and avoid ineffective treatments. Research results show that a prognostic model combined with genomics can be used to perform better risk stratification and prognosis assessment for lung cancer patients than clinical parameters alone.

Lung cancer is mainly classified into two categories: small cell lung cancer (SCLC) and non-small cell lung cancer (NSCLC). The latter includes adenocarcinoma, squamous cell carcinoma, large cell carcinoma and other types, accounting for more than 80% of all lung cancers. Lung adenocarcinoma is the main type and its molecular pathogenesis is complex, and targeted therapies are relatively abundant. By studying expression profiles for lung adenocarcinoma and squamous cell lung carcinoma in the database, Faruki and Mayhew et al., (Faruki H, et al., Journal of thoracic oncology: official publication of the International Association for the Study of Lung Cancer. 2017, 12(6):943-53.) find that the gene expression profile for lung adenocarcinoma is significantly different from that of squamous cell lung carcinoma, and classifies lung adenocarcinoma into three subtypes of TRU, PP and PI and find that the molecular subtypes of lung adenocarcinoma can serve as markers for expression levels of tumor immune cells and PD-L1. Chinnaiyan et al. (Shukla S, et al., Journal of the National Cancer Institute. 2017, 109(1)) establishes a 4 gene combination, dividing the lung adenocarcinoma patents into high risk and low risk groups, where the prognosis of the high-risk group is significantly poorer than that of the low risk group.

SUMMARY

In an aspect, provided is a gene panel for determining the molecular subtype of lung adenocarcinoma and/or assessing the survival risk of a patient with lung adenocarcinoma, comprising molecular subtype and survival risk assessment related genes. In an embodiment, the gene panel further comprises a reference gene. The molecular subtype of lung adenocarcinoma comprises a LAD1 subtype, a LAD2 subtype, a LAD3 subtype, a LAD4 subtype, a LAD5 subtype and a mixed subtype.

In a further aspect, provided is an agent for detecting the expression levels of the genes in the gene panel according to the present disclosure. In a preferable embodiment, the agent is that for detecting the amount of RNA transcribed from the genes according to the present disclosure, particularly mRNA; or that for detecting the amount of cDNA complementary to the mRNA. In a specific embodiment, the agent is a primer(s), a probe(s) or a combination thereof.

In another aspect, provided is a product for determining the molecular subtype and/or assessing the survival risk of lung adenocarcinoma, comprising the agent according to the present disclosure. Provided is also use of the gene panel or agent according to the present discourse for the manufacture of a product. The product is useful for determining the molecular subtype of lung adenocarcinoma and/or assessing the survival risk of a patient with lung adenocarcinoma. In an embodiment, the product is a Next Generation Sequencing kit, a Real-time fluorescence quantitative PCR detection kit, a gene chip, a protein microarray, an ELISA diagnostic kit or an Immunohistochemistry (IHC) kit. In a preferable embodiment, the product is a Next Generation Sequencing kit or a Real-time fluorescence quantitative PCR detection kit.

In another aspect, provided is a method for determining the molecular subtype of lung adenocarcinoma and/or survival risk of a subject, comprising (1) providing a sample of the subject; (2) determining the expression levels of the genes in the gene panel according to the present disclosure in the sample; (3) determining the molecular subtype of lung adenocarcinoma and/or survival risk of the subject.

DETAILED DESCRIPTION

General Definition and Terms

Figure 1:
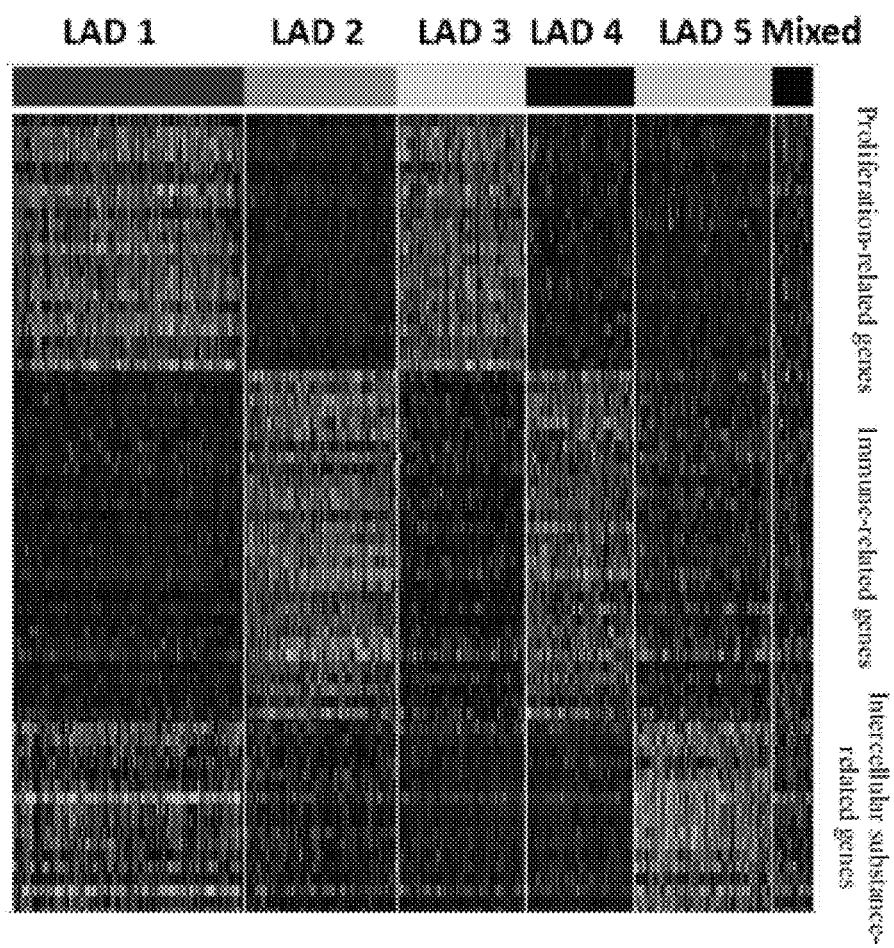
FIG. 1 shows an expression heatmap of lung adenocarcinoma molecular subtype and survival risk related genes (proliferation-related genes, immune-related genes and intercellular substance-related genes) in LAD1 subtype, LAD2 subtype, LAD3 subtype, LAD4 subtype, LAD5 subtype and mixed subtype (Mixed).

The present disclosure will be described in details below, and it should be noted that the description is provided for the purposed of illustration rather than limitation.

Unless otherwise stated, the technical and scientific terms used herein have the same meaning as commonly understood by a person skilled in the art. If there is a contradiction, the definition provided in this application shall prevail. The experimental methods that are not specified herein, can usually, for example follow the conventional conditions those described in Sambrook et al., Molecular Cloning: A Laboratory Manual, $4^{th}$ ed, Cold Spring Harbor, N.Y., 2012, or according to the those recommended by the manufacturer.

When a certain amount, concentration, or other value or parameter is set forth in the form of a range, a preferred range, or a preferred upper limit or a preferred lower limit, it should be understood that it is equivalent to specifically revealing any range formed by combining any upper limit or preferred value with any lower limit or preferred value, regardless of whether the said range is explicitly recited. Unless otherwise stated, the numerical ranges listed herein are intended to include the endpoints of the range and all integers and fractions (decimals) within the range.

When used with a numerical variable, the term "approximate" or "about" usually refers to the value of the variable and all the values of the variable within the experimental error (for example, within an average 95% confidence interval) or within ±10% of the specified value, or a wider range.

The term "optional" or "optionally" means a subsequently described event or circumstance may or may not occur and that the description includes instances when the event or circumstance occurs and instances in which it does not.

The expression "comprise" or its synonyms "contain", "include", "have" or the like are meant to be inclusive, which does not exclude other unlisted elements, steps or ingredients. The expression "consist of" excludes any unlisted elements, steps or ingredients. The expression "substantially consist of" refers to specified elements, steps or ingredients within a given range, together with optional elements, steps or ingredients which do not substantively affect the basic and novel feature of the claimed subject matter. It should be understood that the expression "comprise" encompasses the expressions "substantially consist of" and "consist of".

The expression "at least one" or "one or more" refers to 1, 2, 3, 4, 5, 6, 7, 8, 9, or more. The detection of gene expression level herein can be achieved, for example, by detecting target nucleic acid (e.g., RNA transcript), or, for example, by detecting the amount of target polypeptide (e.g., encoded protein), e.g., using proteomics method to detect protein expression level. The amount of target polypeptide, such as the amount of polypeptide, protein or protein fragment encoded by the target gene, can be standardized against the amount of total protein in the sample or the amount of polypeptide encoded by the reference gene. The amount of target nucleic acid, such as the DNA of the target gene, its RNA transcript or the amount of cDNA complementary to the RNA transcript, can be standardized against the amount of total DNA, total RNA or total cDNA in the sample, or the amount of DNA, RNA transcript of a set of reference genes or cDNA complementary to the RNA transcript.

The term "polypeptide" herein refers to a compound composed of amino acids connected by peptide bonds, including full-length polypeptide or amino acid fragment. "Polypeptide" and "protein" can be used interchangeably herein.

The term "nucleotide" comprises deoxyribonucleotide and ribonucleotide. The term "nucleic acid" refers to a polymer composed of two or more nucleotides, encompassing deoxyribonucleic acid (DNA), ribonucleic acid (RNA) and nucleic acid analog.

The term "RNA transcript" refers to total RNA, that is, coding or non-coding RNA, including RNA directly derived from tissue or peripheral blood sample and RNA indirectly derived from tissue or blood sample after cell lysis. Total RNA includes tRNA, mRNA and rRNA, where mRNA includes that transcribed from the target gene and that from other non-target gene. The term "mRNA" can include precursor mRNA and mature mRNA, either the full-length mRNA or its fragment. The RNA herein that can be used for detection is preferably mRNA, and more preferably mature mRNA. The term "cDNA" refers to DNA with a base sequence complementary to RNA. Those skilled in the art can apply methods known in the art to obtain the RNA transcript and/or cDNA complementary to its RNA transcript from the DNA of the gene, for example, by a chemical synthesis method or a molecular cloning method.

The target nucleic acid (e.g., RNA transcript) herein can be detected and quantified, for example, by hybridization, amplification or sequencing. For example, the RNA transcript is hybridized with a probe(s) or a primer(s) to form a complex, and the amount of the target nucleic acid is obtained by detecting the amount of the complex. The term "hybridization" refers to the process of combining two nucleic acid fragments via stable and specific hydrogen bonds to form a double helix complex under appropriate conditions.

The term "amplification primer" or "primer" refers to a nucleic acid fragment containing 5-100 nucleotides, preferably, 15-30 nucleotides capable of initiating an enzymatic reaction (e.g., an enzymatic amplification reaction).

The term "(hybridization) probe" refers to a nucleic acid sequence (can be DNA or RNA) that includes at least 5 nucleotides, for example, 5-100 nucleotides and can hybridize to a target nucleic acid (e.g., RNA transcript of the target gene or amplified product of the RNA transcript, or cDNA complementary to the RNA transcript) to form a complex under specific conditions. A hybridization probe can also include a label for detection. The term "TaqMan probe" is a probe based on TaqMan technology. Its 5'-end carries a fluorescent group, such as FAM, TET, HEX, NED, VIC or Cy5, etc., and its 3'-end carries a fluorescence quenching group (e.g., TAMRA and BHQ group) or non-fluorescence quenching group (TaqMan MGB probe). It has a nucleotide sequence that can hybridize to the target nucleic acid and can report the amount of nucleic acid forming a complex with it when applied to Real-time fluorescence quantitative PCR (RT-PCR).

The term "reference gene" or "internal reference gene" herein refers to a gene that can be used as a reference to correct and normalize the expression level of the target gene. The reference gene inclusion criteria that can be considered are: (1) expression in tissues is stable, and expression level is not affected by pathological condition or drug treatment or less affected; (2) the expression level should not be too high, to avoid a high proportion of the data acquired from the expression data (such as, those obtained through Next Generation Sequencing), which will affect the accuracy of data detection and interpretation of other genes. Therefore, an agent that can be used to detect the expression level of the reference gene according to the present disclosure is also encompassed within the protection scope of the present disclosure. Reference gene that can be used in the present invention includes but are not limited to "house-keeping gene." "Reference gene," "internal reference gene," and "house-keeping gene" can be used interchangeably.

The term "house-keeping gene" refers to a type of genes whose products are necessary to maintain the basic life activities of cells and are continuously expressed in most or almost all tissues at various stages of individual growth, and the expression levels are less affected by environmental factors.

The term "lung adenocarcinoma" herein refers to a type of lung cancer that belongs to non-small cell lung cancer and originates from the bronchial mucosal epithelium, with a small number of them originating from the mucous glands of the large bronchi. The incidence rate is lower than that of squamous cell carcinoma and undifferentiated carcinoma. The age of onset is relatively young, and it is relatively more common in women. Most adenocarcinomas originate from smaller bronchial tubes and are peripheral lung cancers. Lung adenocarcinoma is more likely to occur in young women with a history of smoking and Asian ethnicity. Lung adenocarcinoma herein includes but is not limited to primary lung adenocarcinoma and metastatic lung adenocarcinoma.

The term "lung adenocarcinoma molecular subtype" herein refers to a lung adenocarcinoma classification method based on the gene expression profile of lung adenocarcinoma tumor tissue.

The term "prognosis" herein refers to the prediction of the course and development of lung adenocarcinoma, including but not limited to the prediction of lung adenocarcinoma survival risk. Lung cancer with a lower survival risk has a better prognosis, and vice versa.

The "survival risk assessment" herein refers to the assessment of the likelihood of a patient with lung adenocarcinoma disease progression or death due to lung adenocarcinoma and related causes within a specified period starting from random. The "disease progression" herein includes but is not limited to tumor cell increase, recurrence and metastasis. The terms "recurrence risk" and "survival risk" herein can be used interchangeably. Survival risk score (also called survival risk index) is calculated herein to carry out survival risk assessment.

Gene Panel According to the Present Disclosure

In a general aspect, provided is a gene panel, comprising lung adenocarcinoma molecular subtype and survival risk assessment related genes.

The lung adenocarcinoma molecular subtype and survival risk assessment related genes according to the present disclosure may comprise: (1) 69 proliferation-related genes, (2) 73 immune-related genes, and (3) 38 intercellular substance-related genes.

(1) 69 proliferation-related genes comprise: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TYMS, TOP2A, PBK, CDC45, CDCA8, CENPA, MYBL2, SKA1, MCM10, TRIP13, TROAP, POLQ, GINS1 and RAD54L.

(2) 73 immune-related genes comprise: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2D1A, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCD1LG2, C1QA, SLAMF8, VSIG4, CD163, LAIR1, SLAMF7 and MS4A4A.

(3) 38 intercellular substance-related genes comprise: LOXL2, SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1, SULF1, ADAMTS2, PRRX1, COL15A1, SPARC, THY1, FAP, DIO2, FN1, COL6A3, FBN1, SYNDIG1, AEBP1, LRRC15, CILP, ISLR, GAS1, COL10A1, ASPN, MMP2 and EPYC.

In a specific aspect, provided is a gene panel, comprising lung adenocarcinoma molecular subtype and survival risk assessment related genes, that is, (1) one or more of the 69 proliferation-related genes, (2) one or more of the 73 immune-related genes, and (3) one or more of the 38 intercellular substance-related genes as described above.

In an embodiment, the gene panel comprises 180 lung adenocarcinoma molecular subtype and survival risk assessment related genes (see, Table 1), comprising the above (1) 69 proliferation-related genes; (2) 73 immune-related genes, and (3) 38 intercellular substance-related genes.

In another embodiment, the gene panel comprises 70 lung adenocarcinoma molecular subtype and survival risk assessment related genes (see, Table 2), comprising (1) 23 proliferation-related genes: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A; (2) 30 immune-related genes: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; and (3) 17 intercellular substance-related genes: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1.

In another embodiment, the gene panel comprises 24 lung adenocarcinoma molecular subtype and survival risk assessment related genes (see, Table 3), comprising (1) 9 proliferation-related genes: PLK1, PRC1, CCNB1, MKI67, TPX2, MELK, CDC20, TYMS and TOP2A; (2) 9 immune-related genes: P2RY13, CCR2, PTPRC, IRF8, CLEC10A, TLR7, CCR4, IL7R and CD4; and (3) 6 intercellular substance-related genes: SPOCK1, COL1A1, POSTN, ADAM12, COL6A2 and COL5A1.

In another embodiment, the gene panel comprise 21 lung adenocarcinoma molecular subtype and survival risk assessment related genes (see, Table 4), comprising (1) 8 proliferation-related genes: PLK1, PRC1, CCNB1, MKI67, TPX2, MELK, CDC20 and TOP2A; (2) 7 immune-related genes: P2RY13, CCR2, PTPRC, IRF8, CLEC10A, TLR7 and IL7R; and (3) 6 intercellular substance-related genes: SPOCK1, COL1A1, POSTN, ADAM12, COL6A2 and COL5A1.

In a preferable embodiment, the gene panel may further comprise a reference gene(s). Preferably, the reference gene(s) is a house-keeping gene(s). The house-keeping gene(s) which may be used according to the present disclosure comprises but is not limited to one or more of the following: GAPDH, GUSB, MRPL19, PSMC4, SF3A1, TFRC, ACTB and RPLP0. In an embodiment, the gene panel according to the present disclosure may comprise at least one (e.g., 1, 2, 3, 4, 5, 6, 7 or 8), preferably at least 3, most preferably 6 reference genes of the following: GAPDH, GUSB, MRPL19, PSMC4, SF3A1, TFRC, ACTB and RPLP0. In a specific embodiment, the reference gene(s) comprises GAPDH, GUSB, MRPL19, PSMC4, SF3A1 and TFRC. In another specific embodiment, the reference gene(s) comprises GAPDH, GUSB and TFRC. In yet another specific embodiment, the reference gene(s) comprises ACTB.

In a preferable embodiment, the gene panel according to the present disclosure comprises the above 180 molecular subtype and survival risk assessment related genes, and a reference gene(s). In a specific embodiment, the reference gene(s) comprises GAPDH, GUSB, MRPL19, PSMC4, SF3A1 and TFRC. The gene panel is as shown in Table 1.

In another preferable embodiment, the gene panel according to the present disclosure comprises the above 70 molecular subtype and survival risk assessment related genes, and a reference gene(s). In a specific embodiment, the reference gene(s) comprises GAPDH, GUSB, MRPL19, PSMC4, SF3A1 and TFRC. The gene panel is as shown in Table 2.

In another preferable embodiment, the gene panel according to the present disclosure comprises the above 24 molecular subtype and survival risk assessment related genes, and a reference gene(s). In a specific embodiment, the reference gene(s) comprises ACTB. The gene panel is as shown in Table 3.

In another preferable embodiment, the gene panel according to the present disclosure comprises the above 21 molecular subtype and survival risk assessment related genes, and a reference gene(s). In an embodiment, the reference gene(s) comprises three of GAPDH, GUSB, MRPL19, PSMC4, SF3A1 and TFRC. In a specific embodiment, the reference gene(s) comprises GAPDH, GUSB and TFRC. The gene panel is as shown in Table 4.

TABLE 1

| No. | Function | Gene Name |
| --- | --- | --- |
| 1 | proliferation-related gene | PLK1 |
| 2 | proliferation-related gene | PRC1 |
| 3 | proliferation-related gene | CCNB1 |
| 4 | proliferation-related gene | DLGAP5 |
| 5 | proliferation-related gene | KPNA2 |
| 6 | proliferation-related gene | CCNA2 |
| 7 | proliferation-related gene | RRM2 |
| 8 | proliferation-related gene | HMMR |
| 9 | proliferation-related gene | KIF20A |
| 10 | proliferation-related gene | FOXM1 |
| 11 | proliferation-related gene | MKI67 |
| 12 | proliferation-related gene | KIF14 |
| 13 | proliferation-related gene | TK1 |
| 14 | proliferation-related gene | HJURP |
| 15 | proliferation-related gene | TPX2 |
| 16 | proliferation-related gene | EXO1 |
| 17 | proliferation-related gene | KIF11 |
| 18 | proliferation-related gene | NEK2 |
| 19 | proliferation-related gene | KIF23 |
| 20 | proliferation-related gene | CDCA3 |
| 21 | proliferation-related gene | CDK1 |
| 22 | proliferation-related gene | SPAG5 |
| 23 | proliferation-related gene | KIF4A |
| 24 | proliferation-related gene | GTSE1 |
| 25 | proliferation-related gene | CDKN3 |
| 26 | proliferation-related gene | CDC25C |
| 27 | proliferation-related gene | PRR11 |
| 28 | proliferation-related gene | CCNB2 |
| 29 | proliferation-related gene | MAD2L1 |
| 30 | proliferation-related gene | PKMYT1 |
| 31 | proliferation-related gene | CENPE |
| 32 | proliferation-related gene | ASPM |
| 33 | proliferation-related gene | CENPF |
| 34 | proliferation-related gene | BUB1 |
| 35 | proliferation-related gene | NDC80 |
| 36 | proliferation-related gene | NUSAP1 |
| 37 | proliferation-related gene | CEP55 |
| 38 | proliferation-related gene | NCAPG |
| 39 | proliferation-related gene | BIRC5 |

TABLE 1-continued

| No. | Function | Gene Name |
|---|---|---|
| 40 | proliferation-related gene | ZWINT |
| 41 | proliferation-related gene | TTK |
| 42 | proliferation-related gene | ESPL1 |
| 43 | proliferation-related gene | DEPDC1 |
| 44 | proliferation-related gene | MELK |
| 45 | proliferation-related gene | CDC20 |
| 46 | proliferation-related gene | CDC6 |
| 47 | proliferation-related gene | AURKA |
| 48 | proliferation-related gene | NEIL3 |
| 49 | proliferation-related gene | CDT1 |
| 50 | proliferation-related gene | KIF2C |
| 51 | proliferation-related gene | KIFC1 |
| 52 | proliferation-related gene | NCAPH |
| 53 | proliferation-related gene | KIF18B |
| 54 | proliferation-related gene | AURKB |
| 55 | proliferation-related gene | UBE2C |
| 56 | proliferation-related gene | TOP2A |
| 57 | proliferation-related gene | TYMS |
| 58 | proliferation-related gene | PBK |
| 59 | proliferation-related gene | CDC45 |
| 60 | proliferation-related gene | CDCA8 |
| 61 | proliferation-related gene | CENPA |
| 62 | proliferation-related gene | MYBL2 |
| 63 | proliferation-related gene | SKA1 |
| 64 | proliferation-related gene | MCM10 |
| 65 | proliferation-related gene | TRIP13 |
| 66 | proliferation-related gene | TROAP |
| 67 | proliferation-related gene | POLQ |
| 68 | proliferation-related gene | GINS1 |
| 69 | proliferation-related gene | RAD54L |
| 70 | immune-related gene | P2RY13 |
| 71 | immune-related gene | CCR2 |
| 72 | immune-related gene | PTPRC |
| 73 | immune-related gene | IRF8 |
| 74 | immune-related gene | CLEC10A |
| 75 | immune-related gene | TLR7 |
| 76 | immune-related gene | CCR4 |
| 77 | immune-related gene | IL7R |
| 78 | immune-related gene | SPN |
| 79 | immune-related gene | SASH3 |
| 80 | immune-related gene | CSF2RB |
| 81 | immune-related gene | CD37 |
| 82 | immune-related gene | IKZF1 |
| 83 | immune-related gene | CD48 |
| 84 | immune-related gene | IL10RA |
| 85 | immune-related gene | EVI2B |
| 86 | immune-related gene | IGSF6 |
| 87 | immune-related gene | CD52 |
| 88 | immune-related gene | DOCK2 |
| 89 | immune-related gene | CD84 |
| 90 | immune-related gene | FGL2 |
| 91 | immune-related gene | FOLR2 |
| 92 | immune-related gene | NCKAP1L |
| 93 | immune-related gene | TRAC |
| 94 | immune-related gene | MNDA |
| 95 | immune-related gene | MRC1 |
| 96 | immune-related gene | PLEK |
| 97 | immune-related gene | LCP1 |
| 98 | immune-related gene | SPIB |
| 99 | immune-related gene | CD53 |
| 100 | immune-related gene | CD3E |
| 101 | immune-related gene | SLCO2B1 |
| 102 | immune-related gene | MS4A6A |
| 103 | immune-related gene | CYBB |
| 104 | immune-related gene | CD4 |
| 105 | immune-related gene | SH2D1A |
| 106 | immune-related gene | TFEC |
| 107 | immune-related gene | LYZ |
| 108 | immune-related gene | ITGAM |
| 109 | immune-related gene | TLR8 |
| 110 | immune-related gene | CSF1R |
| 111 | immune-related gene | CXCL13 |
| 112 | immune-related gene | GPNMB |
| 113 | immune-related gene | CCR5 |
| 114 | immune-related gene | HK3 |
| 115 | immune-related gene | CMKLR1 |
| 116 | immune-related gene | IL2RG |
| 117 | immune-related gene | TYROBP |
| 118 | immune-related gene | HCK |
| 119 | immune-related gene | ITGB2 |
| 120 | immune-related gene | LAPTM5 |
| 121 | immune-related gene | SIGLEC1 |
| 122 | immune-related gene | AOAH |
| 123 | immune-related gene | C3AR1 |
| 124 | immune-related gene | MSR1 |
| 125 | immune-related gene | IL2RA |
| 126 | immune-related gene | CCL5 |
| 127 | immune-related gene | ADAMDEC1 |
| 128 | immune-related gene | LILRB4 |
| 129 | immune-related gene | CXCL11 |
| 130 | immune-related gene | FPR3 |
| 131 | immune-related gene | SELL |
| 132 | immune-related gene | CXCL10 |
| 133 | immune-related gene | UBD |
| 134 | immune-related gene | C1QB |
| 135 | immune-related gene | PDCD1LG2 |
| 136 | immune-related gene | C1QA |
| 137 | immune-related gene | SLAMF8 |
| 138 | immune-related gene | VSIG4 |
| 139 | immune-related gene | CD163 |
| 140 | immune-related gene | LAIR1 |
| 141 | immune-related gene | SLAMF7 |
| 142 | immune-related gene | MS4A4A |
| 143 | intercellular substance-related gene | LOXL2 |
| 144 | intercellular substance-related gene | SPOCK1 |
| 145 | intercellular substance-related gene | COL1A1 |
| 146 | intercellular substance-related gene | POSTN |
| 147 | intercellular substance-related gene | ADAM12 |
| 148 | intercellular substance-related gene | COL6A2 |
| 149 | intercellular substance-related gene | COL5A1 |
| 150 | intercellular substance-related gene | COL11A1 |
| 151 | intercellular substance-related gene | COL5A2 |
| 152 | intercellular substance-related gene | COL1A2 |
| 153 | intercellular substance-related gene | MXRA5 |
| 154 | intercellular substance-related gene | THBS2 |
| 155 | intercellular substance-related gene | INHBA |
| 156 | intercellular substance-related gene | VCAN |
| 157 | intercellular substance-related gene | ADAMTS12 |
| 158 | intercellular substance-related gene | GREM1 |
| 159 | intercellular substance-related gene | COL3A1 |
| 160 | intercellular substance-related gene | SULF1 |
| 161 | intercellular substance-related gene | ADAMTS2 |
| 162 | intercellular substance-related gene | PRRX1 |
| 163 | intercellular substance-related gene | COL15A1 |
| 164 | intercellular substance-related gene | SPARC |
| 165 | intercellular substance-related gene | THY1 |
| 166 | intercellular substance-related gene | FAP |
| 167 | intercellular substance-related gene | DIO2 |
| 168 | intercellular substance-related gene | FN1 |
| 169 | intercellular substance-related gene | COL6A3 |
| 170 | intercellular substance-related gene | FBN1 |
| 171 | intercellular substance-related gene | SYNDIG1 |
| 172 | intercellular substance-related gene | AEBP1 |
| 173 | intercellular substance-related gene | LRRC15 |
| 174 | intercellular substance-related gene | CILP |
| 175 | intercellular substance-related gene | ISLR |
| 176 | intercellular substance-related gene | GAS1 |
| 177 | intercellular substance-related gene | COL10A1 |
| 178 | intercellular substance-related gene | ASPN |
| 179 | intercellular substance-related gene | MMP2 |
| 180 | intercellular substance-related gene | EPYC |
| 181 | house-keeping gene | GAPDH |
| 182 | house-keeping gene | GUSB |
| 183 | house-keeping gene | MRPL19 |
| 184 | house-keeping gene | PSMC4 |
| 185 | house-keeping gene | SF3A1 |
| 186 | house-keeping gene | TFRC |

TABLE 2

| No. | Function | Gene Name |
|---|---|---|
| 1 | proliferation-related gene | PLK1 |
| 2 | proliferation-related gene | PRC1 |
| 3 | proliferation-related gene | CCNB1 |
| 4 | proliferation-related gene | DLGAP5 |
| 5 | proliferation-related gene | KPNA2 |
| 6 | proliferation-related gene | CCNA2 |
| 7 | proliferation-related gene | RRM2 |
| 8 | proliferation-related gene | FOXM1 |
| 9 | proliferation-related gene | MKI67 |
| 10 | proliferation-related gene | KIF14 |
| 11 | proliferation-related gene | HJURP |
| 12 | proliferation-related gene | TPX2 |
| 13 | proliferation-related gene | NEK2 |
| 14 | proliferation-related gene | CDK1 |
| 15 | proliferation-related gene | CDKN3 |
| 16 | proliferation-related gene | ASPM |
| 17 | proliferation-related gene | CEP55 |
| 18 | proliferation-related gene | BIRC5 |
| 19 | proliferation-related gene | MELK |
| 20 | proliferation-related gene | CDC20 |
| 21 | proliferation-related gene | TYMS |
| 22 | proliferation-related gene | AURKA |
| 23 | proliferation-related gene | TOP2A |
| 24 | immune-related gene | P2RY13 |
| 25 | immune-related gene | CCR2 |
| 26 | immune-related gene | PTPRC |
| 27 | immune-related gene | IRF8 |
| 28 | immune-related gene | CLEC10A |
| 29 | immune-related gene | TLR7 |
| 30 | immune-related gene | CCR4 |
| 31 | immune-related gene | IL7R |
| 32 | immune-related gene | SPN |
| 33 | immune-related gene | SASH3 |
| 34 | immune-related gene | CSF2RB |
| 35 | immune-related gene | CD37 |
| 36 | immune-related gene | IKZF1 |
| 37 | immune-related gene | CD48 |
| 38 | immune-related gene | IL10RA |
| 39 | immune-related gene | EVI2B |
| 40 | immune-related gene | IGSF6 |
| 41 | immune-related gene | CD52 |
| 42 | immune-related gene | DOCK2 |
| 43 | immune-related gene | CD84 |
| 44 | immune-related gene | FOLR2 |
| 45 | immune-related gene | NCKAP1L |
| 46 | immune-related gene | TRAC |
| 47 | immune-related gene | MNDA |
| 48 | immune-related gene | MRC1 |
| 49 | immune-related gene | PLEK |
| 50 | immune-related gene | SPIB |
| 51 | immune-related gene | CD53 |
| 52 | immune-related gene | CD4 |
| 53 | immune-related gene | LYZ |
| 54 | intercellular substance-related gene | SPOCK1 |
| 55 | intercellular substance-related gene | COL1A1 |
| 56 | intercellular substance-related gene | POSTN |
| 57 | intercellular substance-related gene | ADAM12 |
| 58 | intercellular substance-related gene | COL6A2 |
| 59 | intercellular substance-related gene | COL5A1 |
| 60 | intercellular substance-related gene | COL11A1 |
| 61 | intercellular substance-related gene | COL5A2 |
| 62 | intercellular substance-related gene | COL1A2 |
| 63 | intercellular substance-related gene | MXRA5 |
| 64 | intercellular substance-related gene | THBS2 |
| 65 | intercellular substance-related gene | INHBA |
| 66 | intercellular substance-related gene | VCAN |
| 67 | intercellular substance-related gene | ADAMTS12 |
| 68 | intercellular substance-related gene | GREM1 |
| 69 | intercellular substance-related gene | COL3A1 |
| 70 | intercellular substance-related gene | SULF1 |
| 71 | house-keeping gene | GAPDH |
| 72 | house-keeping gene | GUSB |
| 73 | house-keeping gene | MRPL19 |
| 74 | house-keeping gene | PSMC4 |
| 75 | house-keeping gene | SF3A1 |
| 76 | house-keeping gene | TFRC |

TABLE 3

| No. | Function | Gene Name |
|---|---|---|
| 1 | proliferation-related gene | PLK1 |
| 2 | proliferation-related gene | PRC1 |
| 3 | proliferation-related gene | CCNB1 |
| 4 | proliferation-related gene | MKI67 |
| 5 | proliferation-related gene | TPX2 |
| 6 | proliferation-related gene | MELK |
| 7 | proliferation-related gene | CDC20 |
| 8 | proliferation-related gene | TYMS |
| 9 | proliferation-related gene | TOP2A |
| 10 | immune-related gene | P2RY13 |
| 11 | immune-related gene | CCR2 |
| 12 | immune-related gene | PTPRC |
| 13 | immune-related gene | IRF8 |
| 14 | immune-related gene | CLEC10A |
| 15 | immune-related gene | TLR7 |
| 16 | immune-related gene | CCR4 |
| 17 | immune-related gene | IL7R |
| 18 | immune-related gene | CD4 |
| 19 | intercellular substance-related gene | SPOCK1 |
| 20 | intercellular substance-related gene | COL1A1 |
| 21 | intercellular substance-related gene | POSTN |
| 22 | intercellular substance-related gene | ADAM12 |
| 23 | intercellular substance-related gene | COL6A2 |
| 24 | intercellular substance-related gene | COL5A1 |
| 25 | house-keeping gene | ACTB |

TABLE 4

| No. | Function | Gene Name |
|---|---|---|
| 1 | proliferation-related gene | PLK1 |
| 2 | proliferation-related gene | PRC1 |
| 3 | proliferation-related gene | CCNB1 |
| 4 | proliferation-related gene | MKI67 |
| 5 | proliferation-related gene | TPX2 |
| 6 | proliferation-related gene | MELK |
| 7 | proliferation-related gene | CDC20 |
| 8 | proliferation-related gene | TOP2A |
| 9 | immune-related gene | P2RY13 |
| 10 | immune-related gene | CCR2 |
| 11 | immune-related gene | PTPRC |
| 12 | immune-related gene | IRF8 |
| 13 | immune-related gene | CLEC10A |
| 14 | immune-related gene | TLR7 |
| 15 | immune-related gene | IL7R |
| 16 | intercellular substance-related gene | SPOCK1 |
| 17 | intercellular substance-related gene | COL1A1 |
| 18 | intercellular substance-related gene | POSTN |
| 19 | intercellular substance-related gene | ADAM12 |
| 20 | intercellular substance-related gene | COL6A2 |
| 21 | intercellular substance-related gene | COL5A1 |
| 22 | house-keeping gene | GAPDH |
| 23 | house-keeping gene | GUSB |
| 24 | house-keeping gene | TFRC |

In a specific embodiment, the gene panel according to the present disclosure is useful for determining the molecular subtype (subtype classification) of lung adenocarcinoma and/or assessing the survival risk of a patient with lung adenocarcinoma.

The lung adenocarcinoma molecular subtypes can comprise LAD1 subtype, LAD2 subtype, LAD3 subtype, LAD4 subtype, LAD5 subtype and mixed subtype. The survival risk can comprise low risk, medium risk and high risk. A person skilled in the art will understand that the gene panel is not limited to the combinations as listed above. According to the contents of the present disclosure, a person skilled in the art can combine the molecular subtype and survival risk assessment related genes according to the present disclosure with a reference gene(s) to obtain a gene panel comprising a combination of various genes and such gene panels are also within the scope of the present disclosure.

The Agent and Diagnosis Product According to the Present Disclosure

In another aspect, provided are also an agent for determining the expression levels of the genes in the gene panel according to the present disclosure and the use thereof for the manufacture of a detection/diagnosis product. The gene panel is defined as above.

The agent or the detection/diagnostic product is useful for determining molecular subtype of lung adenocarcinoma and/or assessing survival risk of a patent with lung adenocarcinoma. Those skilled in the art will understand that the selection of the agent or product can each correspond to the gene in the gene panel according to the present disclosure. As an example, when multiple options are listed, such as the primer(s) of SEQ ID NO.153-202 or the probe(s) of SEQ ID NO.203-227, it does not mean that the agent or product according to the present disclosure must contain all of these primers or probes but means that the agent or product will contain those primers or probes corresponding to the genes encompassed therein.

In a preferred embodiment, the agent is used to detect the amount of target nucleic acid (such as DNA, RNA transcript or cDNA complementary to the RNA transcript of a gene in the gene panel according to the present disclosure), and preferably, to detect the amount of RNA transcript, particularly mRNA of the target nucleic acid, or to detect the amount of cDNA complementary to the mRNA. In an embodiment, the agent is an agent for detecting the amount of RNA transcript of the target gene (i.e., a gene in the gene panel according to the present disclosure), particularly mRNA. In another embodiment, the agent is an agent for detecting the amount of cDNA complementary to the mRNA.

In a preferable embodiment, the agent is a probe(s) or a primer(s) or a combination thereof, which can hybridize to a partial sequence of a target nucleic acid (for example, a gene in the gene panel according to the present disclosure, its RNA transcript or cDNA complementary to the RNA transcript) to form a complex. The probe(s) and primer(s) are highly specific to the target nucleic acid. The probe(s) and primer(s) can be artificially synthesized.

In an embodiment, the agent is a primer(s). In an embodiment, the primer(s) has a sequence as shown in SEQ ID NO. 1-152 (also see Table 5). In another embodiment, the primer(s) has a sequence as shown in SEQ ID NO. 1-6, 17, 18, 23, 24, 37-40, 45-58, 61, 62, 107-118, 141-144, 151 and 152 (also see Table 6). In another embodiment, the primer(s) has a sequence as shown in SEQ ID NO. 153-202 (also see Table 7). In another embodiment, the primer(s) has a sequence as shown in SEQ ID NO. 228-275 (also see Table 8).

In a preferable embodiment, the primer(s) is used for Next Generation Sequencing, preferably targeted sequencing. In a specific embodiment, the primer(s) is used for targeted sequencing and has a sequence as shown in SEQ ID NO. 1-152 (Table 5). In a specific embodiment, the primer(s) is used for targeted sequencing and has a sequence as shown in SEQ ID NO. 1-6, 17, 18, 23, 24, 37-40, 45-58, 61, 62, 107-118, 141-144, 151 and 152 (Table 6).

In another preferable embodiment, the primer(s) is used for quantitative PCR, preferably Real-time fluorescence quantitative PCR (RT-PCR), for example, SYBR Green RT-PCR based on SYBR Green dye and TaqMan RT-PCR based on TaqMan technology. TaqMan RT-PCR comprises, for example, multiplex RT-PCR and singleplex RT-PCR. In an embodiment, the primer(s) is used for SYBR Green RT-PCR, and has a sequence as shown in SEQ ID NO. 153-202 (also see Table 7) or in SEQ ID NO. 228-275 (also see Table 8). In another embodiment, the primer(s) is used for TaqMan RT-PCR, and has a sequence as shown in SEQ ID NO. 153-202 (Table 7) or in SEQ ID NO. 228-275 (Table 8). In a specific embodiment, the primer(s) is used in multiplex RT-PCR and has a sequence as shown in SEQ ID NO. 153-202 (Table 7). In another specific embodiment, the primer(s) is used for singleplex or multiplex RT-PCR, and has a sequence as shown in SEQ ID NO. 228-275 (Table 8).

In an embodiment, the primer(s) is used for the manufacture of a detection/diagnostic product. The product is a Next Generation Sequencing kit based on targeted sequencing or a Real-time fluorescence quantitative PCR kit.

In another embodiment, the agent is a probe(s), including but not limited to that used in RT-PCR, in situ hybridization (ISH), DNA blotting or RNA blotting, gene chip detections or the like.

In an embodiment, the probe(s) is that used in in situ hybridization. The probe(s) used in in situ hybridization comprises, for example, that used in dual-color silver-enhanced in situ hybridization (DISH), DNA fluorescent in situ hybridization (DNA-FISH), RNA fluorescent in situ hybridization (RNA-FISH), chromogenic in situ hybridization (CISH) or the like. The probe(s) can have a label. The label can be a fluorescent group (e.g., Alexa Fluordye, FITC, Texas Red, Cy3, Cy5 etc.), biotin, digoxin or the like. In another embodiment, the probe(s) is used in gene chip detection. The probe(s) can have a maker. The label can be a fluorescent group. In a specific embodiment, the probe(s) is used for the manufacture of a detection/diagnostic product. The product is a gene chip.

In a preferable embodiment, the probe(s) is used in RT-PCR. In an embodiment, the probe(s) is used in TaqMan RT-PCR. In an embodiment, the probe(s) is a TaqMan probe. In an embodiment, the probe(s) has a sequence as shown in SEQ ID NO. 203-227 (see also Table 7). In a specific embodiment, the probe(s) is a TaqMan probe having a sequence as shown in SEQ ID NO. 203-227. In another embodiment, the probe(s) has a sequence as shown SEQ ID NO. 276-299 (see also Table 8). In a specific embodiment, the probe(s) is a TaqMan probe(s) having a sequence as shown in SEQ ID NO. 276-299.

In an embodiment, the probe(s) is used for the manufacture of a detection/diagnostic product. The product is a Real-time fluorescence quantitative PCR detection kit.

In another embodiment, the agent is a combination of a primer(s) and a probe(s). Preferably, the probe(s) is a TaqMan probe. In an embodiment, the combination of primer(s) and probe(s) is used in RT-PCR, for example, singleplex or multiplex RT-PCR. In an embodiment, the primer(s) has a sequence as shown in SEQ ID NO. 153-202. In another embodiment, the primer(s) has a sequence as shown in SEQ ID NO. 228-275. In an embodiment, the probe(s) has a sequence as shown in SEQ ID NO. 203-227. In another embodiment, the probe(s) has a sequence as shown in SEQ ID NO. 276-299. In a specific embodiment, the primer(s) has a sequence as shown in SEQ ID NO. 153-202, the probe(s) is a TaqMan probe(s) having a sequence as shown in SEQ ID NO. 203-227 (see also Table 7). In another specific embodiment, the primer(s) has a sequence as shown in SEQ ID NO. 228-27, the probe(s) is a TaqMan probe(s) having a sequence as shown in SEQ ID NO. 276-299 (see also Table 8).

In an embodiment, the primer(s) and probe(s) are used for the manufacture of a diagnostic product. The diagnostic product is a Real-time fluorescence quantitative PCR detection kit, for example, multipleplex or singleplex Real-time fluorescence quantitative PCR detection kit.

In an alternative embodiment, the agent is used to detect the amount of the polypeptide encoded by the target gene (a gene in the gene panel according to the present disclosure). Preferably, the agent is an antibody, an antibody fragment or an affinity protein, which can specifically bind to the polypeptide encoded by the target gene. More preferably, the agent is an antibody or an antibody fragment that can specifically bind to the polypeptide encoded by the target gene. The antibody, antibody fragment or affinity protein can further carry a label for detection, such as an enzyme (e.g., peroxidase horseradish enzyme), a radioisotope, a fluorescent label (e.g., Alexa Fluor dye, FITC, Texas Red, Cy3, Cy5, etc.), a chemiluminescent substance (e.g., luminol), biotin, a quantum dot label (Qdot) or the like. Accordingly, in a preferable embodiment, the agent is an antibody or an antibody fragment that can specifically bind to the polypeptide encoded by the target gene, and optionally has a label for detection, and the label is selected from the group consisting of enzymes, radioisotopes, fluorescent labels, chemiluminescent substances, biotin, quantum dot labels. In an embodiment, the agent is used for the manufacture of a detection/diagnostic product. The product is a protein chip (e.g., Protein microarray), an ELISA diagnostic kit or an Immunohistochemistry (IHC) kit.

Therefore, in another aspect, provided is a product, which is used to determine the molecular subtype of lung adenocarcinoma and/or assess the survival risk of a patent with lung adenocarcinoma. The product comprises the agent according to the present disclosure. The product can be a Next Generation Sequencing kit based on targeted sequencing, a Real-time fluorescence quantitative PCR kit, a gene chip, a protein chip, an ELISA diagnostic kit or an Immunohistochemistry (IHC) kit or a combination thereof.

In an embodiment, the product is a diagnostic product based on Next Generation Sequencing (NGS). In a specific embodiment, the product comprises an agent for detecting the expression level of a gene in the gene panel according to the present disclosure. In an embodiment, the gene panel comprises 186 genes, i.e., 180 molecular subtype and survival risk assessment related genes and 6 house-keeping genes as described above (see also Table 1). In an embodiment, the gene panel comprises 76 genes, i.e., 70 molecular subtype and survival risk assessment related genes and 6 house-keeping genes as described above (see also Table 2). In another embodiment, the gene panel according to the present disclosure comprises 25 genes, i.e., 24 molecular subtype and survival risk assessment related genes and 1 house-keeping gene as described above (see also Table 3). In another embodiment, the gene panel according to the present disclosure comprises 24 genes, i.e., 21 molecular subtype and survival risk assessment related genes and 3 house-keeping genes as described above, the 3 house-keeping genes comprise 3 of GAPDH, GUSB, MRPL19, PSMC4, SF3A1 and TRFC. In another embodiment, the gene panel according to the present disclosure comprises 24 genes, i.e., 21 molecular subtype and survival risk assessment related genes and 3 house-keeping genes as described above (see also Table 4). In a specific embodiment, the diagnostic product based on Next Generation Sequencing (NGS) comprises a primer(s) having a sequence as shown in SEQ ID NO. 1-152 (see also Table 5). In yet another specific embodiment, the diagnostic product based on Next Generation Sequencing (NGS) comprises a primer(s) having a sequence as shown in SEQ ID NO. 1-6, 17, 18, 23, 24, 37-40, 45-58, 61, 62, 107-118, 141-144, 151 and 152 (see also Table 6).

In another embodiment, the diagnostic product is a diagnostic product based on fluorescence quantitative PCR, preferably Real-time fluorescence quantitative PCR (RT-PCR), e.g., SYBR Green RT-PCR and TaqMan RT-PCR. The TaqMan RT-PCR can for example be multiplex RT-PCR and singleplex RT-PCR. In an embodiment, the diagnostic product comprises an agent for detecting the expression levels of the genes in the gene panel according to the present disclosure. In an embodiment, the gene panel comprises 186 genes, i.e., 180 molecular subtype and survival risk assessment related genes and 6 house-keeping genes as described above (see also Table 1). In an embodiment, the gene panel comprises 76 genes, i.e., 70 molecular subtype and survival risk assessment related genes and 6 house-keeping genes as described above (see also Table 2). In another embodiment, the gene panel according to the present disclosure comprises 25 genes, i.e., 24 molecular subtype and survival risk assessment related genes and 1 house-keeping gene as described above (see also Table 3). In another embodiment, the gene panel according to the present disclosure comprises 24 genes, i.e., 21 molecular subtype and survival risk assessment related genes and 3 house-keeping genes as described above (see also Table 4). In a specific embodiment, the diagnostic product based on fluorescence quantitative PCR comprises a primer(s) having a sequence as shown in SEQ ID NO. 153-202. In another specific embodiment, the diagnostic product based on fluorescence quantitative PCR comprises a TaqMan probe(s) having a sequence as shown in SEQ ID NO. 203-227. In a preferable embodiment, the diagnostic product based on fluorescence quantitative PCR comprises a primer(s) having a sequence as shown in SEQ ID NO. 153-202 and a TaqMan probe(s) having a sequence as shown in SEQ ID NO. 203-227 (see also Table 7). In a specific embodiment, the diagnostic product based on fluorescence quantitative PCR comprises a primer(s) having a sequence as shown in SEQ ID NO. 228-275. In another specific embodiment, the diagnostic product based on fluorescence quantitative PCR comprises a TaqMan probe(s) having a sequence as shown in SEQ ID NO. 276-299. In a preferable embodiment, the diagnostic product based on fluorescence quantitative PCR comprises a primer(s) having a sequence as shown in SEQ ID NO. 228-275 and a TaqMan probe(s) having a sequence as shown in SEQ ID NO. 276-299 (see also Table 8).

In an embodiment, the product is in vitro diagnostic product. In a specific embodiment, the product is diagnostic kit.

In an embodiment, the product is useful for determining the molecular subtype of lung adenocarcinoma and/or assessing the survival risk of a patient with lung adenocarcinoma. In a preferable embodiment, the product further comprises a total RNA extraction reagent, a reverse transcription reagent, a Next Generation Sequencing reagent and/or a quantitative PCR reagent.

The total RNA extraction reagent can be a conventional total RNA extraction reagent in the art. The examples comprise but are not limited to RNA storm CD201, Qiagen 73504, Invitrogen and ABI AM1975.

The reverse transcription reagent can be a conventional reverse transcription reagent in the art and preferably comprise dNTP solution and/or RNA reverse transcriptase. The examples of the reverse transcription reagent comprise but are not limited to NEB M0368L, Thermo K1622, ABI 4366596.

The Next Generation Sequencing reagent can be a conventional reagent in the art, provided that it can comply with the requirements for the Next Generation sequencing. The Next Generation Sequencing reagent can be commercially available and the examples comprise but are not limited to MiSeq® Reagent Kit v3 (150 cycle)(MS-102-3001), TruSeq® Targeted RNA Index Kit A-96 Indices (384 Samples)(RT-402-1001) from Illumina. The Next Generation sequencing is conventional in the art, for example target RNA-seq technology. Accordingly, the Next Generation Sequencing reagent can further comprise Illumina-customized reagents for building targeted RNA-seq library, for example TruSeq® Targeted RNA Custom Panel Kit (96 Samples) (RT-102-1001).

The quantitative PCR reagent can be a conventional reagent in the art, provided that it can comply with the requirements for the quantitative PCR for the obtained sequences. The quantitative PCR reagent can be commercially available. The quantitative PCR technology can be conventional quantitative PCR technology in the art, preferably Real-time fluorescence quantitative PCR technology, for example SYBR Green RT-PCR and Taqman RT-PCR technology. The PCR reagent preferably further comprises reagents that can be used to construct quantitative PCR library. Preferably, the quantitative PCR reagent can also comprise Real-time fluorescence quantitative PCR reagents, such as those for SYBR Green RT-PCR (such as SYBR Green premix, e.g., SYBR Green PCR Master Mix) and those for Taqman RT-PCR (such as Taqman RT-PCR Master Mix). Those skilled in the art can select a suitable quantitative PCR reagent according to the quantitative PCR technique used. The detection platform for quantitative PCR detection can be ABI7500 Real-time fluorescence quantitative PCR instrument or Roche LightCycler® 480II Real-time fluorescence quantitative PCR instrument or all other PCR instruments that can perform Real-time fluorescent quantitative detection.

In a specific embodiment, the product is a Next Generation Sequencing kit based on targeted RNA-seq, comprising a primer(s) having a sequence as shown in Table 5 or Table 6, and optionally further comprising one or more of the following: total RNA extraction reagent, reverse transcription reagent and Next Generation Sequencing reagent. Preferably, the Next Generation Sequencing reagent is an Illumina-customized reagent for building targeted RNA-seq library.

In yet another specific embodiment, the product is a SYBR Green RT-PCR kit, comprising a primer(s) having a sequence as shown in Table 7 or Table 8, and optionally further comprising one or more of the following: total RNA extraction reagent, reverse transcription reagent and SYBR Green RT-PCR reagent.

In another specific embodiment, the product is a TaqMan RT-PCR detection kit, comprising a primer(s) and a probe(s) having a sequence as shown in Table 7 or a primer(s) and a probe(s) having a sequence as shown in Table 8, and optionally further comprising one or more of the following: total RNA extraction reagent, reverse transcription reagent and TaqMan RT-PCR reagent.

The diagnostic product according to the present disclosure (preferably in the form of a kit) further preferably comprises a device for extracting the testing sample from a subject; for example, a device for extracting tissue or blood from a subject, preferably any blood collection needle capable of taking blood, syringe, etc. The subject can be a mammal, preferably a human, especially a patient suffering from lung adenocarcinoma.

The Method and Use According to the Present Disclosure

In another aspect, provided is also a method for determining the molecular subtype of lung adenocarcinoma and/or survival risk of a subject, comprising
(1) providing a sample of a subject;
(2) determining the expression levels of the genes in the gene panel according to the present disclosure in the sample;
(3) determining the molecular subtype of lung adenocarcinoma and/or survival risk of the subject.

The method according to the present disclosure can be used for diagnostic or non-diagnostic purpose.

The subject in the method according to the present disclosure is a mammal, preferably a human, in particular a patient suffering from lung adenocarcinoma.

The sample used in step (1) is not particularly limited, as long as the expression levels of the genes in the gene panel can be obtained therefrom, for example, the total RNA, total protein or the like of the subject can be extracted from the sample, preferably total RNA. The sample is preferably a sample of tissue, blood, plasma, body fluid or a combination thereof, preferably a tissue sample, in particular a paraffin tissue sample. In a preferable embodiment, the sample is a tumor tissue sample or a tissue sample containing tumor cells. In a preferable embodiment, the sample is a tissue with a high content of tumor cells.

Step (2) can be performed by using methods known in the art for determining gene expression levels. Those skilled in the art can select the sample type and sample size in step (1) as required and select conventional technology in the art to achieve the determination in step (2). Preferably, the expression levels of the target genes (such as the molecular subtype and survival risk assessment related genes according to the present disclosure) are standardized according to the expression level(s) of a reference gene(s). Methods of standardizing expression levels of genes are well known to those skilled in the art.

In an embodiment, step (2) can be performed by detecting the amount of the polypeptide encoded by the target gene (a gene in the gene panel according to the present disclosure). The detection can be done by reagents as described above and technology known in the art, including but not limited to, enzyme-linked immunosorbent assay (ELISA), chemiluminescence immunoassay technology (e.g., immuno-chemiluminescence assay, chemiluminescence enzyme immunoassay, electrochemiluminescence immunoassay), flow cytometry, immunohistochemistry (IHC).

In a preferable embodiment, step (2) can be performed by detecting the amount of the target nucleic acid. The detection can be done by the above-mentioned reagents and technology known in the art, including but not limited to molecular hybridization technology, quantitative PCR technology or nucleic acid sequencing technology, etc. Molecular hybridization technology includes but not limited to ISH technology (such as DISH, DNA-FISH, RNA-FISH, CISH technology, etc.), DNA blotting or RNA blotting technology, gene chip technology (such as microarray chip or microfluidic chip technology), etc., preferably, in situ hybridization technology. Quantitative PCR technology includes but is not limited to semi-quantitative PCR and RT-PCR technology, preferably RT-PCR technology, such as SYBR Green RT-PCR technology, TaqMan RT-PCR technology. Nucleic acid sequencing technology includes but is not limited to Sanger sequencing, Next Generation Sequencing (NGS), $3^{rd}$ Generation sequencing, single-cell sequencing technology, etc., preferably Next Generation Sequencing, more preferably targeted RNA-seq technology. More preferably, the detection is performed with the agent according to the preset disclosure.

In a preferable embodiment, in step (2), the expression levels of the genes in the gene panel according to the present disclosure are determined by Next Generation Sequencing technology. In an embodiment, the genes in the gene panel are as shown in Table 1, Table 2, Table 3 or Table 4. In an embodiment, the gene panel comprises 70 molecular subtype and survival risk assessment related genes and 6 house-keeping genes as described above and can also be found in Table 2. In another embodiment, the gene panel comprises 21 molecular subtype and survival risk assessment related genes and 3 house-keeping genes as described above and can also be found in Table 4.

In a specific embodiment, step (2) can comprise:
(2a-1) extracting total RNA from the sample;
(2a-2) converting the optionally purified total RNA into cDNA, which is then prepared into a library ready for Next Generation Sequencing;
(2a-3) sequencing the library obtained in step (2a-2) and optionally standardizing the expression levels of molecular subtype and survival risk assessment related genes according to the expression levels of house-keeping genes.

The extraction of step (2a-1) can be performed by conventional methods in the art, preferably using a commercially available RNA extraction kit to extract total RNA from fresh frozen tissue or paraffin-embedded tissue of the subject. In a more preferable embodiment, RNA storm CD201 or Qiagen 73504 can be used for extraction.

In a preferable embodiment, step (2a-2) can comprise:
(i) reverse transcribing the extracted total RNA to generate cDNA of the gene of interest;
(ii) prepare the resulting cDNA into a library ready for sequencing.

In a preferable embodiment, in step (2a-2), the primers shown in Table 5 or Table 6 are used to amplify the cDNA to prepare a library ready for sequencing.

Step (2a-3) can be performed by RNA sequencing. The sequencing method can be a RNA-seq sequencing method conventional in the art for determining gene expression level. Next Generation Sequencing is preferably performed using Illumina NextSeq/MiSeq/MiniSeq/iSeq series sequencers. The primers in the kit are used to amplify the genes in the gene panel according to the present disclosure, and according to the different libraries prepared in step (2a-2), the Next Generation Sequencing of the obtained gene sequences can be performed. Preferably, the Next Generation Sequencing is targeted RNA-seq technology, and the Illumina NextSeq/MiSeq/MiniSeq/iSeq sequencer is used for paired-end sequencing or single-end sequencing. Such a process can be automatically performed by the instrument itself.

In step (2), the expression levels of the genes in the gene panel according to the present disclosure can also be determined by fluorescence quantitative PCR method. In an embodiment, the genes in the gene panel are as shown in Table 1, Table 2, Table 3 or Table 4. In an embodiment, the gene panel comprises 24 molecular subtype and survival risk assessment related genes and 1 house-keeping gene as described above and can also be found in Table 3. In another embodiment, the gene panel comprises 21 molecular subtype and survival risk assessment related genes and 3 house-keeping genes as described above and can also be found in Table 4.

In a specific embodiment, step (2) can comprise:
(2b-1) extracting total RNA from the sample;
(2b-2) reverse transcribing the total RNA in (2-1) into cDNA;
(2b-3) subjecting the obtained cDNA to Real-time fluorescence quantitative PCR (RT-PCR) detection, and optionally standardizing the expression levels of molecular subtype and survival risk assessment related genes according to the expression levels of house-keeping genes.

The extraction of step (2b-1) can be performed by conventional methods in the art, preferably using a commercially available RNA extraction kit to extract total RNA from fresh frozen tissue or paraffin-embedded tissue of the subject. In a more preferable embodiment, RNA storm CD201 or Qiagen 73504 can be used for extraction. The reverse transcription of step (2b-2) can be performed using a commercially available Reverse transcription kit. In a preferable embodiment, the RT-PCR method in step (2b-3) is TaqMan RT-PCR. Preferably, primers and probes can be used to perform RT-PCR detection of the genes shown in Table 3 or Table 4, respectively, and the probes are TaqMan probes. Preferably, the sequences of the primers and probes are as shown in Table 7 or Table 8. In an embodiment, singleplex or multiplex RT-PCR assay is performed using primers and probes as shown in Table 7. In another embodiment, singleplex or multiplex RT-PCR assay is performed using primers and probes as shown in Table 8.

In an alternative embodiment, the RT-PCR method in step (2b-3) is SYBR Green RT-PCR, and primers and commercially available SYBR Green premix can be used to detect the genes shown in Table 3 or Table 4, separately or simultaneously. Preferably, the sequences of the primers are as shown in SEQ ID NO. 153-202 (see also Table 7) or in SEQ ID NO. 228-275 (see also Table 8).

The above RT-PCR detection can be performed using ABI 7500 Real-time fluorescence quantitative PCR instrument (Applied Biosystems) or Roche LightCycler® 480II). After the reaction, the Ct value of each gene is recorded, representing the expression level of each gene.

In an embodiment according to the present disclosure, step (3) can be performed by statistical analysis on the expression levels of the genes in the gene panel according to the present disclosure in the sample obtained in step (2). Optionally, lung adenocarcinoma molecular subtype and survival risk prediction can be performed based on the single sample prediction method SSP (Single Sample Predictor) (see Hu Z, et al., BMC genomics. 2006, 7:96.) and the method optimized by Parker et al., (see Parker J S, et al, Journal of clinical oncology: official journal of the American Society of Clinical Oncology. 2009, 27(8):1160-7). The gene expression data obtained in step (2) are analyzed to obtain the subtype of a single sample, and the survival risk can be calculated.

In an embodiment, step (3) comprises molecular subtype of lung adenocarcinoma, which includes determining the molecular subtype of lung adenocarcinoma of a subject according to the expression level of each gene in the sample of the subject obtained in step (2).

The present inventors analyze the lung adenocarcinoma gene expression levels with complete clinical information in the TCGA database through the gene expression profile analysis program EPIG (see, Zhou T, et al., 2006. Environ Health Perspect 114 (4), 553-559; Chou J W, et al., 2007.BMC Bioinformatics 8, 427) to obtain the expression profiles of the genes according to the present disclosure. Further, according to the expression profiles of the genes, the method of hierarchical clustering is used to compare the similarity between the detected genes, and the genes are grouped; the similarity of the expression profiles between the lung adenocarcinoma samples are compared, the lung adenocarcinoma is grouped, and the lung adenocarcinoma is classified into LAD1 subtype, LAD2 subtype, LAD3 subtype, LAD4 subtype, LAD5 subtype and mixed subtype; the gene expression profiles in the lung adenocarcinoma molecular subtypes are used as standard testing data for molecular subtype and survival risk assessment of the samples.

The molecular subtypes of lung adenocarcinoma can comprise LAD1 subtype, LAD2 subtype, LAD3 subtype, LAD4 subtype, LAD5 subtype and mixed subtype:

LAD1 subtype is mainly characterized in low expression of proliferation-related genes, high expression of immune-related genes, low expression of intercellular substance-related genes and highest 5-year survival rate;

LAD2 subtype is mainly characterized in high expression of proliferation-related genes, low expression of immune-related genes, medium expression of intercellular substance-related genes and low 5-year survival rate;

LAD3 subtype is mainly characterized in low expression of proliferation-related genes, medium expression of immune-related genes, high expression of intercellular substance-related genes and medium 5-year survival rate;

LAD4 subtype is mainly characterized in medium expression of proliferation-related genes, low expression of immune-related genes, high expression of intercellular substance-related genes and low 5-year survival rate;

LAD5 subtype is mainly characterized in high expression of proliferation-related genes, medium expression of immune-related genes, low expression of intercellular substance-related genes and medium 5-year survival rate;

mixed subtype is the lung adenocarcinoma not belonging to the LAD1 subtype, LAD2 subtype, LAD3 subtype, LAD4 subtype and LAD5 subtype.

In an embodiment, step (3) can comprise:

(3-1) according to the expression data of the gene panel according to the present disclosure in a statistically significant number of lung adenocarcinoma samples (training set), establishing the expression profiles of the gene panel according to the present disclosure in the LAD1 subtype, LAD2 subtype, LAD3 subtype, LAD4 subtype and LAD5 subtype as Standard test data;

(3-2) according to the expression levels of the genes in the gene panel according to the present disclosure in the sample obtained in step (2), with the Pearson correlation analysis method, calculating the correlation coefficient between the expression profiles of the gene panel according to the present disclosure in the sample and the gene expression profiles in the LAD1 subtype, LAD2 subtype, LAD3 subtype, LAD4 subtype or LAD5 subtype in the Standard test data;

(3-3) when the correlation coefficient between the gene expression profiles in the sample and the gene expression profiles of X subtype (X is selected from LAD1 subtype, LAD2 subtype, LAD3 subtype, LAD4 subtype and LAD5 subtype) is the highest and the confidence limit is greater than or equal to 0.8, determining said sample as X subtype; and when the confidence limit is lower than 0.8, determining said sample as Mixed subtype.

In another embodiment, step (3) further comprises determining the survival risk of the subject according to the expression levels of the immune-related genes or proliferation-related genes. Specifically, it can comprise:

(3a) calculating the proliferation index of the subjects and determining the proliferation rate, and/or (3b) calculating the immunity index of the subjects and determining the immune function.

In an embodiment, step (3a) comprises:

(3a-1) according to the expression data of the proliferation-related genes in the gene panel according to the present disclosure in a statistically significant number of lung adenocarcinoma samples (training set), calculating the weighted average value of the expression levels of the proliferation-related genes in the training set, by combination with the survival data, using the statistical software known in the art (such as x-tile software, SPSS or other analysis software that can be used to calculate the cut-off value, preferably x-tile software) for survival analysis, and obtaining a weighted average value that can distinguish the difference in survival curves to the greatest extent as the cut-off value;

(3a-2) according to the expression levels of the proliferation-related genes obtained in step (2), calculating the weighted average value of the expression levels of the proliferation-related genes in the sample of the subject, i.e., the proliferation index, and based on the cut-off value in step (3a-1), determining the proliferation index as fast (the expression levels of the proliferation-related genes obtained in step (2) >the cut-off value) or as slow (the expression levels of the proliferation-related genes obtained in step (2) ≤the cut-off value);

(3a-3) assessing the survival risk according to the proliferation index obtained in step (3a-2): if the proliferation index of the subject is fast, the survival risk is high and the prognosis is poor; if the proliferation index of the subject is slow, the survival risk is low and the prognosis is good.

The proliferation index can be calculated according to the following formula:

$$\text{Proliferation index} = \frac{1}{n} * \sum_{i=1}^{n} \text{proliferation-related gene}$$

wherein n is number of the proliferation-related genes for calculating proliferation index, and is an integer of 1-69. In an embodiment, n=69, the proliferation-related genes comprise: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TYMS, TOP2A, PBK, CDC45, CDCA8, CENPA, MYBL2, SKA1, MCM10, TRIP13, TROAP, POLQ, GINS1, RAD54L and MS4A4A (see also relevant information in Table 1). In an embodiment, n=23, the proliferation-related genes comprise: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A (see also Table 2). In another embodiment, n=9, the proliferation-related genes comprise: PLK1, PRC1, CCNB1, MKI67, TPX2, MELK, CDC20, TYMS and TOP2A (see also Table 3). In another embodiment, n=8, the proliferation-related genes comprise: PLK1, PRC1, CCNB1, MKI67, TPX2, MELK, CDC20 and TOP2A (see also Table 4).

In an embodiment, step (3b) comprises the following steps:
(3b-1) according to the expression data of the immune-related genes in the gene panel according to the present disclosure in a statistically significant number of lung adenocarcinoma samples (training set), calculating the weighted average value of the expression levels of the immune-related genes in the training set, by combination with the survival data, using the statistical software known in the art (such as x-tile software, SPSS or other analysis software that can be used to calculate the cut-off value, preferably x-tile software) for survival analysis, and obtaining a weighted average value that can distinguish the difference in survival curves to the greatest extent as the cut-off value;
(3b-2) according to the expression levels of immune-related genes obtained in step (2), calculating the weighted average value of the expression levels of immune-related genes in the sample of the subject, i.e., the immunity index of the subject, and based on the cut-off value in step (3a-1), determining the immunity index as strong (the expression levels of immune-related genes obtained in step (2) >the cut-off value) or as weak (the expression levels of immune-related genes obtained in step (2) ≤the cut-off value);
(3b-3) assessing the survival risk according to the immunity index obtained in step (3b-2): if the immunity index of the subject is strong, the immune function is strong, the survival risk is low, and the prognosis is good; if the immunity index of the subject is weak, the immune function is weak, the survival risk is high, and the prognosis is poor.

The immunity index can be calculated according to the following formula:

$$\text{Immunity index} = \frac{1}{n} * \sum_{i=1}^{n} \text{immune-related gene}$$

wherein n is the number of immune-related genes for the calculation of immunity index and is an integer of 1-73. In an embodiment, n=73, the immune-related genes comprise: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2D1A, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCD1LG2, C1QA, SLAMF8, VSIG4, CD163, LAIR1, SLAMF7 and MS4A4A (see also relevant information of Table 1). In another embodiment, n=30, the immune-related genes comprise: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ (see also Table 2). In another embodiment, n=9, the immune-related genes comprise: P2RY13, CCR2, PTPRC, IRF8, CLEC10A, TLR7, CCR4, IL7R and CD4 (see also Table 3). In another embodiment, n=7, the immune-related genes comprise: P2RY13, CCR2, PTPRC, IRF8, CLEC10A, TLR7 and IL7R (see also Table 4).

After obtaining the data on the expression levels of the genes in the gene panel according to the present disclosure, those skilled in the art can apply technology known in the art to obtain a weighted average value of the expression levels of each group of genes and combine the survival data to obtain a survival curve that can distinguish the difference in survival curves to the greatest extent as the cut-off value.

Preferably, step (3) further comprises step (3c) calculating the survival risk of the patient with lung adenocarcinoma, wherein step (3c) comprises the following steps:
(3c-1) using the Cox model, and taking the occurrence and time of disease progression or death as the observation endpoint, according to the relative risk of the impact on survival regarding the lung adenocarcinoma molecular subtype obtained in step (3-3), the proliferation index obtained in step (3a-2), and the immunity index obtained in step (3b-2) of the subject to determine the corresponding coefficient, calculating the survival risk score of the subject (Risk of Death, RD);
(3c-2) according to the survival risk score (also called survival risk index) calculated in step (3c-1), determining the survival risk of the subject: low risk (survival risk score is 0-35), medium risk (survival risk score 36-70) and high risk (survival risk score 71-100).

In a specific embodiment, in step (3c-1), 70 lung adenocarcinoma molecular subtype and survival risk-related genes (see also Table 2) are used to calculate the survival risk score of the subject,
RD=(−0.18*LAD1)+(0.09*LAD2)+(0.04*LAD3)+ (0.17*LAD4)+(−0.17*LAD5)+(−0.05*immunity index)+(0.12*proliferation index); wherein, "LAD1" represents the Pearson correlation coefficient between the tumor and the LAD1 subtype tumor; "LAD2" represents the Pearson correlation coefficient between the tumor and the LAD2 subtype tumor; "LAD3" represents the Pearson correlation coefficient between the tumor and the LAD3 subtype tumor; "LAD4" represents the Pearson correlation coefficient of the tumor and the LAD4 subtype tumor; "LAD5" represents the Pearson correlation coefficient between the tumor and the LAD5 subtype tumor; "immunity index" is the immunity index calculated from the 30 immune-related genes in Table 2; "proliferation index" is the proliferation index calculated from the 23 proliferation-related genes in Table 2.

In another specific embodiment, in step (3c-1), 24 lung adenocarcinoma molecular subtype and survival risk-related genes (see also Table 3) are used to calculate the survival risk score of the subject,
RD=(−0.12*LAD1)+(0.29*LAD2)+(0.13*LAD3)+ (0.18*LAD4)+(−0.09*LAD5)+(−0.55*immunity index)+(0.07*proliferation index); wherein,
"LAD1" represents the Pearson correlation coefficient between the tumor and the LAD1 subtype tumor; "LAD2" represents the Pearson correlation coefficient between the tumor and the LAD2 subtype tumor; "LAD3" represents the Pearson correlation coefficient between the tumor and the LAD3 subtype tumor; "LAD4" represents the Pearson correlation coefficient between the tumor and the LAD4 subtype tumor; "LAD5" represents the Pearson correlation coefficient between the tumor and the LAD5 subtype tumor;

"immunity index" is the immunity index calculated from the 9 immune-related genes in Table 3; "proliferation index" is the proliferation index calculated the 9 proliferation-related genes in Table 3.

In yet another specific embodiment, in step (3c-1), 21 lung adenocarcinoma molecular subtype and survival risk-related genes (see also Table 4) are used to calculate the survival risk score of the subject, RD=(−0.10*LAD1)+(0.36*LAD2)+(0.14*LAD3)+ (0.21*LAD4)+(−0.10*LAD5)+(−0.57*immunity index)+(0.07*proliferation index); wherein, "LAD1" represents the Pearson correlation coefficient between the tumor and the LAD1 subtype tumor; "LAD2" represents the Pearson correlation coefficient between the tumor and the LAD2 subtype tumor; "LAD3" represents the Pearson correlation coefficient between the tumor and the LAD3 subtype tumor; "LAD4" represents the Pearson correlation coefficient between the tumor and the LAD4 subtype tumor; "LAD5" represents the Pearson correlation coefficient between the tumor and the LAD5 subtype tumor; "immunity index" is the immunity index calculated from the 7 immune-related genes in Table 4; "proliferation index" is the proliferation index calculated from the 8 proliferation-related genes in Table 4.

Correspondingly, provided is also use of the gene panel according to the present disclosure in the molecular subtype of lung adenocarcinoma and/or the assessment of survival risk of a patient with lung adenocarcinoma. Provided is also use of the gene panel according to the present disclosure, the agent for detecting the expression levels of the genes in the gene panel according to the present disclosure for the manufacture of a product for lung adenocarcinoma molecular subtype and/or assessment of the survival risk of a patient with lung adenocarcinoma. In a preferable embodiment, the product is a detection/diagnostic kit. In an embodiment, the product is an in vitro diagnostic product. The agent is as described above. The product is as described above. According to the method or use according to the present disclosure, the lung adenocarcinoma can be classified into different molecular subtypes, and the molecular subtypes of the lung adenocarcinoma can comprise LAD1 subtype, LAD2 subtype, LAD3 subtype, LAD4 subtype, LAD5 subtype and mixed subtype. According to the method or use according to the present disclosure, the patient with lung adenocarcinoma can be assessed for survival risk, the survival risk can comprise low risk, medium risk and high risk.

In another aspect, provided is also a set of immune-related genes, comprising: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2D1A, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCD1LG2, C1QA, SLAMF8, VSIG4, CD163, LAIR1, SLAMF7 and MS4A4A (see also relevant information in Table 1).

In another aspect, provided is also a set of proliferation-related genes, comprising: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TYMS, TOP2A, PBK, CDC45, CDCA8, CENPA, MYBL2, SKA1, MCM10, TRIP13, TROAP, POLQ, GINS1, RAD54L and MS4A4A (see also relevant information in Table 1).

The present disclosure further relates to detecting the expression levels of the immune-related genes or proliferation-related genes as described above, and calculating the immunity index or proliferation index; wherein the immunity index can be used to assess the immune status of a lung adenocarcinoma patient and guide the cellular immunotherapy of lung adenocarcinoma, and the proliferation index can be used to assess the tumor growth and invasion in a lung adenocarcinoma patient, and they can be used to assess the survival risk of a lung adenocarcinoma patient. Accordingly, provided is also use of the immune-related genes or the proliferation-related genes in the assessment of lung adenocarcinoma survival risk.

Exemplary embodiments according to the present disclosure:

1. A gene panel for molecular subtype and/or survival risk assessment of lung adenocarcinoma, wherein the gene panel comprises 180 molecular subtype and survival risk assessment related genes and 6 house-keeping genes, wherein the 180 molecular subtype and survival risk assessment related genes comprise (1) proliferation-related genes: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TOP2A, TYMS, PBK, CDC45, CDCA8, CENPA, MYBL2, SKA1, MCM10, TRIP13, TROAP, POLQ, GINS1 and RAD54L; (2) immune-related genes: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2D1A, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCD1LG2, C1QA, SLAMF8, VSIG4, CD163, LAIR1, SLAMF7 and MS4A4A; (3) intercellular substance-related genes: LOXL2, SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1, SULF1, ADAMTS2, PRRX1, COL15A1, SPARC, THY1, FAP, DIO2, FN1, COL6A3, FBN1, SYNDIG1, AEBP1, LRRC15, CILP, ISLR, GAS1, COL10A1, ASPN, MMP2 and EPYC; the house-keeping genes comprise GAPDH, GUSB, MRPL19, PSMC4, SF3A1 and TFRC.

2. A gene panel for molecular subtype and/or survival risk assessment of lung adenocarcinoma, wherein the gene panel comprises 70 molecular subtype and survival risk assessment related genes and 6 house-keeping genes, wherein the 70 molecular subtype and survival risk assessment related genes comprise: (1) proliferation-related genes: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A; (2) immune-related genes: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; (3) intercellular substance-related genes: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1; the house-keeping genes comprise GAPDH, GUSB, MRPL19, PSMC4, SF3A1, TFRC.

3. A gene panel for molecular subtype and/or survival risk assessment of lung adenocarcinoma, wherein the gene panel comprises 24 molecular subtype and survival risk assessment related genes and 1 house-keeping gene, wherein the 24 molecular subtype and survival risk assessment related genes comprise: (1) proliferation-related genes: PLK1, PRC1, CCNB1, MKI67, TPX2, MELK, CDC20, TYMS and TOP2A; (2) immune-related genes: P2RY13, CCR2, PTPRC, IRF8, CLEC10A, TLR7, CCR4, IL7R and CD4; (3) intercellular substance-related genes: SPOCK1, COL1A1, POSTN, ADAM12, COL6A2 and COL5A1; the house-keeping gene comprises ACTB.

4. Use of the gene panel according to any one of items 1-3 in molecular subtype and/or survival risk assessment of lung adenocarcinoma.

5. Use of the gene panel according to any one of items 1-3 for the manufacture of a diagnostic product for molecular subtype and/or survival risk assessment of lung adenocarcinoma.

6. Use of an agent for expression levels of genes in the gene panel according to any one of items 1-3 for the manufacture of a diagnostic product for molecular subtype and/or of survival risk assessment of lung adenocarcinoma.

7. A diagnostic product for molecular subtype and/or survival risk assessment of lung adenocarcinoma, comprising a relevant agent for detecting expression levels of genes in the gene panel according to any one of items 1-3.

8. The use or diagnostic product according to item 6 or 7, wherein the diagnostic product is in a form of in vitro diagnostic product, preferably in the form of a diagnostic kit.

9. The use or diagnostic product according to any one of items 6-8, wherein the agent is an agent for detecting the amount of RNA, especially mRNA, transcribed from the genes.

10. The use or diagnostic product according to any one of items 6-9, wherein the agent is an agent for detecting the amount of cDNA complementary to the mRNA.

11. The use or diagnostic product according to any one of items 6-10, wherein the diagnostic product further comprises a total RNA extraction reagent, a reverse transcription reagent, a Next Generation Sequencing reagent and/or a quantitative PCR reagent.

12. The use or diagnostic product according to any one of items 6-11, wherein the agent is an agent for detecting the amount of polypeptides encoded by the genes, preferably the agent is an antibody, an antibody fragment or an affinity protein.

13. The use or diagnostic product according to any one of items 6-11, wherein the agent is a probe(s) or a primer(s), preferably a primer(s).

14. The use or diagnostic product according to item 13, wherein the primer(s) is as shown in SEQ ID NO. 1-SEQ ID NO. 152.

15. A set of primers for molecular subtype and/or survival risk assessment of lung adenocarcinoma, wherein the primers have the sequences as shown in SEQ ID NO. 1-SEQ ID NO. 152.

16. The use or diagnostic product according to item 13, wherein the primer(s) and probe(s) are as shown in SEQ ID NO. 153-SEQ ID NO. 227.

17. A set of primers and probes for molecular subtype and/or survival risk assessment of lung adenocarcinoma, wherein the primers and probes have the sequence as shown in SEQ ID NO. 153-SEQ ID NO. 227.

18. Use of the primer and probe set according to any one of items 14-17 for the manufacture of a product for molecular subtype and/or survival risk assessment of lung adenocarcinoma.

19. The gene panel, use, diagnostic product, or primer set according to any one of items 1-18, wherein the lung adenocarcinoma comprises a LAD1 subtype, a LAD2 subtype, a LAD3 subtype, a LAD4 subtype, a LAD5 subtype and a mixed subtype, wherein the mixed subtype comprises the lung adenocarcinoma not belonging to the LAD1 subtype, LAD2 subtype, LAD3 subtype, LAD4 subtype, LAD5 subtype.

Beneficial Effect

Provided are a gene panel for molecular subtype and/or survival risk assessment of lung adenocarcinoma, an agent for detecting expression levels of genes in said gene panel, and a method and product for molecular subtype and/or survival risk assessment of lung adenocarcinoma.

According to the expression levels of genes in the gene panel according to the present disclosure in lung adenocarcinoma samples, a molecular subtype system for lung adenocarcinoma is established, and lung adenocarcinoma can be classified into different subtypes, and more targeted individualized therapy can be provided for the patients with lung adenocarcinoma belonging to different subtypes. On the other hand, according to the method and use according to the present disclosure, the survival risk of a patient with lung adenocarcinoma can be well predicted and the tumor proliferation and immune status can be effectively assessed, which has important guiding significance for clinical treatment. By combining with the subtype, proliferation index, immunity index and risk score, the prognosis of a patient with lung adenocarcinoma can be judged. Lung adenocarcinoma molecular subtype and risk assessment of a patient with lung adenocarcinoma can screen out the population that benefits from various treatment options and provide potential therapeutic approaches. For a patient with low survival risk, radiotherapy and chemotherapy can be considered not to be done so as to reduce the occurrence of adverse events and the economic burden of treatment; for a patient with high survival risk, chemotherapy, radiotherapy or biological therapy should be supplemented in time to obtain the maximum clinical benefit. For a patient in an inoperable advanced stage, molecular diagnosis based on expression profiles can help to identifying populations that can benefit from a treatment plan to improve treatment efficiency and avoid ineffective treatment.

As compared with the current lung adenocarcinoma molecular classification method, the advantage of the present disclosure lies in that not only lung adenocarcinoma is subtyped, but also the immunity index, proliferation index and survival risk of a patient with tumor are assessed, and the prognosis of a patient with lung adenocarcinoma and possible benefits from the treatment are comprehensively assessed. Another advantage of the present disclosure lies in that multiple selectable genes or gene combinations are provided as complementary embodiments. When the present disclosure is applied to a patient with cancer, if the detection of the expression levels of one or certain genes is invalid or malfunctioning, due to the patient's pathological condition or other reasons (such as one or certain genes are abnormally expressed), multiple alternatives can be used as supplement, such that the detection results based on the present disclosure are more stable and reliable.

EXAMPLES

The present disclosure is further described below by Examples, which do not limit the present disclosure to the scope of the Examples. The experimental procedures without specific conditions in the following Examples can be selected according to conventional methods and conditions. The reagents and instruments used in the Examples herein are all commercially available.

Example 1: Screening of the Related Gene Panel for Lung Adenocarcinoma Subtype Classification and Survival Risk Assessment Procedure: The expression levels of lung adenocarcinoma genes in 504 cases with complete clinical information in the TCGA database were analyzed through the gene expression profile analysis program EPIG (see, Zhou, Chou et al, 2006. Environ Health Perspect 114 (4), 553-559; Chou, Zhou et al, 2007.BMC Bioinformatics 8, 427), and the proliferation-related genes, immune-related genes, and intercellular substance-related genes closely related to lung adenocarcinoma survival risk were screened. Genes with large contribution to subtype classification and survival risk in each group of genes were calculated and selected.

Results: A total of 180 genes and 6 house-keeping genes related to lung adenocarcinoma subtype classification and survival risk were screened, i.e., 186-gene testing combination. See Table 1 for a list of genes.

The 186 genes screened were validated for validity and stability in the data of Affymatricsgene chip expression profiles with 1346 cases of lung adenocarcinoma. The lung adenocarcinoma can be classified into LAD1 subtype, LAD2 subtype, LAD3 subtype, LAD4 subtype, LAD5 subtype or mixed subtype:

LAD1 subtype is mainly characterized in low expression of proliferation-related genes, high expression of immune-related genes, low expression of intercellular substance-related genes and highest 5-year survival rate;

LAD2 subtype is mainly characterized in high expression of proliferation-related genes, low expression of immune-related genes, medium expression of intercellular substance-related genes and low 5-year survival rate;

LAD3 subtype is mainly characterized in low expression of proliferation-related genes, medium expression of immune-related genes, high expression of intercellular substance-related genes and medium 5-year survival rate;

LAD4 subtype is mainly characterized in medium expression of proliferation-related genes, low expression of immune-related genes, high expression of intercellular substance-related genes and low 5-year survival rate;

LAD5 subtype is mainly characterized in high expression of proliferation-related genes, medium expression of immune-related genes, low expression of intercellular substance-related genes and medium 5-year survival rate;

mixed subtype is the lung adenocarcinoma not belonging to the LAD1 subtype, LAD2 subtype, LAD3 subtype, LAD4 subtype and LAD5 subtype.

Example 2: Testing Combinations of Genes for Molecular Subtype and Survival Risk Assessment of Lung Adenocarcinoma From the 186 genes screened in Example 1, the testing combinations of 76 genes and 24 genes were selected for molecular subtype and survival risk assessment of lung adenocarcinoma.

76-Gene Testing Combination:

Procedure: the 76-gene testing combination was used (see Table 2), wherein the gene panel of 70 lung adenocarcinoma molecular subtype and survival risk related genes (proliferation-related genes: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A; immune-related genes: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; intercellular substance-related genes: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1) to determine the molecular subtype of lung adenocarcinoma and assess the survival risk of a patient with lung adenocarcinoma, 6 internal reference genes (comprising GAPDH, GUSB, MRPL19, PSMC4, SF3A1 and TFRC) were used as internal reference to standardize the expression levels of the molecular subtype and survival risk related genes. 70 lung adenocarcinoma molecular subtype and survival risk-related genes in Table 2 were used to calculate the survival risk index.

Results:

1. Lung Adenocarcinoma Molecular Subtype

According to the standard test data obtained in Example 1, via the lung adenocarcinoma molecular subtype method as described above (see steps (3-1) to (3-3) in the "The method and use according to the present disclosure" section), using the expression levels of the 70 lung adenocarcinoma molecular subtype and survival risk-related genes (standardized by the expression levels of GAPDH, GUSB, MRPL19, PSMC4, SF3A1 and TFRC) shown in Table 2, 504 lung adenocarcinoma cases were subjected to molecular subtype, and the lung adenocarcinoma tumors were classified into LAD1 subtype, LAD2 subtype, LAD3 subtype, LAD4 subtype, LAD5 subtype or mixed subtype. FIG. 1 shows the expression heatmap of 70 lung adenocarcinoma molecular subtype and survival risk-related genes in each subtype.

Figure 2:
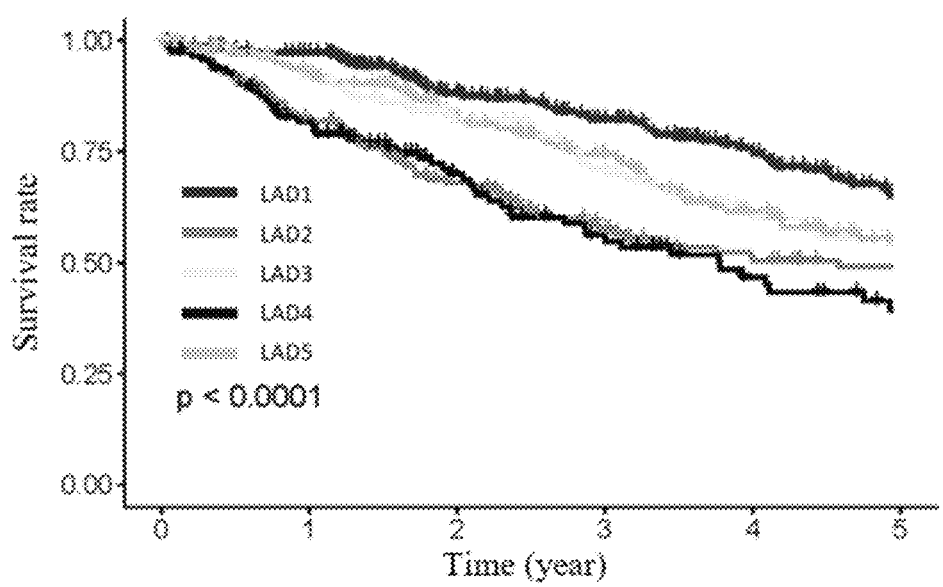
FIG. 2 is a Kaplan-Meier survival curve, showing different survival risk of each subtype of lung adenocarcinoma, wherein LAD1 subtype has a good 5-year survival rate, LAD2 subtype and LAD4 subtype have relatively poor 5-year survival rate, LAD3 subtype and LAD5 subtype have intermediate prognosis.

By calculating the survival number and time of different subtypes, taking the disease progression or death due to lung adenocarcinoma and its related causes as observed events within 5 years after the initiation of treatment in lung adenocarcinoma cases, the 5-year survival rate can be obtained by drawing the Kaplan-Meier survival curve, indicating survival risk of each subtype. As shown in FIG. 2, the survival risk of the above subtypes varies, showing that the survival risk of each subtype of lung adenocarcinoma is different.

LAD1 subtype is mainly characterized in low expression of proliferation-related genes, high expression of immune-related genes, low expression of intercellular substance-related genes and highest 5-year survival rate;

LAD2 subtype is mainly characterized in high expression of proliferation-related genes, low expression of immune-related genes, medium expression of intercellular substance-related genes and low 5-year survival rate;

LAD3 subtype is mainly characterized in low expression of proliferation-related genes, medium expression of immune-related genes, high expression of intercellular substance-related genes and medium 5-year survival rate;

LAD4 subtype is mainly characterized in medium expression of proliferation-related genes, low expression of immune-related genes, high expression of intercellular substance-related genes and low 5-year survival rate;

LAD5 subtype is mainly characterized in high expression of proliferation-related genes, medium expression of immune-related genes, low expression of intercellular substance-related genes and medium 5-year survival rate.

2. Proliferation Index

Figure 3:
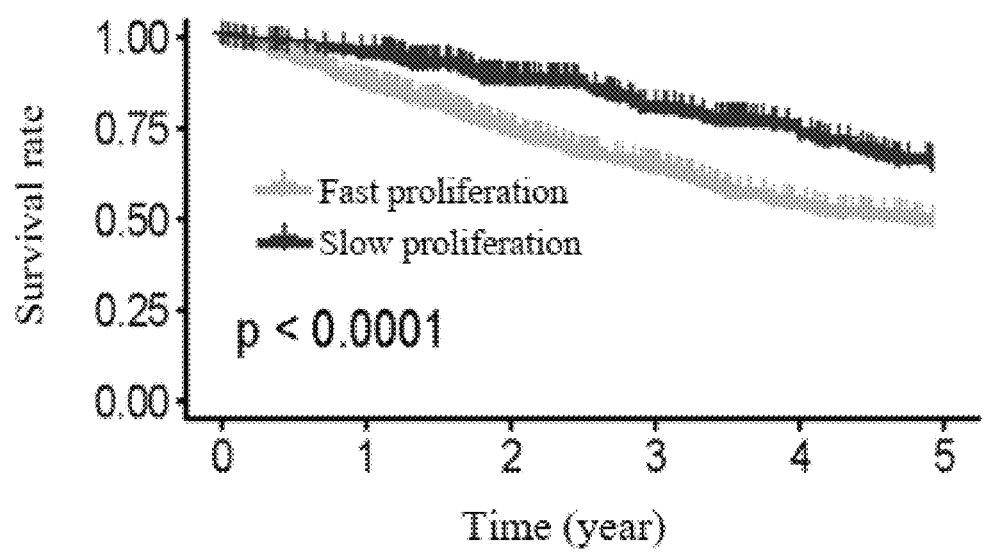
FIG. 3 is a Kaplan-Meier survival curve, showing that the proliferation index can indicate lung adenocarcinoma prognosis. According to the proliferation index, the lung adenocarcinoma cases can be categorized as two groups of fast proliferation and slow proliferation, where the fast proliferation group has a low 5-year survival rate.

According to the standard test data obtained in Example 1, via the above-mentioned proliferation index calculation method (see steps (3a-1) to (3a-3) in the "The method and use according to the present disclosure" section), the expression levels of 23 cell proliferation-related genes PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A were used to calculate the proliferation index and the lung adenocarcinoma were classified into two groups: fast proliferation and slow proliferation, and the survival difference between the two groups was observed. The results showed that the proliferation index can indicate the prognosis of lung adenocarcinoma. The 5-year survival rate of lung adenocarcinoma case group with fast proliferation was low and the prognosis was poor; the 5-year survival rate of lung adenocarcinoma case group with slow proliferation was high and the prognosis was good (FIG. 3).

$$\text{Proliferation index} = \frac{1}{n} * \sum_{i=1}^{n} \text{proliferation-related genes } (n = 23)$$

3. Immunity Index

Figure 4:
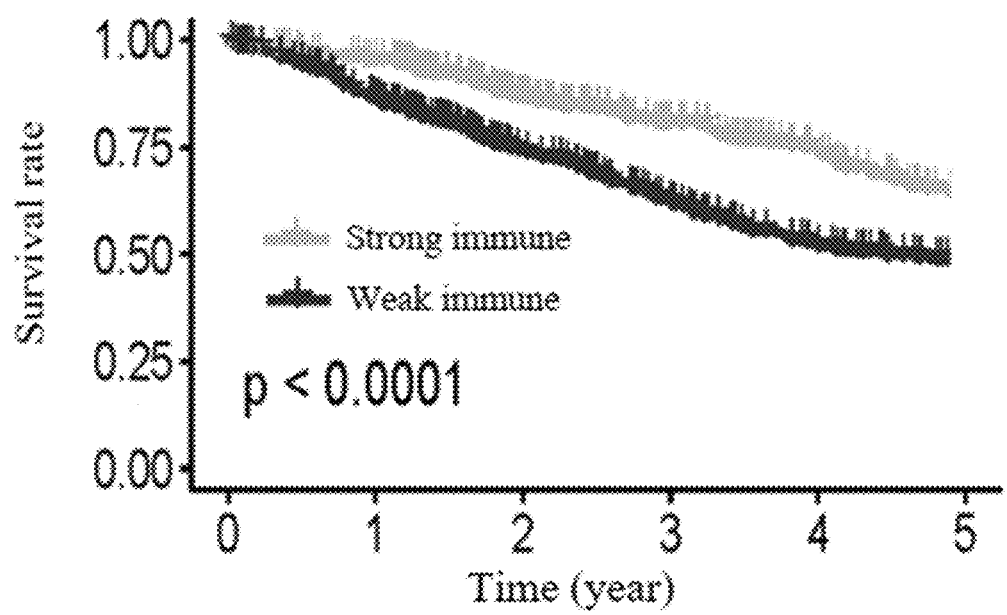
FIG. 4 is a Kaplan-Meier survival curve, showing that the immunity index can indicate lung adenocarcinoma prognosis. According to the immunity index, the lung adenocarcinoma cases can be categorized as two groups of strong immunity index and weak immunity index, where the strong immunity index group has high 5-year survival rate.

According to the standard test data obtained in Example 1, via the immunity index calculation method as above described (see steps (3b-1) to (3b-3) in the "The method and use according to the present disclosure" section), the expression levels of the 30 immune-related genes PP2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ were used to calculate the immunity index. According to the immunity index, each subtype was further classified into two groups, the strong immune group and the weak immune group, and the survival difference between the two groups was observed. The results showed that the immunity index can indicate the prognosis of lung adenocarcinoma, and the 5-year survival rate of the case group with strong immunity index was higher and the prognosis was relatively good (FIG. 4).

$$\text{Immunity index} = \frac{1}{n} * \sum_{i=1}^{n} \text{immune-related genes } (n = 30)$$

4. Survival Risk Assessment

The calculation of tumor survival risk used the Cox model, taking the occurrence and time of disease progression or death as the observation endpoint, according to the relative risk of the impact on survival regarding tumor subtype, proliferation index and immunity index to determine the corresponding coefficient so as to calculate the survival risk score. The calculation method is as follows:

Survival risk score (Risk of Death, RD) calculation: 0-100 0-35, low risk; 36-70, medium risk; 71-100, high risk;

RD=(−0.18*LAD1)+(0.09*LAD2)+(0.04*LAD3)+ (0.17*LAD4)+(−0.17*LAD5)+(−0.05*immunity index)+(0.12*proliferation index);

wherein, "LAD1" represents the Pearson correlation coefficient between the tumor and the LAD1 subtype tumor; "LAD2" represents the Pearson correlation coefficient between the tumor and the LAD2 subtype tumor; "LAD3" represents the Pearson correlation coefficient between the tumor and the LAD3 subtype tumor; "LAD4" represents the Pearson correlation coefficient between the tumor and the LAD4 subtype tumor; "LAD5" represents the Pearson correlation coefficient between the tumor and the LAD5 subtype tumor; "immunity index" is the immunity index calculated from the 30 immune-related genes as described above; "proliferation index" is the proliferation index calculated from the 23 cell proliferation-related genes as described above.

Figure 5:
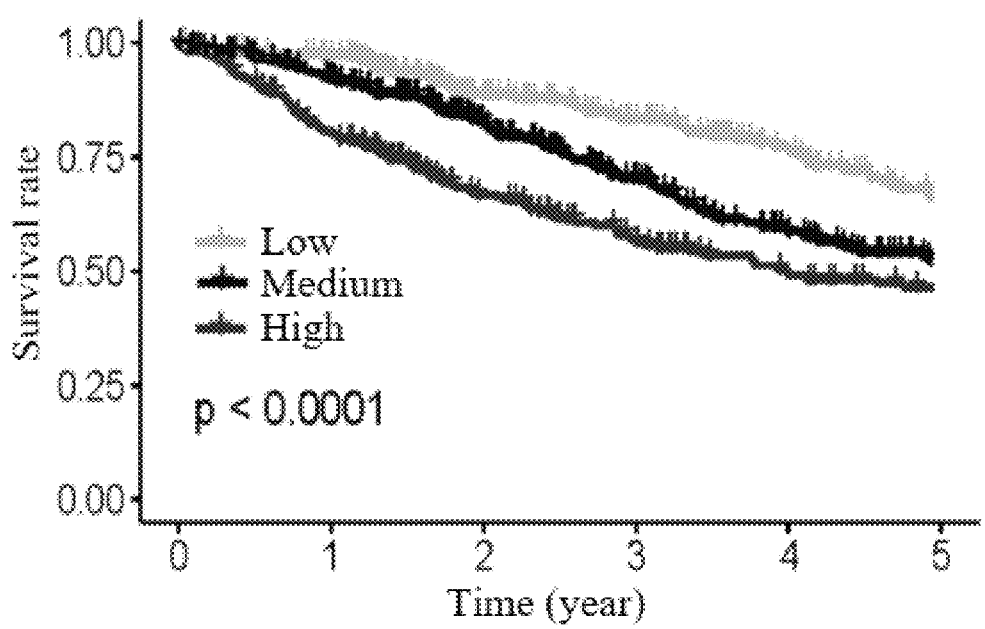
FIG. 5 is a Kaplan-Meier, showing that the lung adenocarcinoma survival risk calculated based on subtype, proliferation index, immunity index can indicate survival risk. Low risk (survival risk index is 0-35) group has high 5-year survival rate, medium risk (survival risk index is 36-70) group has medium 5-year survival rate, high risk (survival risk index is 71-100) has low 5-year survival rate.

According to the calculated survival risk score, the risk of tumor survival can be classified into three groups, low risk (0-35), medium risk (36-70) and high risk (71-100). The results showed that the survival risk index can indicate the survival risk of a patient with lung adenocarcinoma: the 5-year survival rate of the low risk group was high, the 5-year survival rate of the medium risk group was medium, and the 5-year survival rate of the high risk group was low (FIG. 5).

25-Gene Testing Combination:

The method of lung adenocarcinoma molecular subtype, the calculation methods of proliferation index, immunity index and survival risk score of the 25-gene testing combination are similar to those of the 76-gene testing combination. The 25-gene testing combination (see Table 3) comprises: a gene panel of 24 lung adenocarcinoma molecular subtype and survival risk related genes (proliferation-related genes: PLK1, PRC1, CCNB1, MKI67, TPX2, MELK, CDC20, TYMS and TOP2A; immune-related genes: P2RY13, CCR2, PTPRC, IRF8, CLEC10A, TLR7, CCR4, IL7R and CD4; intercellular substance-related genes: SPOCK1, COL1A1, POSTN, ADAM12, COL6A2 and COL5A1), which is used to determine the molecular subtype of lung adenocarcinoma and to assess the survival risk of a patient with lung adenocarcinoma; and a reference gene (ACTB) as the internal standard, which is used to standardize the expression levels of molecular subtype and survival risk-related genes. The 24 lung adenocarcinoma molecular subtype and survival risk related genes in Table 3 were used to calculate the survival risk index.

Results:
1. Lung Adenocarcinoma Molecular Subtype

Using the expression levels of 24 lung adenocarcinoma molecular subtype and survival risk related genes shown in Table 3 (standardized by the expression level of ACTB), 504 lung adenocarcinoma cases were subjected to molecular subtype, and the lung adenocarcinoma tumors were classified into LAD1 subtype, LAD2 subtype, LAD3 subtype, LAD4 subtype, LAD5 subtype or mixed subtype. The results were similar to those of the 76-gene testing combination.

2. Proliferation Index

The proliferation index was calculated from the expression levels of 9 cell proliferation-related genes PLK1, PRC1, CCNB1, MKI67, TPX2, MELK, CDC20, TYMS and TOP2A, and the lung adenocarcinoma can be classified into two groups: fast proliferation and slow proliferation. Difference in survival between the two groups was observed. The results were similar to those of the 76-gene testing combination.

$$\text{Proliferation index} = \frac{1}{n} * \sum_{i=1}^{n} \text{proliferation-related genes} \ (n = 9)$$

3. Immunity Index

The immunity index was calculated according to the expression levels of 9 immune-related genes P2RY13, CCR2, PTPRC, IRF8, CLEC10A, TLR7, CCR4, IL7R and CD4. According to the immunity index, each subtype can be further classified into two groups: strong immune group and weak immune group. Difference in survival between the two groups was observed. The results were similar to those of the 76-gene testing combination.

$$\text{Immunity index} = \frac{1}{n} * \sum_{i=1}^{n} \text{immune-related genes} \ (n = 9)$$

4. Survival Risk Assessment

The calculation of tumor survival risk used the Cox model, taking the occurrence and time of disease progression or death as the observation endpoint, according to the relative risk of the impact on survival regarding tumor subtype, proliferation index and immunity index to determine the corresponding coefficient so as to calculate the survival risk score. The calculation method is as follows:

RD=(−0.12*LAD1)+(0.29*LAD2)+(0.13*LAD3)+ (0.18*LAD4)+(−0.09*LAD5)+(−0.55*immunity index)+(0.07*proliferation index);

wherein, "LAD1", "LAD2", "LAD3", "LAD4", "LAD5" are as defined above, "immunity index" is the immunity index calculated for the 9 immune-related genes as described above; "proliferation index" is the proliferation index calculated for the 9 cell proliferation-related genes as described above.

According to the calculated survival risk score, the risk of tumor survival can be classified into three groups: low risk (0-35), medium risk (36-70) and high risk (71-100). The results were similar to those of the 76-gene testing combination.

24-Gene Testing Combination:

The method of lung adenocarcinoma molecular subtype, the calculation methods of proliferation index, immunity index and survival risk score of the 24-gene testing combination are similar to those of the 76-gene testing combination. The 24-gene testing combination (see Table 4) comprises: a gene panel of 21 lung adenocarcinoma molecular subtype and survival risk related genes (proliferation-related genes: PLK1, PRC1, CCNB1, MKI67, TPX2, MELK, CDC20 and TOP2A; immune-related genes: P2RY13, CCR2, PTPRC, IRF8, CLEC10A, TLR7 and IL7R; intercellular substance-related genes: SPOCK1, COL1A1, POSTN, ADAM12, COL6A2 and COL5A1), which is used to determine the molecular subtype of lung adenocarcinoma and to assess the survival risk of a patient with lung adenocarcinoma; and 3 internal reference genes (including GAPDH, GUSB and TFRC) as the internal standard, which were used to standardize the expression levels of molecular subtype and survival risk-related genes. The 21 lung adenocarcinoma molecular subtype and survival risk related genes in Table 4 were used to calculate the survival risk index.

Results:
1. Lung Adenocarcinoma Molecular Subtype

Using the expression levels of the 21 lung adenocarcinoma molecular subtype and survival risk related genes shown in Table 4 (standardized by the expression levels of GAPDH, GUSB and TFRC), 504 lung adenocarcinoma cases were subjected to molecular subtype, and the lung adenocarcinoma tumors were classified into LAD1 subtype, LAD2 subtype, LAD3 subtype, LAD4 subtype, LAD5 subtype or mixed subtype. The results were similar to those of the 76-gene testing combination.

2. Proliferation Index

The proliferation index was calculated from the expression levels of 8 cell proliferation-related genes PLK1, PRC1, CCNB1, MKI67, TPX2, MELK, CDC20 and TOP2A, and the lung adenocarcinoma can be classified into two groups: fast proliferation and slow proliferation. Difference in survival between the two groups was observed. The results were similar to those of the 76-gene testing combination.

$$\text{Proliferation index} = \frac{1}{n} * \sum_{i=1}^{n} \text{proliferation-related genes} \ (n = 8)$$

3. Immunity Index

The immunity index was calculated according to the expression levels of 7 immune-related genes P2RY13, CCR2, PTPRC, IRF8, CLEC10A, TLR7 and IL7R. According to the immunity index, each subtype can be further classified into two groups: strong immune group and weak immune group. Difference in survival between the two groups was observed. The results were similar to those of the 76-gene testing combination.

$$\text{Immunity index} = \frac{1}{n} * \sum_{i=1}^{n} \text{immune-related genes} \ (n = 7)$$

4. Survival Risk Assessment

The calculation of tumor survival risk used the Cox model, taking the occurrence and time of disease progression or death as the observation end point, according to the relative risk of the impact on survival regarding tumor subtype, proliferation index and immunity index to determine the corresponding coefficient so as to calculate the survival risk score. The calculation method is as follows:

RD=(−0.10\*LAD1)+(0.36\*LAD2)+(0.14\*LAD3)+ (0.21\*LAD4)+(−0.10\*LAD5)+(−0.57\*immunity index)+(0.07\*proliferation index);

wherein, "LAD1", "LAD2", "LAD3", "LAD4", "LAD5" are as defined above, "immunity index" is the immunity index calculated for the 7 immune-related genes as described above; "proliferation index" is the proliferation index calculated for the 8 cell proliferation-related genes as described above.

According to the calculated survival risk score, the risk of tumor survival can be classified into three groups: low risk (0-35), medium risk (36-70) and high risk (71-100). The results were similar to those of the 76-gene testing combination.

Example 3: Next-Generation Sequencing Detection Kit for Determining the Molecular Subtype of Lung Adenocarcinoma and Assessing the Survival Risk in a Patient with Lung Adenocarcinoma According to the 76-gene testing combination and the 24-gene testing combination in Example 2, a Next Generation Sequencing detection kit was designed, comprising the primers for specific amplification of the cDNAs of the 76 genes or 24 genes, and the primer sequences are shown in Table 5 and Table 6, respectively. The method for determining the molecular subtype of lung adenocarcinoma and assessing the survival risk in a patient with lung adenocarcinoma using Next Generation Sequencing detection kit is described below.

Step 1: taking the tumor or paraffin-embedded tissue of the testing subject and using the protocol in the detection kit to obtain the area of the testing subject containing high content of tumor cells as the original material.

Step 2: extracting total RNA from the tissue. RNA storm CD201RNA or Qiagen RNease FFPE kit RNA extraction kit can be used for extraction.

Step 3: preparing the obtained RNA into a library for sequencing. The RNA of the obtained tissue is prepared into a library for Next Generation Sequencing via targeted RNA-seq technology. The preparation method of the library comprises the following steps:

(3-1): reverse transcribing the RNA extracted in step (2) into cDNA using ProtoScript® II reverse transcriptase (New England Biolabs, #M0368L).

(3-2): using TruSeq® Targeted RNA Library Construction Kit (#15034457) from Illumina, preparing the obtained cDNA into a library ready for sequencing. The specific steps are as follows: (i) hybridization: adding 4.5 µl of TOP (see Table 5 or Table 6 for the specific compositions), adding 21 µl of OB1 after mixing, heating to 70° C. and then slowly cooling to 30° C.; (ii) extension and ligation: adsorbing the product in (i) on a magnetic stand and discarding the supernatant, washing twice with AM1 and UB1 in the kit, discarding the supernatant, adding 36 µl of ELM4, and incubating in a PCR instrument or a metal bath for 37° C. for 45 min; (iii) subjecting the product obtained in (ii) to ligation for the sequencing tag (Index), and then to PCR: adsorbing the product obtained in (ii) on a magnetic stand, discarding the supernatant, add 18 µl of 40-fold diluted HP3, 16 µl of which were taken after absorption with a magnetic stand and added with 17.3 µl of TDP1, 0.3 µl of PMM2, 6.4 µl of Index, and mixing well, where the PCR amplification was performed for 32 cycles; (iv) purifying the DNA using Gnome DNA (QuestGenomics, Nanjing) purification kit to obtain the library.

Step 4: subjecting the obtained DNA library to Next Generation Sequencing using NextSeq/MiSeq/MiniSeq/iSeq. The Illumina NextSeq/MiSeq/MiniSeq/iSeq sequencer was used to perform paired-end or single-end sequencing. This process was done automatically by the instrument itself (Illumina).

Step 5: Statistical analysis of the results. Performing statistical analysis on the obtained sequencing results; then, subjecting the lung adenocarcinoma of the subjects to molecular subtype by the method described in Example 2, calculating the immunity index, proliferation index and survival risk score, and predicting the survival risk.

TABLE 5

| No. | Gene Name | Gene ID | Sequence of primers in upstream region of genes (Forward) | Sequence of primers in downstream region of genes (Reverse) |
|---|---|---|---|---|
| 1 | PLK1 | NM_005030 | CAGCAAGTGGGTGGACTATT (SEQ ID NO. 1) | ATCAGTGGGCACAAGATGAG (SEQ ID NO. 2) |
| 2 | PRC1 | NM_001267580 | TGTGTGTCCGAAGTTGAGATG (SEQ ID NO. 3) | GGCAGACAGCGGAAGAATAA (SEQ ID NO. 4) |
| 3 | CCNB1 | NM_031966 | CCAGAACCTGAGCCTGTTAAA (SEQ ID NO. 5) | CTCGACATCAACCTCTCCAATC (SEQ ID NO. 6) |
| 4 | DLGAP5 | NM_001146015 | CCAGACCGAGTGTTCTTTACTT (SEQ ID NO. 7) | CTTTGGCCTTTGACCTTGTAATC (SEQ ID NO. 8) |
| 5 | KPNA2 | NM_002266 | GCTGGGCTATTTCCTACCTTAC (SEQ ID NO. 9) | GTGTAGCCTTCAGAGGTAGTTTC (SEQ ID NO. 10) |
| 6 | CCNA2 | NM_001237 | CCAAGAGGACCAGGAGATATC (SEQ ID NO. 11) | GAGGTATGGGTCAGCATCTATC (SEQ ID NO. 12) |
| 7 | RRM2 | NM_001034 | CCATCGGAGGAGAGTAAGA (SEQ ID NO. 13) | ACTACACAAGCCACAGGATAAA (SEQ ID NO. 14) |
| 8 | FOXM1 | NM_001243088 | CAGGAGTCTAATCAAGCAGAGG (SEQ ID NO. 15) | GTGGTCCTCAATCCACGTATAG (SEQ ID NO. 16) |

TABLE 5-continued

| No. | Gene Name | Gene ID | Sequence of primers in upstream region of genes (Forward) | Sequence of primers in downstream region of genes (Reverse) |
|---|---|---|---|---|
| 9 | MKI67 | NM_001145966 | AGTACCAGGAGGTGAGGATAAA (SEQ ID NO. 17) | CTGCACTGGAGTTCCCATAAA (SEQ ID NO. 18) |
| 10 | KIF14 | NM_001305792 | GGAAGCAGAACTGAGAGAAGAG (SEQ ID NO. 19) | GAGCCTTGGAAATGGCAAATAG (SEQ ID NO. 20) |
| 11 | HJURP | NM_001282962 | ACCTTCACGTTCAGGGAAATAG (SEQ ID NO. 21) | CAGAGAGCAAGTGGGAAGATAAA (SEQ ID NO. 22) |
| 12 | TPX2 | NM_012112 | CCTGCCAGAGAAGAAGGTAAAG (SEQ ID NO. 23) | CGGTCCTAGGTTTGAGGTTAAG (SEQ ID NO. 24) |
| 13 | NEK2 | NM_001204182 | GAGAGAAGAGGGCGACAATTAG (SEQ ID NO. 25) | ACAGGAACTTCCGTTCCTTTAG (SEQ ID NO. 26) |
| 14 | CDK1 | NM_001170406 | CTTTAGCGCGGATCTACCATAC (SEQ ID NO. 27) | CTCTGCCCTAGGCTTTCATTAC (SEQ ID NO. 28) |
| 15 | CDKN3 | NM_001130851 | CCCAAACCTTCTGGATCTCTAC (SEQ ID NO. 29) | TATGGCTTGCTCTGGTGATATT (SEQ ID NO. 30) |
| 16 | ASPM | NM_001206846 | ACTCAGGATTCCGGCAATAAG (SEQ ID NO. 31) | GGTATTCCACCAAGGTCTCTAAC (SEQ ID NO. 32) |
| 17 | CEP55 | NM_001127182 | TGCCATCACAGAGCCATTAG (SEQ ID NO. 33) | GCTGGAGTGTCAAAGGTAGATAG (SEQ ID NO. 34) |
| 18 | BIRC5 | NM_001012270 | GCACCACTTCCAGGGTTTAT (SEQ ID NO. 35) | CAGACGCTTCCTATCACTCTATTC (SEQ ID NO. 36) |
| 19 | MELK | NM_001256685 | ACCTCACGGCTACCTATCTT (SEQ ID NO. 37) | CTGTATCACACCCACACTCATC (SEQ ID NO. 38) |
| 20 | CDC20 | NM_001255 | TGGATTGGAGTTCTGGAATG (SEQ ID NO. 39) | GTGAACCACTGGACAGGATATAG (SEQ ID NO. 40) |
| 21 | TYMS | NM_001071 | GGAGGAGTTGCTGTGGTTTAT (SEQ ID NO. 41) | TTTGGGAAAGGTCTGGGTTC (SEQ ID NO. 42) |
| 22 | AURKA | NM_003600 | GTGTGCCTTAACCTCCCTATTC (SEQ ID NO. 43) | GACACATGGCCTCTTCTGTATC (SEQ ID NO. 44) |
| 23 | TOP2A | NM_001067 | GTGTGGTTGGGAGAGACAAAATA (SEQ ID NO. 45) | ATGGGCTGCAAGAGGTTTAG (SEQ ID NO. 46) |
| 24 | P2RY13 | NM_176894 | CCCTAGAACTTGCCTACCTTTC (SEQ ID NO. 47) | TTGAGGTGATGGTGGATATTG (SEQ ID NO. 48) |
| 25 | CCR2 | NM_001123041 | CTGTATCTCCGCCTTCACTTTC (SEQ ID NO. 49) | CACCGCTCTCGTTGGTATTT (SEQ ID NO. 50) |
| 26 | PTPRC | NM_001267798 | GCTCACTTCTCCTACCTTCTTG (SEQ ID NO. 51) | GTTCCCTTTATCGTCCACTCTC (SEQ ID NO. 52) |
| 27 | IRF8 | NM_002163 | GCTTTGTTGCCAGGAAGATTAG (SEQ ID NO. 53) | GAGACTTGGGAGATTGGATGAG (SEQ ID NO. 54) |
| 28 | CLEC10A | NM_006344 | CTGGTGCAAGACCTGAAGAA (SEQ ID NO. 55) | CTAGAAGAGGCAAGGCCAATAA (SEQ ID NO. 56) |
| 29 | TLR7 | NM_016562 | CTGGAAGACCCAAGAGAGAAAC (SEQ ID NO. 57) | TCCCAAAGTGCTGGGATTAC (SEQ ID NO. 58) |
| 30 | CCR4 | NM_005508 | CTTGGGTTCTGGACACCTTAC (SEQ ID NO. 59) | CACTGGCTCAGGAATCTCTTAC (SEQ ID NO. 60) |
| 31 | IL7R | NM_002185 | AGTGGGCAGGTGTTCTTTAC (SEQ ID NO. 61) | GTCTCCGATCAGGAGGTTTATTT (SEQ ID NO. 62) |
| 32 | SPN | NM_001030288 | CCTCCCAAAGTGCTGAGATTAC (SEQ ID NO. 63) | GGTGGATGAGGAGGGTTTATTC (SEQ ID NO. 64) |
| 33 | SASH3 | NM_018990 | CCTCCTACTCACCCACTTTATTC (SEQ ID NO. 65) | TCCCTCCACCCTCTCATATT (SEQ ID NO. 66) |

TABLE 5-continued

| No. | Gene Name | Gene ID | Sequence of primers in upstream region of genes (Forward) | Sequence of primers in downstream region of genes (Reverse) |
|---|---|---|---|---|
| 34 | CSF2RB | NM_000395 | GGGAAACTGCCAAACAAAGG (SEQ ID NO. 67) | GGAAGCCTAGGGACCAATAAAG (SEQ ID NO. 68) |
| 35 | CD37 | NM_001040031 | CTCTCCGTCTCTCTTTCTCTCT (SEQ ID NO. 69) | AGCTGGAACTGCACATAGTC (SEQ ID NO. 70) |
| 36 | IKZF1 | NM_001220765 | GCTCTGCACCTGTAGGATATTG (SEQ ID NO. 71) | CCCTTGCTTGTTGGGATTAGA (SEQ ID NO. 72) |
| 37 | CD48 | NM_001256030 | GATACCTGGCGAGTCTGTAAAC (SEQ ID NO. 73) | TGTGCAAGGAGGCTGAATAG (SEQ ID NO. 74) |
| 38 | IL10RA | NM_001558 | AGTAGTGGCAGCAGCAATAG (SEQ ID NO. 75) | GGTGACCAGGTCTGAGTTAAAG (SEQ ID NO. 76) |
| 39 | EVI2B | NM_006495 | GCAGTCACAGCCTACCTTATT (SEQ ID NO. 77) | TGTTGAACCATCAGCACTATCT (SEQ ID NO. 78) |
| 40 | IGSF6 | NM_005849 | GAAGAGTGCTCGGCGTATTT (SEQ ID NO. 79) | CGTTGTCCCTCCCAACTTATT (SEQ ID NO. 80) |
| 41 | CD52 | NM_001803 | CCTCAGCATCCAGCAACATA (SEQ ID NO. 81) | GCACTGCCTGTCAACTTCTA (SEQ ID NO. 82) |
| 42 | DOCK2 | NM_004946 | CATACCTGACCCTTCCTTCTTATC (SEQ ID NO. 83) | CACTTCCTCTCCATCCACAATC (SEQ ID NO. 84) |
| 43 | CD84 | NM_001184879 | GAAGGAATGGCTGGGCTATATT (SEQ ID NO. 85) | CTGAGGTACAGCGAGGTTAAAG (SEQ ID NO. 86) |
| 44 | FOLR2 | NM_000803 | CAATGCAGTCCCTGGAAGAA (SEQ ID NO. 87) | CTGTAGTTGCTGACCTTGTATGA (SEQ ID NO. 88) |
| 45 | NCKAP1L | NM_001184976 | TTGCCTCTTTCCCACCTATTC (SEQ ID NO. 89) | ACCCTCTGTCCATCTACCTTTA (SEQ ID NO. 90) |
| 46 | TRAC | XO2592.1 | CTCAGCATCCGGCCAAATA (SEQ ID NO. 91) | GCAGTGACAAGCAGCAATAAG (SEQ ID NO. 92) |
| 47 | MNDA | NM_002432 | GCTTTCATTTCTCAGCCCTTTAC (SEQ ID NO. 93) | CTGCTCTTGGGACACCTTATT (SEQ ID NO. 94) |
| 48 | MRC1 | NM_002438 | CAGCTCTGGGAACTTGGATTAG (SEQ ID NO. 95) | GATCTTCCACCTGCTCCATAAA (SEQ ID NO. 96) |
| 49 | PLEK | NM_002664 | CAACCCTGATGCCTTCTACTAC (SEQ ID NO. 97) | CCTCACTCTTCCTGCCATTT (SEQ ID NO. 98) |
| 50 | SPIB | NM_001243998 | GAGGCTGTAGTGAGCTGTAATC (SEQ ID NO. 99) | GAGATCTTCCTCCTCCTTCTCT (SEQ ID NO. 100) |
| 51 | CD53 | NM_000560 | CTTCGGAGTGCTCTTCCATAAC (SEQ ID NO. 101) | TCAGACCCTTAGCCACATACT (SEQ ID NO. 102) |
| 52 | CD4 | NM_000616 | TGGAGAACAAGGAGGCAAAG (SEQ ID NO. 103) | GGGAGAGGGTCAGAGAGAAATA (SEQ ID NO. 104) |
| 53 | LYZ | NM_000239 | GGGAATCAGCCTAGCAAACT (SEQ ID NO. 105) | TGCCACCCATGCTCTAATG (SEQ ID NO. 106) |
| 54 | SPOCK1 | NM_004598 | CTACTGTCCGCCACTGATTT (SEQ ID NO. 107) | GCCTATGGTCTGTCTTCCTATG (SEQ ID NO. 108) |
| 55 | COL1A1 | NM_000088 | CAGACTGGCAACCTCAAGAA (SEQ ID NO. 109) | TGTGGAGAAGGAGCAGAAAG (SEQ ID NO. 110) |
| 56 | POSTN | NM_001135934 | GAGACGCTGGAAGGAAATACA (SEQ ID NO. 111) | CTCCTGGTGTCAGGTGATAAAG (SEQ ID NO. 112) |
| 57 | ADAM12 | NM_001288973 | CTCAGACCTGCTCCACAATATC (SEQ ID NO. 113) | GCAAGTAGACAGAGCACCATAG (SEQ ID NO. 114) |

TABLE 5-continued

| Gene No. | Gene Name | Gene ID | Sequence of primers in upstream region of genes (Forward) | Sequence of primers in downstream region of genes (Reverse) |
|---|---|---|---|---|
| 58 | COL6A2 | NM_001849 | CCAACTTCACACTGGAGAAGAA (SEQ ID NO. 115) | GCGAGAAGGAGTTCAGGTATTG (SEQ ID NO. 116) |
| 59 | COL5A1 | NM_000093 | TTCCAAGGTAAGCCTCGTAAAG (SEQ ID NO. 117) | CAAGAGAGCCACAAGAGAGAAG (SEQ ID NO. 118) |
| 60 | COL11A1 | NM_001190709 | AAGCTCAGGCTCAAGCTATTC (SEQ ID NO. 119) | GACACCATCTGCTCCCTTTAC (SEQ ID NO. 120) |
| 61 | COL5A2 | NM_000393 | TTCCAGGCTCTGATGGTTTAC (SEQ ID NO. 121) | GAGGTCCTTGTTCTCCTCTTTC (SEQ ID NO. 122) |
| 62 | COL1A2 | NM_000089 | TGTAAGCGGTGGTGGTTATG (SEQ ID NO. 123) | GATACAGGTTTCGCCAGTAGAG (SEQ ID NO. 124) |
| 63 | MXRA5 | NM_015419 | CAGAACAGGAGCAGGAGTATTG (SEQ ID NO. 125) | GGAAGCACCCAGAAGATAGATG (SEQ ID NO. 126) |
| 64 | THBS2 | NM_003247 | GTGACAACAACGAGGACATAGA (SEQ ID NO. 127) | GCTTCCACATCACCACATAGA (SEQ ID NO. 128) |
| 65 | INHBA | NM_002192 | CCTGGGCAAGAAGAAGAAGAA (SEQ ID NO. 129) | CCTGGGTAATTGGGTAGGAAAG (SEQ ID NO. 130) |
| 66 | VCAN | NM_001126336 | CTACTTTGCCACCCAGTTACA (SEQ ID NO. 131) | CTCCTGCCTTTCCCATCTTATC (SEQ ID NO. 132) |
| 67 | ADAMTS12 | NM_030955 | CCAGTGGAACGGGAACTATAAG (SEQ ID NO. 133) | TCAGAACTCTCCGGCTAGAA (SEQ ID NO. 134) |
| 68 | GREM1 | NM_001191322 | CCTCCTCACAATCCATCTCTTC (SEQ ID NO. 135) | CGTCTTCTCTTTAGCCCAATCT (SEQ ID NO. 136) |
| 69 | COL3A1 | NM_000090 | CGAGGTAACAGAGGTGAAAGAG (SEQ ID NO. 137) | CTGGAGAGAAGTCGAAGGAATG (SEQ ID NO. 138) |
| 70 | SULF1 | NM_001128204 | GAGCCATCTTCACCCATTCA (SEQ ID NO. 139) | CCTTCCCATCCATCCCATAAC (SEQ ID NO. 140) |
| 71 | GAPDH | NM_002046 | TGAGGTCCACCACCCTGTTGCTGTA (SEQ ID NO. 141) | ATGAGCTTGACAAAGTGGTCGTTGA (SEQ ID NO. 142) |
| 72 | GUSB | NM_000181 | ATTGAAGCTGGAGGGAACTGGCATG (SEQ ID NO. 143) | GCGGCCGCCGGTACCACTGCTCCTC (SEQ ID NO. 144) |
| 73 | MRPL19 | NM_014763 | CTGTTCTTCCCCTTCGAGGAATGAA (SEQ ID NO. 145) | TCCACGGGCGGTGCTTGTCCACGA (SEQ ID NO. 146) |
| 74 | PSMC4 | NM_006503 | TCTGGGGCCGGGACACGGACAGTGC (SEQ ID NO. 147) | CTTCTCCACCAAGATGCCTATCTCC (SEQ ID NO. 148) |
| 75 | SF3A1 | NM_001005409 | GAATCCTCCTTTGAAGATGCTTCTT (SEQ ID NO. 149) | GGCTGTTTGGGCTCCGTGGGCACGG (SEQ ID NO. 150) |
| 76 | TFRC | NM_003234 | CTTTTGGAGATACGTAGGGAGAGAG (SEQ ID NO. 151) | CACGATCATTGAGTTTCTTCATGAC (SEQ ID NO. 152) |

TABLE 6

| No. | Gene Name | gene ID | Sequence of primers in upstream region of genes (Forward) | Sequence of primers in downstream region of genes (Reverse) |
|---|---|---|---|---|
| 1 | PLK1 | NM_005030 | CAGCAAGTGGGTGGACTATT (SEQ ID NO. 1) | ATCAGTGGGCACAAGATGAG (SEQ ID NO. 2) |
| 2 | PRC1 | NM_001267580 | TGTGTGTCCGAAGTTGAGATG (SEQ ID NO. 3) | GGCAGACAGCGGAAGAATAA (SEQ ID NO. 4) |
| 3 | CCNB1 | NM_031966 | CCAGAACCTGAGCCTGTTAAA (SEQ ID NO. 5) | CTCGACATCAACCTCTCCAATC (SEQ ID NO. 6) |
| 4 | MKI67 | NM_001145966 | AGTACCAGGAGGTGAGGATAAA (SEQ ID NO. 17) | CTGCACTGGAGTTCCCATAAA (SEQ ID NO. 18) |
| 5 | TPX2 | NM_012112 | CCTGCCAGAGAAGAAGGTAAAG (SEQ ID NO. 23) | CGGTCCTAGGTTTGAGGTTAAG (SEQ ID NO. 24) |
| 6 | MELK | NM_001256685 | ACCTCACGGCTACCTATCTT (SEQ ID NO. 37) | CTGTATCACACCCACACTCATC (SEQ ID NO. 38) |
| 7 | CDC20 | NM_001255 | TGGATTGGAGTTCTGGGAATG (SEQ ID NO. 39) | GTGAACCACTGGACAGGATATAG (SEQ ID NO. 40) |
| 8 | TOP2A | NM_001067 | GTGTGGTTGGGAGAGACAAATA (SEQ ID NO. 45) | ATGGGCTGCAAGAGGTTTAG (SEQ ID NO. 46) |
| 9 | P2RY13 | NM_176894 | CCCTAGAACTTGCCTACCTTTC (SEQ ID NO. 47) | TTGAGGTGATGGTGGGATATTG (SEQ ID NO. 48) |
| 10 | CCR2 | NM_001123041 | CTGTATCTCCGCCTTCACTTTC (SEQ ID NO. 49) | CACCGCTCTCGTTGGTATTT (SEQ ID NO. 50) |
| 11 | PTPRC | NM_001267798 | GCTCACTTCTCCTACCTTCTTG (SEQ ID NO. 51) | GTTCCCTTTATCGTCCACTCTC (SEQ ID NO. 52) |
| 12 | IRF8 | NM_002163 | GCTTTGTTGCCAGGAAGATTAG (SEQ ID NO. 53) | GAGACTTGGGAGATTGGATGAG (SEQ ID NO. 54) |
| 13 | CLEC10A | NM_006344 | CTGGTGCAAGACCTGAAGAA (SEQ ID NO. 55) | CTAGAAGAGGCAAGGCCAATAA (SEQ ID NO. 56) |
| 14 | TLR7 | NM_016562 | CTGGAAGACCCAAGAGAGAAAC (SEQ ID NO. 57) | TCCCAAAGTGCTGGGATTAC (SEQ ID NO. 58) |
| 15 | IL7R | NM_002185 | AGTGGGCAGGTGTTCTTTAC (SEQ ID NO. 61) | GTCTCCGATCAGGAGGTTTATTT (SEQ ID NO. 62) |
| 16 | SPOCK1 | NM_004598 | CTACTGTCCGCCACTGATTT (SEQ ID NO. 107) | GCCTATGGTCTGTCTTCCTATG (SEQ ID NO. 108) |
| 17 | COL1A1 | NM_000088 | CAGACTGGCAACCTCAAGAA (SEQ ID NO. 109) | TGTGGAGAAAGGAGCAGAAAG (SEQ ID NO. 110) |
| 18 | POSTN | NM_001135934 | GAGACGCTGGAAGGAAATACA (SEQ ID NO. 111) | CTCCTGGTGTCAGGTGATAAAG (SEQ ID NO. 112) |
| 19 | ADAM12 | NM_001288973 | CTCAGACCTGCTCCACAATATC (SEQ ID NO. 113) | GCAAGTAGACAGAGCACCATAG (SEQ ID NO. 114) |
| 20 | COL6A2 | NM_001849 | CCAACTTCACACTGGAGAAGAA (SEQ ID NO. 115) | GCGAGAAGGAGTTCAGGTATTG (SEQ ID NO. 116) |
| 21 | COL5A1 | NM_000093 | TTCCAAGGTAAGCCTCGTAAAG (SEQ ID NO. 117) | CAAGAGAGCCACAAGAGAAG (SEQ ID NO. 118) |
| 22 | GAPDH | NM_002046 | TGAGGTCCACCACCCTGTTGCTGTA (SEQ ID NO. 141) | ATGAGCTTGACAAAGTGGTCGTTGA (SEQ ID NO. 142) |
| 23 | GUSB | NM_000181 | ATTGAAGCTGGAGGGAACTGGCATG (SEQ ID NO. 143) | GCGGCCGCCGGTACCACTGCTCCTC (SEQ ID NO. 144) |
| 24 | TFRC | NM_003234 | CTTTTGGAGATACGTAGGGAGAGAG (SEQ ID NO. 151) | CACGATCATTGAGTTTCTTCATGAC (SEQ ID NO. 152) |

Example 4: Quantitative PCR Detection Kit for Determining the Molecular Subtype of Lung Adenocarcinoma and Assessing the Survival Risk in a Patient with Lung Adenocarcinoma According to the 25-gene testing combination in Example 2, a quantitative PCR detection kit was designed, comprising primers for PCR amplification of the 25 genes, and TaqMan probes for quantitative analysis. The sequences of the primers and probes are shown in Table 7. The kit can be used for singleplex or multiplex RT-PCR assay. The method for the lung adenocarcinoma molecular subtype and survival risk assessment by the multiplex RT-PCR assay using the kit was described below.

Step 1: taking the tumor or paraffin-embedded tissue of the testing subject and using the protocol in the detection kit to obtain the area of the testing subject containing high content of tumor cells as the original material.

Step 2: extracting total RNA from the tissue. RNA storm CD201RNA or Qiagen RNease FFPE kit RNA extraction kit can be used for extraction.

Step 3: One-step multiplex fluorescent quantitative RT-PCR detection. The one-step Real-time multiplex fluorescent quantitative RT-PCR detection method is Taqman Real-time multiplex fluorescent quantitative RT-PCR. The 24-lung adenocarcinoma molecular subtype and survival risk related genes in Table 7 are divided into 12 reaction systems. Each reaction system contains primers and probes for 2 molecular subtype and survival risk assessment related genes and 1 house-keeping gene, where the 3 probes were labeled with different fluorophores respectively. Each reaction system is prepared as follows:

2 μl of the RNA sample (total amount 100-400 ng), 3 pairs of forward and reverse specific primers (10 μM) (0.4 μl each), 3 Taqman fluorescent probes (10 μM) (0.2 μl each), as described above, 6 μl of reaction mixture solution, 4 μl of enzyme mixture solution, and 4 μl of DEPC water; where reverse transcription reaction at 50° C. for 15-20 min, pre-denaturation at 95° C. for 5 min; amplification reaction including denaturation at 95° C. for 10 sec, annealing, and extension and fluorescence detection at 60° C. for 45-60 sec for 45 cycles, wherein the 60° C. fluorescent detection channel can select three of FAM/HEX/VIC/ROX/Cy5; after the amplification reaction, the Ct value of each gene is recorded, representing the expression level of each gene.

Step 4: Statistical analysis of the results. Performing statistical analysis on the obtained sequencing results; then, subjecting the lung adenocarcinoma of the subjects to molecular subtype by the method described in Example 2, calculating the immunity index, proliferation index and survival risk score and predicting the survival risk

TABLE 7

| No. | Gene Name | gene ID | Sequence of primers of genes (Forward) | Sequence of primers of genes (Reverse) | Sequence of probes of genes |
|---|---|---|---|---|---|
| 1 | PLK1 | NM_005030 | CAGCAAGTGGGTGGACTATT (SEQ ID NO. 153) | GTAGAGGATGAGGCGTGTTG (SEQ ID NO. 154) | ATCACAGAGCTGATACCCAAGGCC (SEQ ID NO. 203) |
| 2 | PRC1 | NM_001267580 | GAAGTGGATCGGTTGGAAGAA (SEQ ID NO. 155) | TGTCTCTGCTCCTGGCTATAA (SEQ ID NO. 156) | TTGAGGCAATTCGAGTGGAGCTGG (SEQ ID NO. 204) |
| 3 | CCNB1 | NM_031966 | GATGCAGAAGATGGAGCTGAT (SEQ ID NO. 157) | TCCCGACCCAGTAGGTATTT (SEQ ID NO. 158) | TTGAGGAAGAGCAAGCAGTCAGAC C (SEQ ID NO. 205) |
| 4 | MKI67 | NM_001145966 | GACCTCAAACTGGCTCCTAATC (SEQ ID NO. 159) | GCTGCCAGATAGAGTCAGAAAG (SEQ ID NO. 160) | CGGGAGCAGAGCCAGTAAACTTCC (SEQ ID NO. 206) |
| 5 | TPX2 | NM_012112 | GCAAGAGCTGGAGAAGAGTATG (SEQ ID NO. 161) | TCTTCACAGGTTGCCCTATTC (SEQ ID NO. 162) | CAAGAGGTGGTGGAGATGCGGAAA (SEQ ID NO. 207) |
| 6 | MELK | NM_001256685 | GTGCTAGAGACAGCCAACAA (SEQ ID NO. 163) | CAGGCGATCCTGGGAAATTA (SEQ ID NO. 164) | TTCTTGAGTACTGCCCTGGAGGAGA (SEQ ID NO. 208) |
| 7 | CDC20 | NM_001255 | CAAGGAGAACCAGCCTGAAA (SEQ ID NO. 165) | GGATCTTGGCTTCCTCTACATC (SEQ ID NO. 166) | AGACGCCCACCAAGAAGGAACATC (SEQ ID NO. 209) |
| 8 | TYMS | NM_001071 | CAACCCTGACGACAGAAGAA (SEQ ID NO. 167) | GCTCACTGTTCACCACATAGA (SEQ ID NO. 168) | AGATCTTCCTCTGATGGCGCTGC (SEQ ID NO. 210) |
| 9 | TOP2A | NM_001067 | GACGCTTCGTTATGGGAAGATA (SEQ ID NO. 169) | GGGCCAGTTGTGATGGATAA (SEQ ID NO. 170) | ATGGTTCCCACATCAAAGGCTTGC (SEQ ID NO. 211) |
| 10 | P2RY13 | NM_176894 | TCTCCTTCTGTCCAGCAAATAC (SEQ ID NO. 171) | CCCTATCACACACCAAACA (SEQ ID NO. 172) | ATGGCACCTACTCAGCAATGCCTTT (SEQ ID NO. 212) |

TABLE 7-continued

| No. | Gene Name | gene ID | Sequence of primers of genes (Forward) | Sequence of primers of genes (Reverse) | Sequence of probes of genes |
|---|---|---|---|---|---|
| 11 | CCR2 | NM_001123041 | GGATTGAACAAGGACGCATTTC (SEQ ID NO. 173) | CACCGCTCTCGTTGGTATTT (SEQ ID NO. 174) | AACCGAGAACGAGATGTGGACAGC (SEQ ID NO. 213) |
| 12 | PTPRC | NM_001267798 | CTGAGGAACTTGGAGTCTGATG (SEQ ID NO. 175) | GGCACAAGAAGGTAGGAGAAG (SEQ ID NO. 176) | AAGCAGCCAGCACGAGAGAAAGAT (SEQ ID NO. 214) |
| 13 | IRF8 | NM_002163 | AGCATGTATCCAGGACTGATTT (SEQ ID NO. 177) | GAGGCATCCACTTCCTGATTAT (SEQ ID NO. 178) | AATCTTGCTTGCCAGCGTGTTTCC (SEQ ID NO. 215) |
| 14 | CLEC10A | NM_006344 | CCACTCCGATCGCAATAGATAA (SEQ ID NO. 179) | CTAGAAGAGGCAAGGCCAATAA (SEQ ID NO. 180) | AGTCCAACCACTTCCCTGTTTCCA (SEQ ID NO. 216) |
| 15 | TLR7 | NM_016562 | CTGGAAGACCCAAGAGAGAAAC (SEQ ID NO. 181) | TAAGCTGTATGCTCTGGGAAAG (SEQ ID NO. 182) | TCTCGAGGAAAGGGACTGGTTACCA (SEQ ID NO. 217) |
| 16 | CCR4 | NM_005508 | GAAGAACAAGGCGGTGAAGA (SEQ ID NO. 183) | GGGTCTCTAGGAAGAGCACTAT (SEQ ID NO. 184) | ATCTTTGCCGTGGTGGTCCTCTTC (SEQ ID NO. 218) |
| 17 | IL7R | NM_002185 | GGATGTAGTCATCACTCCAGAAAG (SEQ ID NO. 185) | GGACCTGGAAGAGGAGAGAATA (SEQ ID NO. 186) | ATTCATCCCTCACATGCCTGGCT (SEQ ID NO. 219) |
| 18 | CD4 | NM_000616 | CTAGTGGTGGGTACTCAATGTG (SEQ ID NO. 187) | CCTTCATCCCTGCTCGTAAAT (SEQ ID NO. 188) | TTTGGGTTCACAGAAGCACAGCAC (SEQ ID NO. 220) |
| 19 | SPOCK1 | NM_004598 | TGCTCTCTATACCCGACCTAAG (SEQ ID NO. 189) | CAACACCCTTTCTCCCATACA (SEQ ID NO. 190) | AGACAACTGCTTGTTCCCAGAGGA (SEQ ID NO. 221) |
| 20 | COL1A1 | NM_000088 | CCTGTCTGCTTCCTGTAAACTC (SEQ ID NO. 191) | GTTCAGTTTGGGTTGCTTGTC (SEQ ID NO. 192) | TCCCTCCCACCCAACCAACTTTC (SEQ ID NO. 222) |
| 21 | POSTN | NM_001135934 | GAGCTTTACAACGGGCAAATAC (SEQ ID NO. 193) | CTCCCTTGCTTACTCCCTTTC (SEQ ID NO. 194) | CATCGGAGGCAAACAGCTCAGAGT (SEQ ID NO. 223) |
| 22 | ADAM12 | NM_001288973 | CACTGCCACCAGTAGGTTATT (SEQ ID NO. 195) | GCTCAGCTCCAAGCAGTATAG (SEQ ID NO. 196) | AGCTTGGGAAAGGTGGTGTTTCTGT (SEQ ID NO. 224) |
| 23 | COL6A2 | NM_001849 | CAACAACTGCCCAGAGAAGA (SEQ ID NO. 197) | CATGTGGAAGAGCAGGATGT (SEQ ID NO. 198) | CGAGGTGTCCAGCACGAAGTACAC (SEQ ID NO. 225) |
| 24 | COL5A1 | NM_000093 | GCTCTCTTGTGGTGCTATCTATC (SEQ ID NO. 199) | ACAGACTGTGGAGGCAATAAC (SEQ ID NO. 200) | ATGCCTCGTTCTCCCTGCTTTCTT (SEQ ID NO. 226) |
| 25 | ACTB | NM_001101 | CACTCTTCCAGCCTTCCTTC (SEQ ID NO. 201) | GTACAGGTCTTTGCGGATGT (SEQ ID NO. 202) | AGTTTCGTGGATGCCACAGGACTC (SEQ ID NO. 227) |

Example 5: Quantitative PCR Detection Kit for Determining the Molecular Subtype of Lung Adenocarcinoma and Assessing Survival Risk in a Patient with Lung Adenocarcinoma According to the 24-gene testing combination in Example 2, a quantitative PCR detection kit was designed, comprising primers for PCR amplification of the 24 genes, and TaqMan probes for quantitative analysis. The sequences of primers and probes are shown in Table 8. The kit can be used for singleplex or multiplex RT-PCR assay. The method for the lung adenocarcinoma molecular subtype and survival risk assessment by the singleplex RT-PCR assay using the kit was described below.

Procedures: taking lung breast cancer tumor tissue; extracting RNA from tumor cells; via TaqMan RT-PCR technology and with primers and probes shown in Table 8, detecting gene expression levels respectively. The steps are as follows:

Step 1: taking the tumor or paraffin-embedded tissue of the testing subject and using the protocol in the detection kit to obtain the area of the testing subject containing high contents of tumor cells as the original material.

Step 2: extracting the total RNA from the tissue. RNA storm CD201RNA or Qiagen RNease FFPE kit RNA extraction kit can be used for extraction.

Step 3: RT-PCR detection. The RT-PCR detection method is Taqman RT-PCR, and the genes shown in Table 8 were respectively subjected to RT-PCR detection. The steps are as follows:

(3-1): extracting the total RNA of the testing subject;

(3-2): performing reverse transcription on the RNA obtained in (3-1), the specific steps are as follows: taking a total amount of about 2 μg of the sample RNA (for example, taking 11 μl of the sample RNA of about 200 ng/p), and reverse transcribing it together with 11 μl of the reference RNA (K1622 Reverse Transcription Kit, Thermo) to obtain the sample cDNA and reference cDNA; adding 80 μl of RNase-free water to the sample cDNA for a 5-fold dilution, adding 180 μl of RNase-free water to the reference cDNA for a 10-fold dilution;

(3-3): subjecting the cDNA sample corresponding to each gene obtained in (3-2) to TaqMan RT-PCR to detect the 21 lung adenocarcinoma molecular subtype and survival risk related genes and 3 reference genes (see Table 8) respectively. The steps are as follows: (i) Preparing of reaction system per well: 2 μl of the obtained cDNA sample (100-400 ng in total) in (3-2), a total of 1.4 μl of forward and reverse specific primers and TaqMan fluorescent probes (10 μM) as shown in Table 8, 10 μl of reaction premix solution, 6.6 μl of DEPC water; (ii) inactivating the reverse transcriptase at 95° C. for 2 min; (iii) amplification and detection: denaturation at 95° C. for 25 sec, annealing at 60° C., extension and fluorescent detection for 60 sec, 45 cycles, and a holding period at 60° C. for 60 sec; after the amplification reaction, the Ct value of each gene is recorded, representing the expression level of each gene.

Step 4: Statistical analysis of the results. Performing statistical analysis on the obtained sequencing results; then, subjecting the lung adenocarcinoma of the subjects to molecular subtype by the method described in Example 2, calculating the immunity index, proliferation index and survival risk score, and predicting the survival risk.

TABLE 8

| No. | Gene Name | Gene ID | Sequence of primers of genes (Forward) | Sequence of primers of genes (Reverse) | Sequence of probes of genes |
|---|---|---|---|---|---|
| 1 | PLK1 | NM_005030 | CAGCAAGTGGGTGGACTATT (SEQ ID NO. 228) | GTAGAGGATGAGGCGTGTTG (SEQ ID NO. 229) | ATCACAGAGCTGATACCCAAGGCC (SEQ ID NO. 276) |
| 2 | PRC1 | NM_001267580 | GAAGTGGATCGGTTGGAAGAA (SEQ ID NO. 230) | TGTCTCTGCTCCTGGCTATAA (SEQ ID NO. 231) | TTGAGGCAATTCGAGTGGAGCTGG (SEQ ID NO. 277) |
| 3 | CCNB1 | NM_031966 | GATGCAGAAGATGGAGCTGAT (SEQ ID NO. 232) | TCCCGACCCAGTAGGTATTT (SEQ ID NO. 233) | TTGAGGAAGAGCAAGCAGTCAGACC (SEQ ID NO. 278) |
| 4 | MKI67 | NM_001145966 | GACCTCAAACTGGCTCCTAATC (SEQ ID NO. 234) | GCTGCCAGATAGAGTCAGAAAG (SEQ ID NO. 235) | CGGGAGCAGAGCCAGTAAACTTCC (SEQ ID NO. 279) |
| 5 | TPX2 | NM_012112 | GGCCTTTCTGGTTCTCTAGTTC (SEQ ID NO. 236) | CTTCTACCTCAGCCATTCTCTTC (SEQ ID NO. 237) | CTGCCGCTCTTTGGCTCTCTTCTC (SEQ ID NO. 280) |
| 6 | MELK | NM_001256685 | GTGCTAGAGACAGCCAACAA (SEQ ID NO. 238) | CAGGCGATCCTGGGAAATTA (SEQ ID NO. 239) | TTCTTGAGTACTGCCCTGGAGGAGA (SEQ ID NO. 281) |
| 7 | CDC20 | NM_001255 | CAAGGAGAACCAGCCTGAAA (SEQ ID NO. 240) | GGATCTTGGCTTCCTCTACATC (SEQ ID NO. 241) | AGACGCCCACCAAGAAGGAACATC (SEQ ID NO. 282) |
| 8 | TOP2A | NM_001067 | GACGCTTCGTTATGGGAAGATA (SEQ ID NO. 242) | GGGCCAGTTGTGATGGATAA (SEQ ID NO. 243) | ATGGTTCCCACATCAAAGGCTTGC (SEQ ID NO. 283) |
| 9 | P2RY13 | NM_176894 | CCCAGAGACACTCGGATAGTA (SEQ ID NO. 244) | CACCCACAGAGCCAAAGTAT (SEQ ID NO. 245) | TTTCTTGACCGGCATCCTGCTGA (SEQ ID NO. 284) |
| 10 | CCR2 | NM_001123041 | GGATTGAACAAGGACGCATTTC (SEQ ID NO. 246) | CACCGCTCTCGTTGGTATTT (SEQ ID NO. 247) | AACCGAGAACGAGATGTGGACAGC (SEQ ID NO. 285) |
| 11 | PTPRC | NM_001267798 | CGGCTGACTTCCAGATATGAC (SEQ ID NO. 248) | GCTTTGCCCTGTCACAAATAC (SEQ ID NO. 249) | TCCAGAAAGGCAAAGCCAAATGCC (SEQ ID NO. 286) |
| 12 | IRF8 | NM_002163 | TGGACATTTCCGAGCCATAC (SEQ ID NO. 250) | CGCACTCCATCTCTGTAACTTC (SEQ ID NO. 251) | AATGCAAACTAGGCGTGGCAACTG (SEQ ID NO. 287) |

TABLE 8-continued

| No. | Gene Name | Gene ID | Sequence of primers of genes (Forward) | Sequence of primers of genes (Reverse) | Sequence of probes of genes |
|---|---|---|---|---|---|
| 13 | CLEC10A | NM_006344 | CCACTCCGATCGCAATAGATAA (SEQ ID NO. 252) | CTAGAAGAGGCAAGGCCAATAA (SEQ ID NO. 253) | AGTCCAACCACTTCCCTGTTTCCA (SEQ ID NO. 288) |
| 14 | TLR7 | NM_016562 | CTGGAAGACCCAAGAGAGAAAC (SEQ ID NO. 254) | TAAGCTGTATGCTCTGGGAAAG (SEQ ID NO. 255) | TCTCGAGGAAAGGGACTGGTTACCA (SEQ ID NO. 289) |
| 15 | IL7R | NM_002185 | CCTCTGCACCAGCAGTAATAA (SEQ ID NO. 256) | ATCAAGGAGGTGGAAGGAATG (SEQ ID NO. 257) | TGCCATAATCCCTTAGGTTTGCCTAGTG (SEQ ID NO. 290) |
| 16 | SPOCK1 | NM_004598 | TGCTCTCTATACCCGACCTAAG (SEQ ID NO. 258) | CAACACCCTTTCTCCCATACA (SEQ ID NO. 259) | AGACAACTGCTTGTTCCCAGAGGA (SEQ ID NO. 291) |
| 17 | COL1A1 | NM_000088 | CTAAAGGCGAACCTGGTGAT (SEQ ID NO. 260) | TCCAGGAGCACCAACATTAC (SEQ ID NO. 261) | CTGGTGCTAAAGGCGATGCTGGTC (SEQ ID NO. 292) |
| 18 | POSTN | NM_001135934 | CGGATCTTGTGGCCCAATTA (SEQ ID NO. 262) | GCTGATCCATGCTGAGAGTATC (SEQ ID NO. 263) | TGGAGAATACACTTTGCTGGCACCT (SEQ ID NO. 293) |
| 19 | ADAM12 | NM_001288973 | TCTGGACTGGAGGAAGATGAA (SEQ ID NO. 264) | GATGGTGGTCCCTTGGAAATAA (SEQ ID NO. 265) | CCTCGCAAATCCCATGACAATGCG (SEQ ID NO. 294) |
| 20 | COL6A2 | NM_001849 | CAACAACTGCCCAGAGAAGA (SEQ ID NO. 266) | CATGTGGAAGAGCAGGATGT (SEQ ID NO. 267) | CGAGGTGTCCAGCACGAAGTACAC (SEQ ID NO. 295) |
| 21 | COL5A1 | NM_000093 | TACCCTGCGTCTGCATTTC (SEQ ID NO. 268) | GATACCCTGCTCGTTGTAGATG (SEQ ID NO. 269) | ACTGTGAAAGCCAAGAAAGGCAGC (SEQ ID NO. 296) |
| 22 | GAPDH | NM_002046 | GGTGTGAACCATGAGAAGTATGA (SEQ ID NO. 270) | GAGTCCTTCCACGATACCAAAG (SEQ ID NO. 271) | AGATCATCAGCAATGCCTCCTGCA (SEQ ID NO. 297) |
| 23 | GUSB | NM_000181 | TGCTGGCTACTACTTGAAGATG (SEQ ID NO. 272) | CCTTGTCTGCTGCATAGTTAGA (SEQ ID NO. 273) | TCGCTCACACCAAATCCTTGGACC (SEQ ID NO. 298) |
| 24 | TFRC | NM_003234 | TTTCCACCATCTCGGTCATC (SEQ ID NO. 274) | GGGACAGTCTCCTTCCATATTC (SEQ ID NO. 275) | CAGACAATCTCCAGAGCTGCTGCA (SEQ ID NO. 299) |

Figure 6:
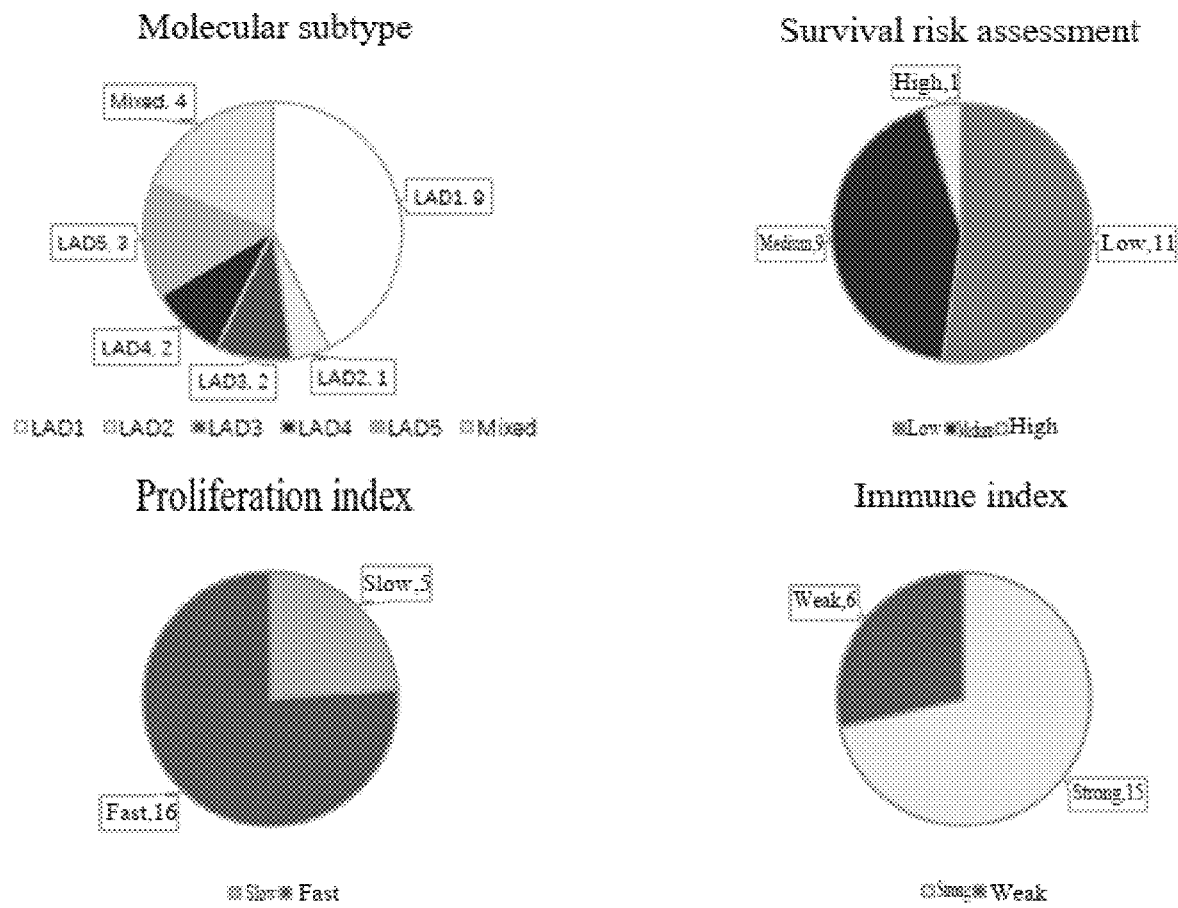
FIG. 6 is a pie chart of statistics from molecular subtype and risk assessment on 21 cases of lung adenocarcinoma samples.

Results: The method according to the present disclosure was used to determine lung adenocarcinoma molecular subtype and survival risk in 21 lung adenocarcinoma samples. The results were shown in Table 9 and FIG. 6. The results showed that the 21 lung adenocarcinoma samples can be classified into LAD1, LAD2, LAD3, LAD4, LAD5 or mixed type (Mixed). The survival risk assessment of the lung adenocarcinoma samples can be low, medium or high risk, the proliferation index can be fast or slow proliferation, and the immunity index can be strong immunity index or weak immunity index. According to the subtypes of lung adenocarcinoma samples, survival risk results, proliferation index and immunity index, in combination with histopathology, refined and individualized clinical indicators for lung adenocarcinoma can be established so as to provide more targeted individualized treatment. Meanwhile, it can screen benefit populations suitable for different treatment options to provide potential treatment approaches.

TABLE 9

| Sample | Molecular subtype | Risk assessment | Proliferation index | Immunity index |
|---|---|---|---|---|
| 1 | LAD1 | low | fast | strong |
| 2 | LAD1 | medium | slow | strong |
| 3 | LAD1 | low | fast | strong |
| 4 | LAD1 | low | fast | strong |
| 5 | LAD1 | low | slow | strong |
| 6 | LAD1 | low | fast | strong |
| 7 | LAD1 | low | slow | strong |
| 8 | LAD1 | low | fast | strong |
| 9 | LAD1 | medium | slow | weak |
| 10 | LAD2 | high | fast | weak |
| 11 | LAD3 | low | fast | strong |
| 12 | LAD3 | medium | fast | weak |
| 13 | LAD4 | medium | fast | weak |
| 14 | LAD4 | medium | slow | weak |
| 15 | LAD5 | medium | fast | strong |
| 16 | LAD5 | medium | fast | weak |
| 17 | LAD5 | medium | fast | strong |
| 18 | Mixed | low | fast | strong |
| 19 | Mixed | medium | fast | strong |

TABLE 9-continued

| Sample | Molecular subtype | Risk assessment | Proliferation index | Immunity index |
|---|---|---|---|---|
| 20 | Mixed | low | fast | strong |
| 21 | Mixed | low | fast | strong |

The examples and embodiments described herein are provided for illustrative purposes only, and changes may be made to the above-described embodiments without departing from the broad inventive concept of the present disclosure. Therefore, it should be understood that the present disclosure is not limited to the specific embodiments disclosed herein but intended to encompass modifications within the spirit and scope as defined by the appended claims.

The invention claimed is:

1. A method for treating lung adenocarcinoma with chemotherapy or radiotherapy in a subject, wherein the method comprises the following steps:
   (1) determining the survival risk of the subject, wherein step (1) comprises the following steps:
      (1-a) measuring the expression levels of the genes in a proliferation-related gene set, an immune-related gene set, and an intercellular substance-related gene set in a test sample of the subject, wherein the test sample is a lung adenocarcinoma sample, wherein:
         (i) the proliferation-related gene set at least comprises: PLK1, PRC1, CCNB1, MKI67, TPX2, MELK, CDC20, and TOP2A;
         (ii) the immune-related gene set at least comprises: P2RY13, CCR2, PTPRC, IRF8, CLEC10A, TLR7, and IL7R; and
         (iii) the intercellular substance-related gene set at least comprises: SPOCK1, COL1A1, POSTN, ADAM12, COL6A2, and COL5A1;
      (1-b) comparing the expression levels measured in step (1-a) to the expression levels of the genes in the proliferation-related gene set, the immune-related gene set, and the intercellular substance-related gene set in a training set of lung adenocarcinoma samples to calculate a survival risk score of the subject, wherein the survival data of the training set of lung adenocarcinoma samples are known;
      (1-c) identifying the subject as having a high survival risk based on the survival risk score calculated in step (1-b) and diagnosing the subject as having a high survival risk; and
   (2) treating the subject with chemotherapy or radiotherapy.

2. The method according to claim 1, wherein:
   (i) the proliferation-related gene set comprises: PLK1, PRC1, CCNB1, MKI67, TPX2, MELK, CDC20, TYMS and TOP2A;
   (ii) the immune-related gene set comprises: P2RY13, CCR2, PTPRC, IRF8, CLEC10A, TLR7, CCR4, IL7R and CD4; and
   (iii) the intercellular substance-related gene set comprises: SPOCK1, COL1A1, POSTN, ADAM12, COL6A2 and COL5A1.

3. The method according to claim 1, wherein:
   (i) the proliferation-related gene set comprises: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A;

(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; and (iii) the intercellular substance-related gene set comprises: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1.

4. The method according to claim 1, wherein:
(i) the proliferation-related gene set comprises: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TOP2A, TYMS, PBK, CDC45, CDCA8, CENPA, MYBL2, SKA1, MCM10, TRIP13, TROAP, POLQ, GINS1 and RAD54L;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2DIA, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, CIQB, PDCDILG2, CIQA, SLAMF8, VSIG4, CD163, LAIR1, SLAMF7 and MS4A4A; and
(iii) the intercellular substance-related gene set comprises: LOXL2, SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1, SULF1, ADAMTS2, PRRX1, COL15A1, SPARC, THY1, FAP, DIO2, FN1, COL6A3, FBN1, SYNDIG1, AEBP1, LRRC15, CILP, ISLR, GAS1, COL10A1, ASPN, MMP2 and EPYC.

5. The method according to claim 1, wherein the expression levels of the genes in the proliferation-related gene set, the immune-related gene set, and the intercellular substance-related gene set are normalized to a reference gene(s).

6. The method according to claim 5, wherein the reference gene(s) comprises at least one of the following reference genes: GAPDH, GUSB, MRPL19, PSMC4, SF3A1, TFRC, ACTB and RPLP0.

7. The method according to claim 1, wherein:
(a)
(i) the proliferation-related gene set comprises: PLK1, PRC1, CCNB1, MKI67, TPX2, MELK, CDC20 and TOP2A;
(ii) the immune-related gene set comprises: P2RY13, CCR2, PTPRC, IRF8, CLEC10A, TLR7 and IL7R;
(iii) the intercellular substance-related gene set comprises: SPOCK1, COL1A1, POSTN, ADAM12, COL6A2 and COL5A1; and
the expression levels of the genes in the proliferation-related gene set, the immune-related gene set, and the intercellular substance-related gene set are normalized to three of the following reference genes: GAPDH, GUSB, MRPL19, PSMC4, SF3A1 and TFRC;

(b)
(i) the proliferation-related gene set comprises: PLK1, PRC1, CCNB1, MKI67, TPX2, MELK, CDC20, TYMS and TOP2A;
(ii) the immune-related gene set comprises: P2RY13, CCR2, PTPRC, IRF8, CLEC10A, TLR7, CCR4, IL7R and CD4; and
(iii) the intercellular substance-related gene set comprises: SPOCK1, COL1A1, POSTN, ADAM12, COL6A2 and COL5A1; and
the expression levels of the genes in the proliferation-related gene set, the immune-related gene set, and the intercellular substance-related gene set are normalized to the following reference gene: ACTB;

(c)
(i) the proliferation-related gene set comprises: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; and
(iii) the intercellular substance-related gene set comprises: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1; and
the expression levels of the genes in the proliferation-related gene set, the immune-related gene set, and the intercellular substance-related gene set are normalized to the following reference genes: GAPDH, GUSB, MRPL19, PSMC4, SF3A1 and TFRC;

or
(d)
(i) the proliferation-related gene set comprises: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TOP2A, TYMS, PBK, CDC45, CDCA8, CENPA, MYBL2, SKA1, MCM10, TRIP13, TROAP, POLQ, GINS1 and RAD54L;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2DIA, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCDILG2, C1QA, SLAMF8, VSIG4, CD163, LAIR1, SLAMF7 and MS4A4A; and (iii) the intercellular substance-related gene set comprises: LOXL2, SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1, SULF1, ADAMTS2, PRRX1, COL15A1, SPARC, THY1, FAP, DIO2, FN1, COL6A3, FBN1, SYNDIG1, AEBP1, LRRC15, CILP, ISLR, GAS1, COL10A1, ASPN, MMP2 and EPYC; and the expression levels of the genes in the proliferation-related gene set, the immune-related gene set, and the intercellular substance-related gene set are normalized to the following reference genes: GAPDH, GUSB, MRPL19, PSMC4, SF3A1 and TFRC.

8. The method according to claim 1, wherein the expression levels of the genes in the immune-related gene set and the expression levels of the genes in the proliferation-related gene set are used to calculate an immunity index and a proliferation index, respectively.

9. The method according to claim 8, wherein the immunity index and proliferation index are used to calculate the survival risk score of the subject.

10. The method of claim 1, wherein the training set of lung adenocarcinoma samples are classified into LAD1 subtype, LAD2 subtype, LAD3 subtype, LAD4 subtype, LAD5 subtype and mixed subtype based on the expression levels of the genes in the proliferation-related gene set, the immune-related gene set, and the intercellular substance-related gene set.

11. The method of claim 1, wherein step (1) comprises the following steps:
(a') measuring the expression levels of the genes in the proliferation-related gene set, the immune-related gene set, and the intercellular substance-related gene set in the test sample;
(b') calculating the expression profile of the genes in the proliferation-related gene set, the immune-related gene set, and the intercellular substance-related gene set in the test sample based on the expression levels measured in step (a');
(c') obtaining the expression levels of the genes in the proliferation-related gene set, the immune-related gene set, and the intercellular substance-related gene set for each of the training set of lung adenocarcinoma samples;
(d') establishing the expression profile of the genes in the proliferation-related gene set, the immune-related gene set, and the intercellular substance-related gene set for each of the training set of lung adenocarcinoma samples based on the expression levels obtained in step (c');
(e') classifying the training set of lung adenocarcinoma samples into LAD1 subtype, LAD2 subtype, LAD3 subtype, LAD4 subtype, LAD5 subtype and mixed subtype by comparing the similarity of the expression profiles among the training set of lung adenocarcinoma samples and establishing the expression profiles of the genes in the proliferation-related gene set, the immune-related gene set, and the intercellular substance-related gene set for the LAD1 subtype, LAD2 subtype, LAD3 subtype, LAD4 subtype and LAD5 subtype lung adenocarcinoma samples;
(f') calculating a survival risk score for each of the training set of lung adenocarcinoma samples by fitting a model to the expression profiles for the LAD1 subtype, LAD2 subtype, LAD3 subtype, LAD4 subtype and LAD5 subtype lung adenocarcinoma samples obtained in step (e') and the expression levels of the proliferation-related genes and the immune-related genes in each of the training set of lung adenocarcinoma samples obtained in step (c');
(g') assigning the risk scores calculated in step (f') to high, medium or low risk groups based on the survival data of the training set of lung adenocarcinoma samples;
(h') calculating a survival risk score for the test sample using the model of step (f');
(i') determining which risk group the risk score calculated in step (h') falls within by comparing the risk score calculated in step (h') to the risk groups assigned in step (g'), wherein assignment to a high risk group indicates the subject having a high survival risk.

12. A method of treating a patient for lung adenocarcinoma comprising:
(1) determining the cancer subtype of the lung adenocarcinoma patient,
wherein step (1) comprises the following steps:
(1-a) measuring the expression levels of the genes in a proliferation-related gene set, an immune-related gene set, and an intercellular substance-related gene set in a test sample of the patient, wherein the test sample is a lung adenocarcinoma sample, wherein:
(i) the proliferation-related gene set comprises: PLK1, PRC1, CCNB1, MKI67, TPX2, MELK, CDC20 and TOP2A;
(ii) the immune-related gene set comprises: P2RY13, CCR2, PTPRC, IRF8, CLEC10A, TLR7 and IL7R; and
(iii) the intercellular substance-related gene set comprises: SPOCK1, COL1A1, POSTN, ADAM12, COL6A2 and COL5A1; and
(1-b) comparing the expression levels measured in step (1-a) to the expression levels of the genes in the proliferation-related gene set, the immune-related gene set, and the intercellular substance-related gene set in a training set of lung adenocarcinoma samples which are classified into LAD1 subtype, LAD2 subtype, LAD3 subtype, LAD4 subtype, LAD5 subtype and mixed subtype, wherein the survival data of the training set are known; and
(1-c) classifying the lung adenocarcinoma of the patient as LAD2 subtype or LAD4 subtype based on the comparison results in step (1-b); and
(2) treating the patient
with chemotherapy or radiotherapy.

13. The method of claim 12, wherein the expression levels of the genes in the proliferation-related gene set, the immune-related gene set, and the intercellular substance-related gene set are normalized to a reference gene(s).

14. The method according to claim 13, wherein the reference gene(s) comprises at least one of the following reference genes: GAPDH, GUSB, MRPL19, PSMC4, SF3A1, TFRC, ACTB and RPLP0.

15. The method according to claim 12, wherein:
(a)
(i) the proliferation-related gene set comprises: PLK1, PRC1, CCNB1, MKI67, TPX2, MELK, CDC20 and TOP2A;
(ii) the immune-related gene set comprises: P2RY13, CCR2, PTPRC, IRF8, CLEC10A, TLR7 and IL7R;
(iii) the intercellular substance-related gene set comprises: SPOCK1, COL1A1, POSTN, ADAM12, COL6A2 and COL5A1; and the expression levels of the genes in the proliferation-related gene set, the immune-related gene set, and the intercellular substance-related gene set are normalized to three of the following reference genes: GAPDH, GUSB, MRPL19, PSMC4, SF3A1 and TFRC;

(b)
(i) the proliferation-related gene set comprises: PLK1, PRC1, CCNB1, MKI67, TPX2, MELK, CDC20, TYMS and TOP2A;
(ii) the immune-related gene set comprises: P2RY13, CCR2, PTPRC, IRF8, CLEC10A, TLR7, CCR4, IL7R and CD4; and
(iii) the intercellular substance-related gene set comprises: SPOCK1, COL1A1, POSTN, ADAM12, COL6A2 and COL5A1; and
the expression levels of the genes in the proliferation-related gene set, the immune-related gene set, and the intercellular substance-related gene set are normalized to the following reference gene: ACTB;

(c)
(i) the proliferation-related gene set comprises: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; and
(iii) the intercellular substance-related gene set comprises: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1; and
the expression levels of the genes in the proliferation-related gene set, the immune-related gene set, and the intercellular substance-related gene set are normalized to the following reference genes: GAPDH, GUSB, MRPL19, PSMC4, SF3A1 and TFRC;

or
(d)
(i) the proliferation-related gene set comprises: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TOP2A, TYMS, PBK, CDC45, CDCA8, CENPA, MYBL2, SKA1, MCM10, TRIP13, TROAP, POLQ, GINS1 and RAD54L;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2D1A, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCDILG2, C1QA, SLAMF8, VSIG4, CD163, LAIR1, SLAMF7 and MS4A4A; and
(iii) the intercellular substance-related gene set comprises: LOXL2, SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1, SULF1, ADAMTS2, PRRX1, COL15A1, SPARC, THY1, FAP, DIO2, FN1, COL6A3, FBN1, SYNDIG1, AEBP1, LRRC15, CILP, ISLR, GAS1, COL10A1, ASPN, MMP2 and EPYC; and
the expression levels of the genes in the proliferation-related gene set, the immune-related gene set, and the intercellular substance-related gene set are normalized to the following reference genes: GAPDH, GUSB, MRPL19, PSMC4, SF3A1 and TFRC.

16. The method according to claim 12, wherein:
(1) the proliferation-related gene set comprises: PLK1, PRC1, CCNB1, MKI67, TPX2, MELK, CDC20, TYMS and TOP2A;
(2) the immune-related gene set comprises: P2RY13, CCR2, PTPRC, IRF8, CLEC10A, TLR7, CCR4, IL7R and CD4; and
(3) the intercellular substance-related gene set comprises: SPOCK1, COL1A1, POSTN, ADAM12, COL6A2 and COL5A1.

17. The method according to claim 12, wherein:
(i) the proliferation-related gene set comprises: PLK1, PRC1, CCNB1, DLGAP5, KPNA2, CCNA2, RRM2, FOXM1, MKI67, KIF14, HJURP, TPX2, NEK2, CDK1, CDKN3, ASPM, CEP55, BIRC5, MELK, CDC20, TYMS, AURKA and TOP2A;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FOLR2, NCKAP1L, TRAC, MNDA, MRC1, PLEK, SPIB, CD53, CD4 and LYZ; and
(iii) the intercellular substance-related gene set comprises: SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1 and SULF1.

18. The method according to claim 12, wherein:
(i) the proliferation-related gene set comprises: PLK1, PRC1, CCNB1, DLGAP5, KPNA2, CCNA2, RRM2, HMMR, KIF20A, FOXM1, MKI67, KIF14, TK1, HJURP, TPX2, EXO1, KIF11, NEK2, KIF23, CDCA3, CDK1, SPAG5, KIF4A, GTSE1, CDKN3, CDC25C, PRR11, CCNB2, MAD2L1, PKMYT1, CENPE, ASPM, CENPF, BUB1, NDC80, NUSAP1, CEP55, NCAPG, BIRC5, ZWINT, TTK, ESPL1, DEPDC1, MELK, CDC20, CDC6, AURKA, NEIL3, CDT1, KIF2C, KIFC1, NCAPH, KIF18B, AURKB, UBE2C, TOP2A, TYMS, PBK, CDC45, CDCA8, CENPA, MYBL2, SKA1, MCM10, TRIP13, TROAP, POLQ, GINS1 and RAD54L;
(ii) the immune-related gene set comprises: P2RY13, CCR2, PTPRC, IRF8, CLEC10A, TLR7, CCR4, IL7R, SPN, SASH3, CSF2RB, CD37, IKZF1, CD48, IL10RA, EVI2B, IGSF6, CD52, DOCK2, CD84, FGL2, FOLR2, NCKAP1L, TRAC, MNDA, MRC1, PLEK, LCP1, SPIB, CD53, CD3E, SLCO2B1, MS4A6A, CYBB, CD4, SH2D1A, TFEC, LYZ, ITGAM, TLR8, CSF1R, CXCL13, GPNMB, CCR5, HK3, CMKLR1, IL2RG, TYROBP, HCK, ITGB2, LAPTM5, SIGLEC1, AOAH, C3AR1, MSR1, IL2RA, CCL5, ADAMDEC1, LILRB4, CXCL11, FPR3, SELL, CXCL10, UBD, C1QB, PDCDILG2, C1QA, SLAMF8, VSIG4, CD163, LAIR1, SLAMF7 and MS4A4A; and (iii) the intercellular substance-related gene set comprises: LOXL2, SPOCK1, COL1A1, POSTN, ADAM12, COL6A2, COL5A1, COL11A1, COL5A2, COL1A2, MXRA5, THBS2, INHBA, VCAN, ADAMTS12, GREM1, COL3A1, SULF1, ADAMTS2, PRRX1, COL15A1, SPARC, THY1, FAP, DIO2, FN1, COL6A3, FBN1, SYNDIG1, AEBP1, LRRC15, CILP, ISLR, GAS1, COL10A1, ASPN, MMP2 and EPYC.

19. The method of claim 12, wherein step (1) comprises the following steps:
(a') measuring the expression levels of the genes in the proliferation-related gene set, the immune-related gene set, and the intercellular substance-related gene set in the test sample;
(b') calculating the expression profile of the genes in the proliferation-related gene set, the immune-related gene set, and the intercellular substance-related gene set in the test sample based on the expression measured in step (a');
(c') obtaining the expression levels of the genes in the proliferation-related gene set, the immune-related gene set, and the intercellular substance-related gene set for each of the training set of lung adenocarcinoma samples;
(d') establishing the expression profile of the genes in the proliferation-related gene set, the immune-related gene set, and the intercellular substance-related gene set for each of the training set of lung adenocarcinoma samples based on the expression levels obtained in step (c');
(e') classifying the training set of lung adenocarcinoma samples into LAD1 subtype, LAD2 subtype, LAD3 subtype, LAD4 subtype, LAD5 subtype and mixed subtype by comparing the similarity of the expression profiles among the training set of lung adenocarcinoma samples and establishing the expression profiles of the genes in the proliferation-related gene set, the immune-related gene set, and the intercellular substance-related gene set for the LAD1 subtype, LAD2 subtype, LAD3 subtype, LAD4 subtype and LAD5 subtype lung adenocarcinoma samples;
(f') calculating the correlation coefficient between the expression profile in the test sample calculated in step (b') and the gene expression profile in the LAD1 subtype, LAD2 subtype, LAD3 subtype, LAD4 subtype or LAD5 subtype lung adenocarcinoma samples established in step (e'); and
(g') classifying the lung adenocarcinoma of the patient as LAD2 subtype when the correlation coefficient between the gene expression profile in the test sample and the gene expression profile in the LAD2 subtype lung adenocarcinoma samples established in step (e') is the highest and the confidence limit is greater than or equal to 0.8, or
classifying the lung adenocarcinoma of the patient as LAD4 subtype when the correlation coefficient between the gene expression profile in the test sample and the gene expression profile in the LAD4 subtype lung adenocarcinoma samples established in step (e') is the highest and the confidence limit is greater than or equal to 0.8.

* * * * *